US012608786B2

(12) United States Patent
Hosokawa et al.

(10) Patent No.: US 12,608,786 B2
(45) Date of Patent: Apr. 21, 2026

(54) DRUG INSPECTION APPARATUS AND DRUG INSPECTION METHOD

(71) Applicant: Hitachi Channel Solutions, Corp., Tokyo (JP)

(72) Inventors: Daisuke Hosokawa, Tokyo (JP); Riichi Katou, Tokyo (JP); Makoto Katsuchi, Tokyo (JP); Eiji Makimoto, Tokyo (JP); Yoshiki Hayashi, Tokyo (JP)

(73) Assignee: HITACHI CHANNEL SOLUTIONS, CORP., Tokyo (JP)

( * ) Notice: Subject to any disclaimer, the term of this patent is extended or adjusted under 35 U.S.C. 154(b) by 253 days.

(21) Appl. No.: 18/584,289

(22) Filed: Feb. 22, 2024

(65) Prior Publication Data

US 2024/0289933 A1      Aug. 29, 2024

(30) Foreign Application Priority Data

Feb. 27, 2023      (JP) ................................. 2023-028935

(51) Int. Cl.
| | |
|---|---|
| *G06T 7/00* | (2017.01) |
| *G06V 10/776* | (2022.01) |
| *G06V 30/19* | (2022.01) |

(52) U.S. Cl.
CPC .......... *G06T 7/0002* (2013.01); *G06V 10/776* (2022.01); *G06V 30/19007* (2022.01)

(58) Field of Classification Search
USPC ......................................................... 382/112
See application file for complete search history.

(56) References Cited

U.S. PATENT DOCUMENTS

| | | |
|---|---|---|
| 2012/0200596 A1 | 8/2012 | Gotou et al. |
| 2014/0318078 A1 | 10/2014 | Kondo et al. |
| 2018/0170591 A1 | 6/2018 | Koike et al. |
| 2021/0205179 A1 | 7/2021 | Amano et al. |

FOREIGN PATENT DOCUMENTS

| | | |
|---|---|---|
| JP | H11-206855 A | 8/1999 |
| WO | 2012/005004 A1 | 1/2012 |
| WO | 2013/105198 A1 | 7/2013 |
| WO | 2017/002713 A1 | 1/2017 |
| WO | 2019/244729 A1 | 12/2019 |
| WO | 2020/105395 A1 | 5/2020 |

OTHER PUBLICATIONS

Japanese Office Action issued on Dec. 24, 2024 for Japanese Patent Application No. 2024-054332.

*Primary Examiner* — Jacky X Zheng
(74) *Attorney, Agent, or Firm* — Volpe Koenig

(57) ABSTRACT

A drug inspection apparatus includes an inspection processing portion for collating a photographed image of each drug with drug master data for a dispensed drug group; and determines a normal result when the photographed image is contained in the drug group, as an uncertain result when it is uncertain if the photographed image is a drug in the drug group, and as a result to be confirmed when it is estimated that the photographed image is a drug contained in the drug group, but recommended to be confirmed by a person. The inspection result processor displays the photographed image corresponding to the drug which needs to be confirmed in a first display field that is provided corresponding to each drug which has been identified in the inspection process, on the inspection process screen, and displays the photographed image which has been determined as uncertain, in a second display field.

12 Claims, 28 Drawing Sheets

FIG. 2
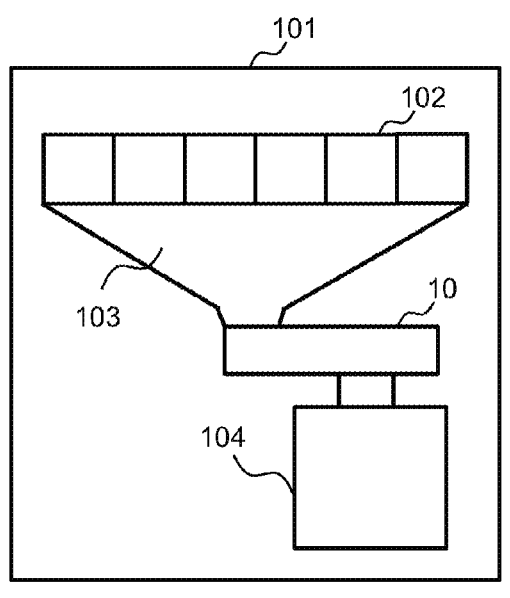
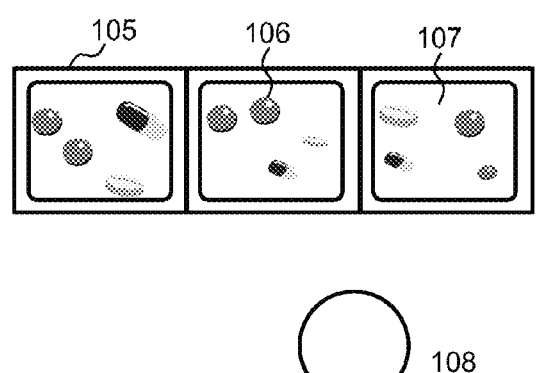

FIG. 6C
304
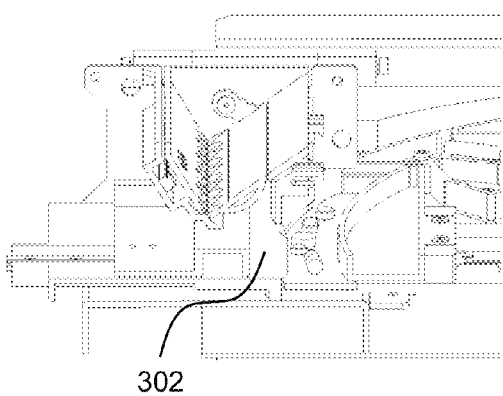
FIG. 6D
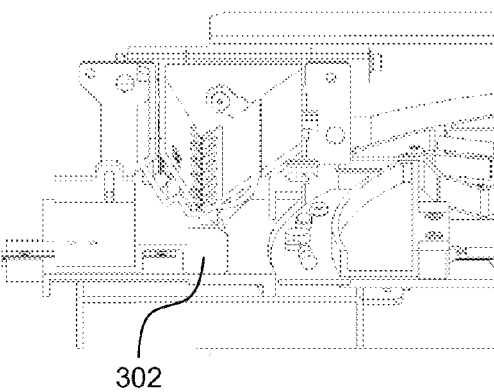
302
FIG. 6E
302

FIG. 8

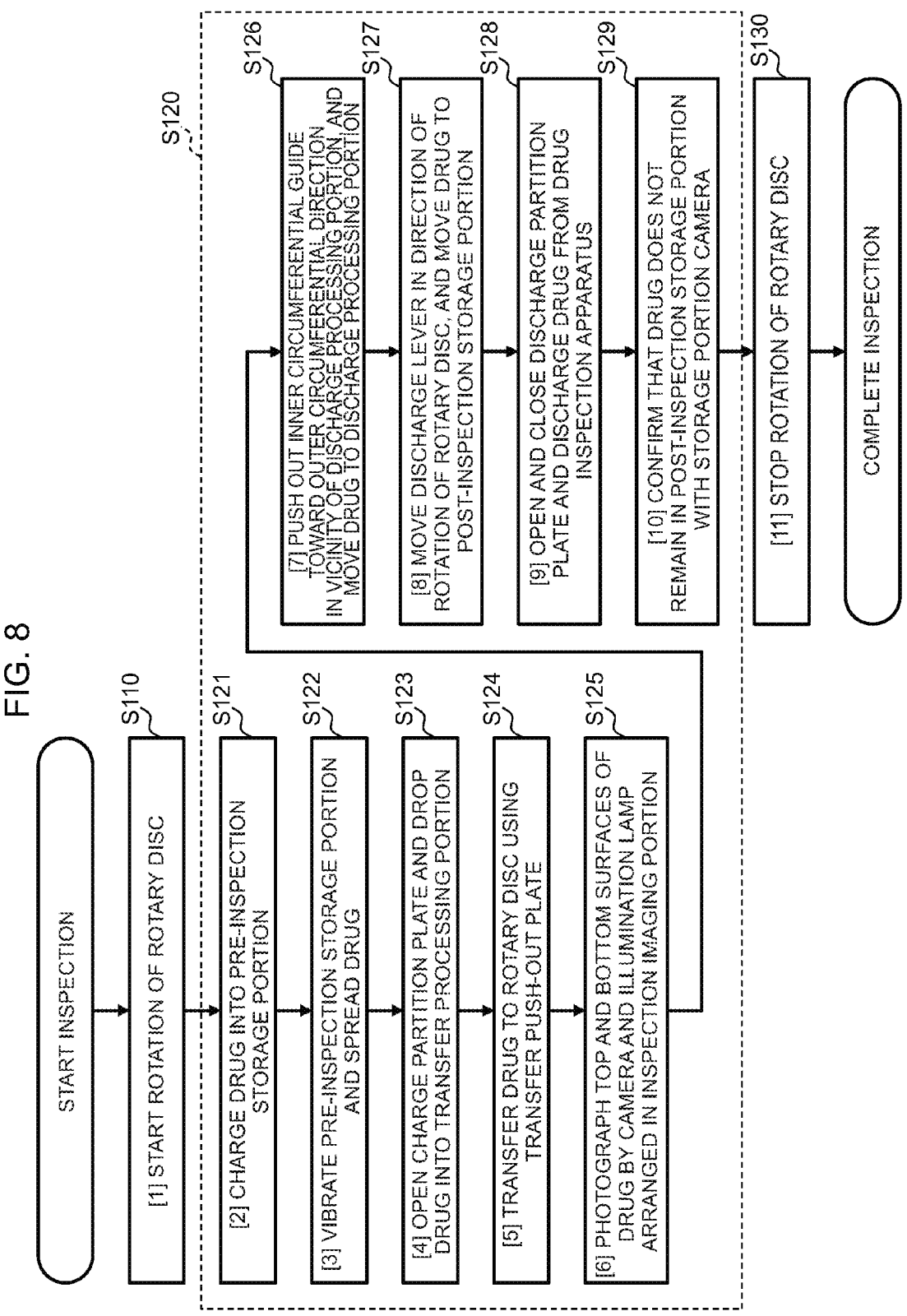

START INSPECTION

[1] START ROTATION OF ROTARY DISC — S110

S120

[2] CHARGE DRUG INTO PRE-INSPECTION STORAGE PORTION — S121

[3] VIBRATE PRE-INSPECTION STORAGE PORTION AND SPREAD DRUG — S122

[4] OPEN CHARGE PARTITION PLATE AND DROP DRUG INTO TRANSFER PROCESSING PORTION — S123

[5] TRANSFER DRUG TO ROTARY DISC USING TRANSFER PUSH-OUT PLATE — S124

[6] PHOTOGRAPH TOP AND BOTTOM SURFACES OF DRUG BY CAMERA AND ILLUMINATION LAMP ARRANGED IN INSPECTION IMAGING PORTION — S125

[7] PUSH OUT INNER CIRCUMFERENTIAL GUIDE TOWARD OUTER CIRCUMFERENTIAL DIRECTION IN VICINITY OF DISCHARGE PROCESSING PORTION, AND MOVE DRUG TO DISCHARGE PROCESSING PORTION — S126

[8] MOVE DISCHARGE LEVER IN DIRECTION OF ROTATION OF ROTARY DISC, AND MOVE DRUG TO POST-INSPECTION STORAGE PORTION — S127

[9] OPEN AND CLOSE DISCHARGE PARTITION PLATE AND DISCHARGE DRUG FROM DRUG INSPECTION APPARATUS — S128

[10] CONFIRM THAT DRUG DOES NOT REMAIN IN POST-INSPECTION STORAGE PORTION WITH STORAGE PORTION CAMERA — S129

[11] STOP ROTATION OF ROTARY DISC — S130

COMPLETE INSPECTION

FIG. 9

TIME PERIOD

| No. | PROCESS | T1 | T2 | T3 | T4 | T5 | T6 | T7 |
|---|---|---|---|---|---|---|---|---|
| [1] | START ROTATION OF ROTARY DISC | | | | | | | |
| [2] | CHARGE DRUG INTO PRE-INSPECTION STORAGE PORTION | M1 | M2 | M3 | M4 | M5 | M6 | M7 |
| [3] | START VIBRATION OF PRE-INSPECTION STORAGE PORTION | ↑ | ↑ | ↑ | ↑ | ↑ | ↑ | |
| [4] | CHARGE PARTITION PLATE OPEN ⇒ CLOSE | ↑ | ↑ | ↑ | ↑ | ↑ | ↑ | |
| [5] | PUSH OUT DRUG TO ROTARY DISC USING TRANSFER PUSH-OUT PLATE | | | ↑ | ↑ | ↑ | ↑ | ↑ |
| [6] | PHOTOGRAPH IMAGE OF DRUG USING INSPECTION IMAGING PORTION | | | ↑ | ↑ | ↑ | ↑ | ↑ |
| [7] | PUSH OUT DRUG TO DISCHARGE PROCESSING PORTION USING INNER CIRCUMFERENTIAL GUIDE | | | | ↑ | ↑ | ↑ | ↑ |
| [8] | PUSH OUT DRUG TO POST-INSPECTION STORAGE PORTION USING DISCHARGE LEVER | | | | | ↑ | ↑ | ↑ |
| [9] | OPEN AND CLOSE DISCHARGE PARTITION PLATE AND DISCHARGE DRUG OUTSIDE DRUG INSPECTION APPARATUS | | | | ↑ | ↑ | ↑ | ↑ |
| [10] | CONFIRM THAT DRUG DOES NOT REMAIN USING STORAGE PORTION CAMERA | | | | ↑ | ↑ | ↑ | ↑ |
| [11] | STOP ROTATION OF ROTARY DISC | | | | | | | |

| SELECTION (1501) | PATIENT ID (1502) | PATIENT NAME (1503) | PRESCRIPTION MACHINE ID (1504) | TOTAL NUMBER OF SHEETS (1505) | NUMBER OF DOSAGE TIMES (1506) | INSPECTION LEVEL (1507) | INSPECTION RESULT (1508) NORMAL | ERROR LEVEL | UNCERTAIN | INSPECTION STATUS (1509) |
|---|---|---|---|---|---|---|---|---|---|---|
| ● | 00012 | TARO HITACHI | 01 | 14 | 1 | B | 14 | 0 | 0 | UNCOMPLETED |
| ◎ | 00345 | TAKAKO HITACHI | 01 | 21 | 3 | A | 17 | 2 | 2 | UNCOMPLETED |
| ◎ | 06789 | JIRO SUZUKI | 02 | 56 | 4 | B | 56 | 0 | 0 | COMPLETED |
| ◎ | 12345 | HANAKO TANAKA | 01 | 5 | 1 | B | 5 | 0 | 0 | COMPLETED |
| | | | | | | | | | | |
| | | | | | | | | | | |

OPEN (1520)

SELECTED INSPECTION INFORMATION

Figure 15:
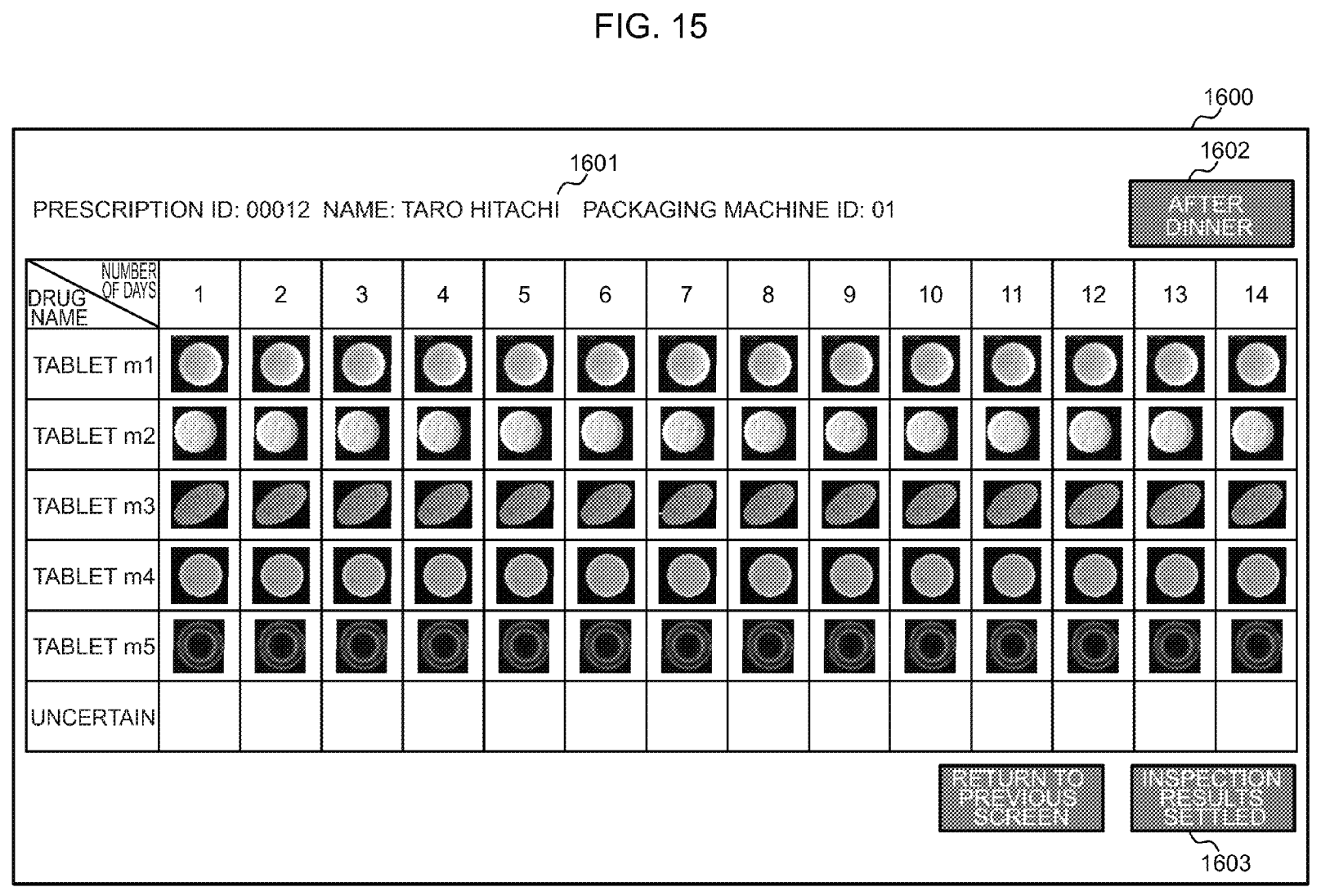

1601 PRESCRIPTION ID: 00012   NAME: TARO HITACHI   PACKAGING MACHINE ID: 01

1602 AFTER BUTTER

1603 INSPECTION RESULTS SETTLED

RETURN TO PREVIOUS SCREEN

| DRUG NAME / NUMBER OF DAYS | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| TABLET m1 | | | | | | | | | | | | | | |
| TABLET m2 | | | | | | | | | | | | | | |
| TABLET m3 | | | | | | | | | | | | | | |
| TABLET m4 | | | | | | | | | | | | | | |
| TABLET m5 | | | | | | | | | | | | | | |
| UNCERTAIN | | | | | | | | | | | | | | |

FIG. 18

DRUG INSPECTION APPARATUS AND DRUG INSPECTION METHOD

BACKGROUND OF THE INVENTION

Field of the Invention

The present invention relates to a drug inspection apparatus and a drug inspection method, and is suitable for application to a drug inspection apparatus and a drug inspection method for inspecting dispensed drugs.

Description of the Related Art

In hospitals and drugstores, drugs are dispensed according to prescriptions, and generally, a pharmacist performs a drug inspection for checking whether or not the amount of the prepared drug and the like are correct. In particular, when a plurality of drugs are combined and prescribed in one package for one dose, it is necessary to distribute the drugs and inspect the contents of the drugs, for each dose. Various methods have been proposed for automation technologies and efficiency technologies for supporting this work.

For example, in International Publication No. WO 2017-002713, there is disclosed a technology in which a drug is dropped onto a disk-shaped member for inspection, then, is rotated around a predetermined axial center, and is transported. International Publication No. WO 2017-002713 states "In the drug packaging apparatus of the present invention, the plurality of receiving portions are arranged in a circumferential direction on a rotating body which is configured to be rotatable around a predetermined axial center position, and it is preferable that the delivery portion can perform the delivery operation for the drug in the receiving portion which is arranged in a predetermined operation area. According to such a configuration, the drug packaging apparatus performs the delivery operation by moving the rotating body toward the inside of the operation area of the delivery portion while sequentially preparing the drugs which have been supplied from a drug preparing and dispensing portion side, in the plurality of receiving portions, and can successively supply the drugs to a pre-packaging imaging portion side. Thereby, the drug packaging apparatus can efficiently perform an operation of individually supplying the drugs one by one to the pre-packaging imaging portion side, in an individual supply portion."

As a technology similar to International Publication No. WO 2017-002713, in International Publication No. WO 2013-105198, there is disclosed an inspection apparatus that moves solid drugs discharged from a hopper to a plurality of inspection containers arranged on an upper surface of a turntable for each dose, and moves the turntable to an imaging position at which a photographing apparatus for taking a picture of the solid drugs in the inspection containers takes a picture of the solid drugs.

In addition, International Publication No. WO 2012-005004 discloses a technology of an apparatus that supports an inspection of a drug after the drug has been packed into one package as one dose. International Publication No. WO 2012-005004 states "The apparatus illuminates a sachet in which a drug is enclosed between two films, from a side of one of the two films, in the state, takes an image of the sachet from a side of the other of the two films, and thereby acquires a transmitted light image that is an image of the sachet; illuminates the sachet from the side of the other film, in the state, takes an image of the sachet from the side of the other film, and thereby acquires a reflected light image which is a color image of the sachet; detects a drug area that indicates an area of the drug which is enclosed in the sachet and, with the use of the transmitted light image; and cuts out an image of the area of the reflected light image corresponding to the drug area, thereby creates a drug image which is a color image, and displays the drug image on a display portion."

In addition, International Publication No. WO 2020-105395 is cited as a technology of using two cameras for taking a picture of drugs. International Publication No. WO 2020-105395 states "An image acquiring portion 20 includes: two cameras (imaging portions) 22A and 22B that take a picture of a drug; an illuminating portion 24 which has a plurality of light sources; and a photographing control portion 26 that controls the cameras 22A and 22B and the illuminating portion 24, as illustrated in FIG. 2.

However, there has been such a problem in the drug dispensing apparatus described in International Publication No. WO 2017-002713 that a processing mechanism from the charge of the drug to be inspected to the discharge of the drug after the inspection is complicated, and it takes a time period to perform the inspection process for each dose. In addition, the imaging of the drug is performed one tablet by one tablet, and accordingly, it results in taking a longer time period when the number of drugs for one dose is large. In addition, there has been also such a problem that a processing time period is accumulated and becomes long for a plurality of consecutive prescriptions, and furthermore, the mechanism becomes complicated and large.

In addition, in the inspection apparatus (drug supply apparatus) disclosed in International Publication No. WO 2013-105198, such a situation has been assumed that in the case where a large number of drugs are contained in one dose, a plurality of drugs result in overlapping each other in an inspection container, and the drugs cannot be imaged and inspected with high accuracy. In such a situation, it is necessary to perform an imaging by the imaging portion, after the inspection container has been stopped, and accordingly there has been such a problem that the operation takes a time period. In addition, in International Publication No WO 2013-105198, there has been such a problem that imaging process for inspecting each tablet from the captured image takes a time period.

In addition, in the apparatuses disclosed in International Publication No WO 2012-005004 and International Publication No WO 2020-105395, such a situation is assumed that in the case where a large number of drugs are contained in one dose, the drugs tend to easily become a state in which the drugs are unevenly distributed in a packaging sheet in which the drugs are packed into one package, and the drugs overlap each other and thereby the apparatuses cannot image and inspect the drugs with high accuracy. In addition, the imaging portion is not configured in consideration of such a situation that drugs for a large number of doses are continuously supplied, and there has been a problem also in a processing power.

The present invention has been made in view of the above points, and provides a drug inspection apparatus and a drug inspection method that take an image of a drug group for one dose including a plurality of drugs, in a state in which each tablet is arranged to be easily identified in a state where the drug is not packed into one package, and can execute the inspection for a drug group including a plurality of drugs with high accuracy.

SUMMARY OF THE INVENTION

In order to solve the above problems, the present invention provides a drug inspection apparatus that inspects a drug group including one or more dispensed drugs, including: drug master data in which basic data including master images is registered for a plurality of drugs including individual drugs contained in the drug group; an inspection imaging portion that takes images of individual drugs of the drug group, which are spread and conveyed on a conveyance path; an inspection processing portion that executes an inspection process for the drug group, by software control on the basis of collation between an image photographed by the inspection imaging portion and the drug master data; and an inspection result processing portion that generates and outputs an inspection process screen for displaying results of the inspection process, wherein the inspection processing portion collates the photographed images of individual drugs with the drug master data, in the inspection process, and determines an inspection result of the photographed image as a normal result, when having determined that the drug of the photographed image is a drug contained in the drug group, determines that the inspection result of the photographed image is an uncertain result, when having determined that it is uncertain that the drug of the photographed image is the drug or not which is contained in the drug group, and determines that the inspection result of the photographed image is a result needed to be confirmed, when having determined that the drug of the photographed image is estimated to be a drug contained in the drug group but is recommended to be confirmed by a person; and the inspection result processing portion displays the photographed image that has been determined as the normal result or the result needed to be confirmed corresponding to the drug, in a first display field provided so as to correspond to individual drugs that have been identified in the inspection process, on the inspection process screen, and displays the photographed image that has been determined as the uncertain result, in a second display field provided separately from the first display field.

In addition, in order to solve the above problems, the present invention provides a drug inspection method by a drug inspection apparatus for inspecting a drug group including one or more dispensed drugs, wherein the drug inspection apparatus includes: drug master data in which basic data including master images is registered for a plurality of drugs including individual drugs contained in the drug group which has been prepared; an inspection imaging portion that images individual drugs of the drug group, which are spread and conveyed on a conveyance path; an inspection processing portion that executes an inspection process for the drug group, by software control on the basis of collation between an image photographed by the inspection imaging portion and the drug master data; and an inspection result processing portion that generates and outputs an inspection process screen for displaying results of the inspection process, wherein the inspection processing portion collates the photographed images of individual drugs with the drug master data, in the inspection process, and determines an inspection result of the photographed image as a normal result, when having determined that the drug of the photographed image is a drug included in the drug group, determines that the inspection result of the photographed image is an uncertain result, when having determined that it is uncertain that the drug of the photographed image is the drug or not which is included in the drug group, and determines that the inspection result of the photographed image is a result needed to be confirmed, when having determined that the drug of the photographed image is estimated to be a drug included in the drug group but is recommended to be confirmed by a person; and the inspection result processing portion displays the photographed image which has been determined as the normal result or the result needed to be confirmed corresponding to the drug, in a first display field provided so as to correspond to individual drugs which have been identified in the inspection process, on the inspection process screen, and displays the photographed image which has been determined as the uncertain result, in a second display field provided separately from the first display field.

According to the present invention, it is possible to accurately execute the inspection for the drug group including a plurality of drugs.

BRIEF DESCRIPTION OF THE DRAWINGS

FIG. 2 is a view showing an example of a schematic configuration of a drug packaging apparatus 101 which mounts the drug inspection apparatus 10 therein;

FIG. 6C is a configuration diagram (part 3) of the transfer processing portion 300;

FIG. 6D is a configuration diagram (part 4) of the transfer processing portion 300;

FIG. 6E is a configuration diagram (part 5) of the transfer processing portion 300;

FIG. 8 is a flowchart showing an example of a processing procedure of a control process by a drug operation control portion 804;

FIG. 9 is a diagram showing an example of a process transition of an inspection process at the time when a plurality of drugs are continuously charged;

FIG. 12 is a diagram showing one example of an initial screen of inspection selection;

FIG. 15 is a diagram showing one example (first example) of an inspection process screen;

FIG. 18 is a diagram showing another example (fourth example) of the inspection process screen;

DETAILED DESCRIPTION OF THE PREFERRED EMBODIMENTS

An embodiment of the present invention will be described in detail below with reference to the drawings.

Figure 1:
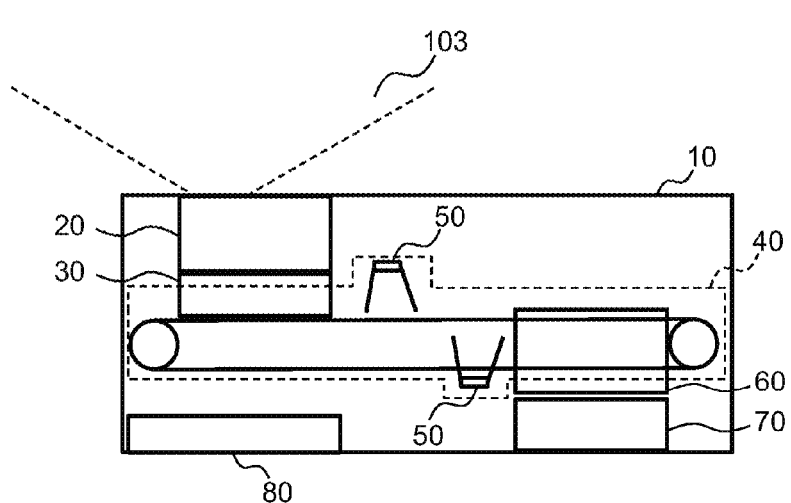
FIG. 1 is a view showing an example of a schematic configuration of a drug inspection apparatus 10 according to one embodiment of the present invention.

FIG. 1 is a view showing an example of a schematic configuration of a drug inspection apparatus 10 according to one embodiment of the present invention. The drug inspection apparatus 10 includes a pre-inspection storage portion 20, a transfer processing portion 30, a conveyance inspection processing portion 40 having an inspection imaging portion 50, a discharge processing portion 60, and a post-inspection storage portion 70; and each of these portions is continuously arranged as a configuration for forming a movement path of a plurality of drugs M which the drug inspection apparatus 10 receives. Furthermore, in addition to the above portions, the drug inspection apparatus 10 includes an inspection control portion 80 that controls and processes the movement, imaging and inspection of the drug M. The inspection control portion 80 is a component that realizes a predetermined function by software, in which hardware (for example, a processor, a storage element, various interfaces, and the like) constituting a computer performs execution of a predetermined program, storage of data, and the like, but may be a component in which hardware realizes a part or all of the functions.

When each drug in the plurality of drugs M to be received is represented by m, the drug inspection apparatus 10 performs individual inspection processes for each one drug group (referred to as drug M) in the inspection control process to determine whether or not each drug m contained in the drug group matches the drug information which has been registered in advance. The inspection processing result for the drug m is, for example, expressed as "normal" when it has been determined that the drug m matches the drug information, and is expressed as "uncertain" when it cannot be determined that the drug m matches the drug information.

The drug inspection apparatus 10 consolidates the inspection processing results for the above individual drugs m for each drug M, and performs the inspection process for the drug M including the plurality of drugs m which have been received. The inspection processing result for the drug M is expressed as "normal" when all the inspection processing results of the included drugs m are normal, and is expressed as "uncertain" when there is an uncertain inspection result for at least a part of the drugs m.

Furthermore, the drug inspection apparatus 10 can receive another drug M (hereinafter, referred to as M1, M2, M3 and so on) continuously to the drug M, and continuously performs the inspection process on the plurality of drugs M1, M2, M3 and so on. Then, the drug inspection apparatus 10 consolidates the inspection results of the drugs M1, M2, M3 and so on, which have been continuously handled, and outputs such a processing result that all the inspection results are "normal", or at least some of the inspection results are "uncertain". For information, in the present specification, "drugs M are continuously charged/another drug M is continuously received to the drug M" means that the charging period (or the receiving period) of a preceding drug group (for example, the drug M1) and the charging period (or the receiving period) of a subsequent drug group (for example, the drug M2) are executed continuously without overlapping their respective charging periods; and includes that a predetermined time period is interposed between the end of the charging (or reception) of the drug M1 and the start of the charging (or reception) of the drug M2 (in other words, the drugs M are intermittently and continuously charged (or received)).

The flow of the drug M will be specifically described below. The plurality of drugs M which the drug inspection apparatus 10 receives are temporarily held in the pre-inspection storage portion 20. After that, the plurality of drugs m contained in each drug M sequentially fall to the transfer processing portion 30 of a subsequent stage, which is arranged on the lower side, with predetermined intervals for each drug M being spaced; and move. Furthermore, the conveyance inspection processing portion 40 in the subsequent stage uses a conveying means (which is, for example, a conveying belt in FIG. 1, a rotary disc in FIG. 3 which will be described later, or the like) which continuously operates in the horizontal direction, and thereby transfers the drug M (a plurality of drugs m) from the transfer processing portion 30 onto a conveying means. Here, at the subsequent stage on the conveying means, the inspection imaging portions 50 each including a camera and an illumination lamp are arranged above and below the conveying means, and the inspection imaging portions 50 take images of the drugs M which move on the conveying means, from the upper surface and the lower surface. Though details will be described later, the inspection process is executed on the individual drugs m constituting the drug M, with the use of the captured images. Then, in the discharge processing portion 60 which is arranged at the end point of the conveying means, the drug M is moved from the conveying means to the post-inspection storage portion 70, and when the inspection process for the drug M is finished, the drug is discharged from the post-inspection storage portion 70.

FIG. 2 is a view showing an example of a schematic configuration of a drug packaging apparatus 101 which mounts the drug inspection apparatus 10 therein. The drug packaging apparatus 101 is an apparatus for packaging a plurality of drugs (having the same meaning as the drug M) which have been instructed by a prescription from a doctor, in units of the drug M, and as shown in FIG. 2, includes a drug storage portion 102, a drug supply portion 103, the drug inspection apparatus 10, and a drug packaging portion 104. A pharmacist 108 takes out a drug (for example, a packaged drug 105) which has been packaged by the drug packaging portion 104 in the drug packaging apparatus 101, checks the contents, and delivers the drug to a patient. For example, in the packaged drug 105 shown in FIG. 2, a plurality of one package prescription drugs 107, each of which packs one or more individual drugs 106 prescribed as the amount of one dose in one bag, are connected to each other by the number of times of the dose to be given to the patient.

The configuration of the drug packaging apparatus 101 (the drug storage portion 102, the drug supply portion 103, and the drug packaging portion 104) except for the drug inspection apparatus 10 is disclosed in the documents cited in the previously described prior art documents, and the like, and accordingly, the detailed description thereof will be omitted; but each configuration of the drug packaging apparatus 101 has the following functions.

The drug storage portion 102 stores a plurality of different drugs (drugs m), and when having received an output instruction of a drug to be dispensed according to a prescription instruction from a doctor, discharges the designated drug m by a designated amount and number of pieces. The drug supply portion 103 has a chute shape, collects a plurality of drugs m with the use of the falling gravity of the drugs m which have been discharged from the drug storage portion 102, and delivers the drugs m to the drug inspection apparatus 10 as a drug M. As shown in FIG. 1, the drug inspection apparatus 10 is arranged in the lower part of the chute of the drug supply portion 103, and when having received a plurality of drugs M, performs the inspection process of inspecting whether or not the designated amount of the above designated drug has been discharged. Then, the drug packaging portion 104 packages the drug M for which the inspection process in the drug inspection apparatus 10 has been finished, and discharges the drug M.

In the drug packaging apparatus 101, prescription data is input which indicates a content of the prescription of the drug. The prescription data designates, for example, the names and numbers of drugs to be taken respectively in the morning, in the daytime and in the evening, for one week. The drug packaging apparatus 101 discharges a designated number of drugs M to the drug supply portion 103, from the drug storage portion 102 in which the drugs are sorted according to the drug name which the prescription data indicates, and are stored. The number of drugs to be taken at one time is one type or one piece in some cases, but in many cases, is a plurality of types or a plurality of drugs. The drug packaging apparatus 101 continuously processes the above processing on the basis of the prescription data, thereby prepares, for example, packaged drugs of 21 pieces in total of the morning, daytime and evening of one week; and accordingly, the drugs M1, M2, M3 and so on (21 packaged drugs in total) are continuously charged into the drug inspection apparatus 10 as well. Accordingly, the drug inspection apparatus 10 performs the inspection process on the plurality of drugs M, while synchronizing the identification numbers that are assigned to the drugs M1, M2, M3 and so on, with the drug packaging apparatus 101. The inspection process by the drug inspection apparatus 10 is executed for all of the drugs M1, M2, M3 and so on, and as described above, an inspection processing result is obtained which is "normal" in which all of the drugs are normal, or "uncertain" in which at least a part of the drugs is uncertain. Then, the drug packaging apparatus 101 (for example, the drug inspection apparatus 10) acquires inspection processing result data based on the inspection processing result, displays the data on an unillustrated display means, and thereby can transmit the information to the pharmacist 108; and the pharmacist collates the packaged drug with the inspection processing result data, and confirms the result. Thereby, it becomes easy for the pharmacist to confirm the contents of the drug M.

For information, in FIG. 2, such an example is shown that the drug inspection apparatus 10 of the present invention is incorporated in the drug packaging apparatus 101, but the method of using the drug inspection apparatus 10 is not limited thereto. The drug inspection apparatus 10 can perform an individual inspection process of checking whether or not each drug m in a plurality of drugs M to be received matches the pre-registered drug information (drug master data or drug database) by the inspection control process. Accordingly, for example, regarding the drug M which has been already prescribed in one package, the drug inspection apparatus 10 can be used also as a means for knowing which drug of the registered drug information each drug m is.

Various configurations can be proposed, as the drug inspection apparatus 10 that realizes the objects as described above. Then, hereinafter, as a plurality of Examples of the drug inspection apparatus 10, the drug inspection apparatus 11 will be described in the Example 1, and the drug inspection apparatus 12 will be described in the Example 2.

EXAMPLE 1

Figure 3:
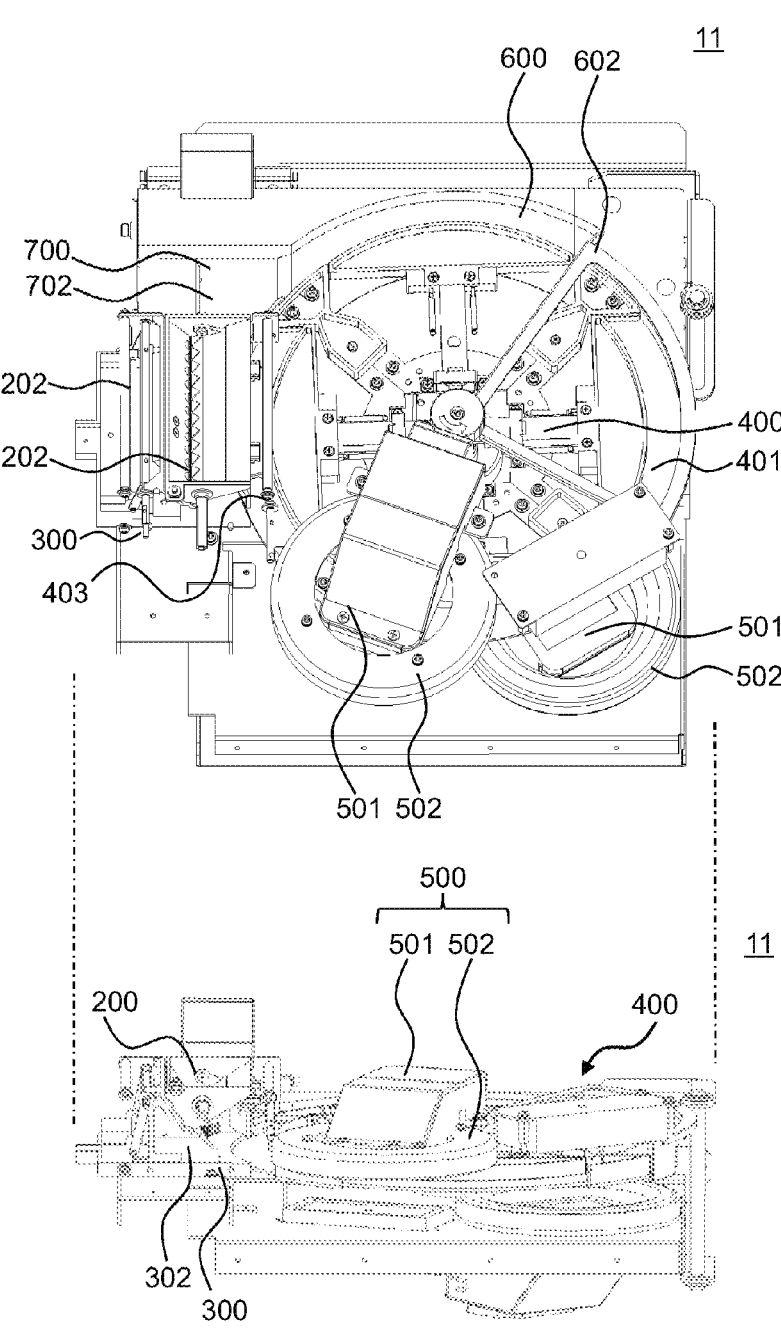
FIG. 3 is a front view and a top view of a drug inspection apparatus 11 according to Example 1.

FIG. 3 is a front view and a top view of the drug inspection apparatus 11 according to Example 1. When the drug inspection apparatus 11 shown in FIG. 3 is compared with the drug inspection apparatus 10 shown in FIG. 1, both apparatuses are largely different from each other in a point that in the drug inspection apparatus 10, the conveying means of the conveyance inspection processing portion 40 is a conveying belt, whereas in the drug inspection apparatus 11, the conveying means of the conveyance inspection processing portion 400 is a rotary disc 401, but have many common configurations.

Then, hereinafter, regarding each of components of the drug inspection apparatus 11, a component corresponding to the component of the drug inspection apparatus 10 will be described with the use of the same names. Specifically, for example, the conveyance inspection processing portion 400 included in the drug inspection apparatus 11 is a component corresponding to the conveyance inspection processing portion 40 included in the drug inspection apparatus 10. In addition, such unification of the names is also the same in a drug inspection apparatus 12 shown in Example 2.

The drug inspection apparatus 11 temporarily holds a plurality of received drugs m (drug M) in a pre-inspection storage portion 200. The drug M in the pre-inspection storage portion 200 is dropped to the transfer processing portion 300 which is arranged on the lower side, by a charge partition plate 202 in an opened state, and moves.

Then, in the transfer processing portion 300, a transfer push-out plate 302 pushes out the drug M and transfers the drug M to the rotary disc 401 constituting the conveyance inspection processing portion 400 in the subsequent stage.

The rotary disc 401 is a disc having a diameter of about 250 mm, and rotates at a constant rotation speed of 15 rpm. In the conveyance inspection processing portion 400, the drug M is placed in an elongated space having a width of about 20 mm, which is formed by the rotary disc 401 that continuously rotates in a horizontal direction and an inner circumferential guide 403 that is arranged on the inner circumferential surface of the rotary disc. When the drug M moves together with the rotary disc 401, the drug M is imaged from the upper surface and the lower surface, in an inspection imaging portion 500 which is arranged on the downstream side of the conveyance, and in which a camera 501 and an illumination lamp (reflection illumination) 502 are arranged in top and bottom. When the rotary disc 401 further rotates by about 180 degrees, the inner circumferential guide 403 on the rotary disc 401 moves in an outer circumferential direction, and thereby, the drug M is pushed out from the rotary disc 401 to the discharge processing portion 600; and furthermore, a discharge lever 602 of the discharge processing portion 600 operates in a direction of the rotary disc 401, and thereby, the drug M is moved to a post-inspection storage portion 700. Then, in the post-inspection storage portion 700, an unillustrated storage portion camera takes an image which indicates that the drug M is stored.

When the inspection process for the drug M is finished through the flow described above, the post-inspection storage portion 700 discharges the drug M by opening a discharge partition plate 702, and then closes the discharge partition plate 702; and after that, the storage portion camera takes an image of the post-inspection storage portion 700, and it is confirmed that the drug M does not remain.

Figure 7:
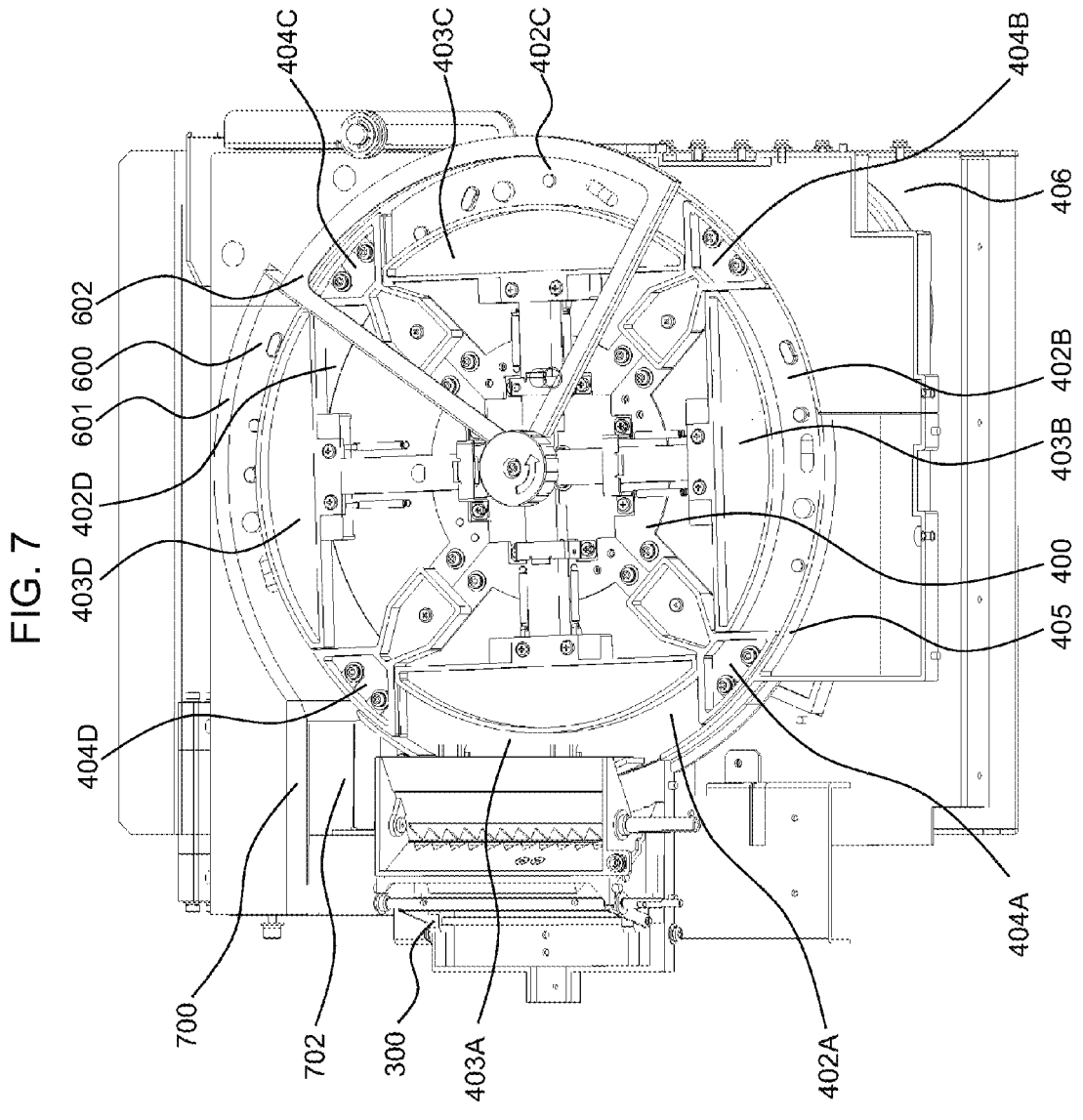
FIG. 7 is a configuration diagram of a conveyance inspection processing portion 400, a discharge processing portion 600, and a post-inspection storage portion 700.

For information, in the rotary disc 401 which is used in the present Example, the outer circumferential portion of the rotary disc 401 is divided into four sections, and a circumference partition plate 404 for dividing the section is arranged at a boundary of each section (see FIG. 7). When a plurality of drugs M continue which the pre-inspection storage portion 200 receives (for example, when drugs M1, M2, M3 and M4 are continuously received), the above operation is repeatedly executed. However, the rotary disc 401 is divided into four sections, and accordingly, the drugs M1, M2, M3 and M4 are sequentially placed in the respective sections, and the imaging and the inspection process can be continuously performed.

Figure 4:
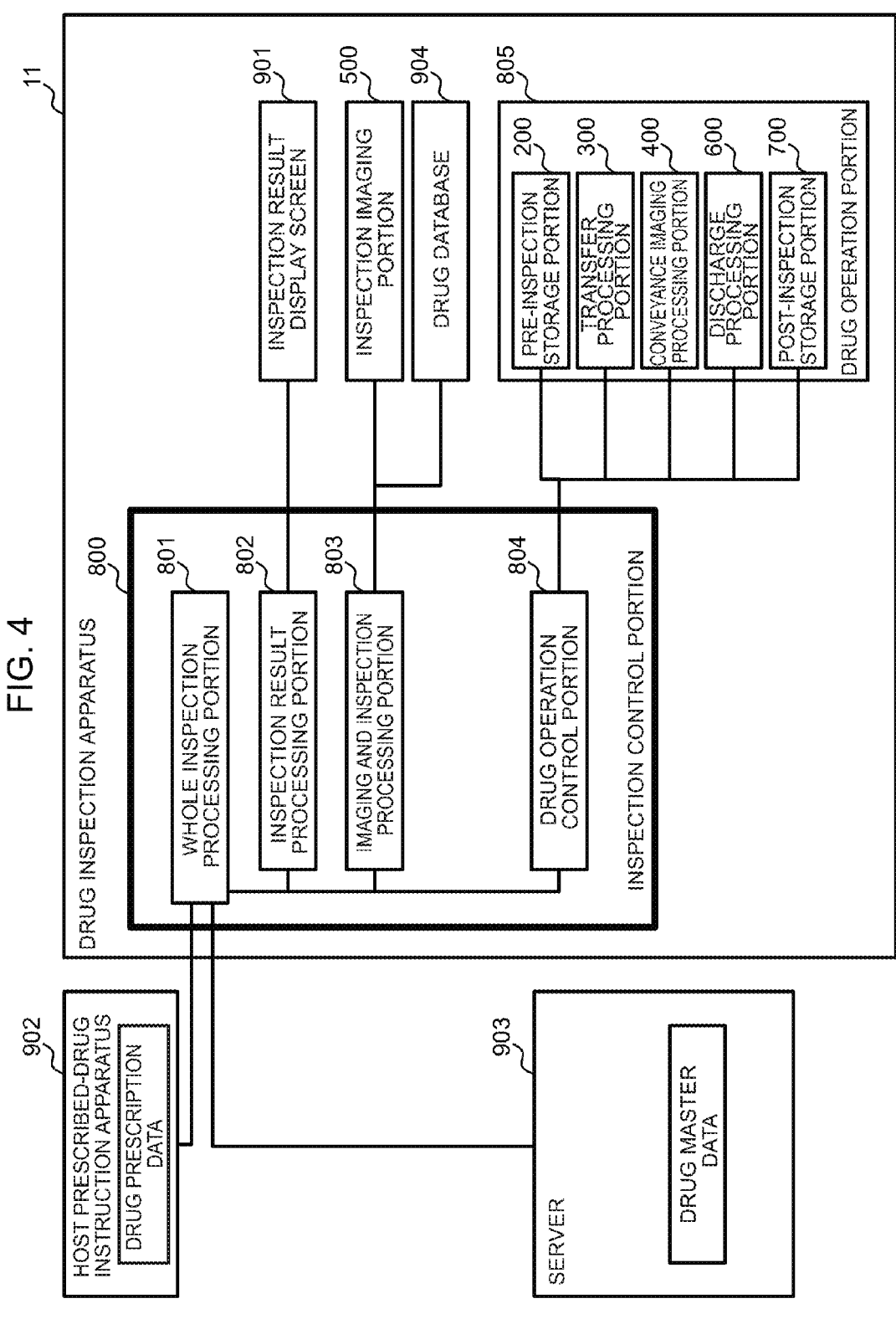
FIG. 4 is a block diagram showing an example of an internal configuration of the drug inspection apparatus 11, centering on an inspection control portion 800.

FIG. 4 is a block diagram showing an example of an internal configuration of the drug inspection apparatus 11, centering on an inspection control portion 800. The inspection control portion 800 has a configuration corresponding to the inspection control portion 80 of the drug inspection apparatus 10, and has a function of processing the conveyance, imaging and inspection of the drug M which has been received, in the drug inspection apparatus 11. As shown in FIG. 4, the inspection control portion 800 is configured to include an inspection result processing portion 802, an imaging and inspection processing portion 803, and a drug operation control portion 804 under a whole inspection processing portion 801 that performs an overall control process.

The whole inspection processing portion 801 is coupled to a host prescribed-drug instruction apparatus 902 which holds data (drug prescription data) of a drug to be prescribed; and acquires drug prescription data of the drug M to be received from the host prescribed-drug instruction apparatus 902, and outputs an inspection processing result thereto. The whole inspection processing portion 801 is coupled to a server 903 that holds basic data (drug master data) regarding various drugs, acquires master data of a drug to be prescribed from the server 903, and stores the master data in the drug database 904 of the imaging and inspection processing portion 803. In addition, the whole inspection processing portion 801 determines an operation method of the drug inspection apparatus 11, for example, on the basis of the drug prescription data which has been acquired from the host prescribed-drug instruction apparatus 902; instructs an operation process to an inspection result processing portion 802, the imaging and inspection processing portion 803, and the drug operation control portion 804; and in addition, outputs the inspection result of the drug M to an inspection result display screen 901 and the host prescribed-drug instruction apparatus 902. The inspection result display screen 901 is a screen for displaying the inspection result of the drug in the drug inspection apparatus 10 for the pharmacist; and is displayed on a display apparatus of an external terminal (for example, a display of a user terminal coupled via a network), which is coupled to the drug inspection apparatus 10, for example, with the use of GUI (Graphical User Interface). In addition, the inspection result display screen 901 may be displayed on a display apparatus such as a display provided in the drug inspection apparatus 10, or may be included in an output to the host prescribed-drug instruction apparatus 902. In addition, the inspection result display screen 901 is not limited to the screen display on the display apparatus, and at least a part may be replaced with another outputting method (for example, data output to an external storage media, printing, or the like), and be thus executed. More specifically, on the inspection result display screen 901, an initial screen of inspection selection, an inspection process screen, and an inspection correction screen are displayed, which will be described later.

The drug operation control portion 804 controls an operation of a drug operation portion 805 (specifically, the pre-inspection storage portion 200, the transfer processing portion 300, the conveyance inspection processing portion 400, the discharge processing portion 600, and the post-inspection storage portion 700) for the drug M which the drug inspection apparatus 11 receives, according to the operation method which the whole inspection processing portion 801 has determined.

The imaging and inspection processing portion 803 acquires an image of each drug m of the drug M which has been photographed by the inspection imaging portion 500 of the conveyance inspection processing portion 400; uses the image and the master data of each drug m contained in the drug prescription data which has been read from the drug database 904; compares and determines an outer size and color information of the drug m, and collates the images in the information of the engraved mark; thereby calculates the similarity between the photographed image and the master data; and determines the inspection result of each drug m on the basis of the calculated similarity, and outputs the inspection result. As the inspection result, for example, three types can be defined which are "normal", "confirmation needed", and "uncertain".

The inspection result of "normal" indicates that the drug inspection apparatus 11 has determined that the drug m of an inspection target is a drug designated by the drug prescription data, and is determined, for example, when the similarity with one master data in the drug master data included in the drug prescription data has exceeded a predetermined threshold value. The inspection result of "confirmation needed" is a part of the inspection result of "normal" (although being estimated to be the drug designated by the drug prescription data); and although it has been determined that there is no problem as the drug inspection apparatus 11 for the drug m of the inspection target, it is recommended that a person (for example, a pharmacist) confirms the result for precaution. The inspection result of "confirmation needed" is determined, for example, when it has been determined that the similarity does not reach a threshold value but the data is similar to one master data of the drug master data contained in the drug prescription data. The inspection result of "uncertain" indicates that the drug inspection apparatus 11 has determined that it is uncertain whether or not the drug m of the inspection target is a drug designated by the drug prescription data, and is determined, for example, when the similarity is low and the drug m is not similar to any master data of the drug contained in the drug prescription data, or when the drug m is similar to a plurality of drug master data. Then, the imaging and inspection processing portion 803 combines the inspection results of the individual drugs m and generates an inspection result of the drug M.

The inspection result processing portion 802 generates a screen for the pharmacist 108 to confirm from the result of the inspection which the imaging and inspection processing portion 803 has implemented for the drug M, and displays the screen on the inspection result display screen 901. In other words, the inspection result processing portion 802 has a function of outputting information which indicates the inspection result of the drug M in the drug inspection apparatus 11.

For information, when the drug inspection apparatus 11 of the present Example is used by being mounted in the inside of the drug packaging apparatus 101 as in the drug inspection apparatus 10 shown in FIG. 2, the host prescribed-drug instruction apparatus 902 is the same as the control portion of the drug packaging apparatus 101. In addition, the inspection control portion 800 is configured so that the inspection result processing portion 802, the imaging and inspection processing portion 803 and the drug operation control portion 804 in the inside can execute the process individually or in parallel under the control of the whole inspection processing portion 801, and thereby can realize a high-speed and high-precision inspection process, realize an inspection process which a pharmacist can easily use, and realize a process which is easily coupled to a host apparatus on software.

In the above, the configuration and functions of the drug inspection apparatus 11 according to Example 1 have been described with reference to FIG. 3 and FIG. 4. Hereinafter, the configurations of the pre-inspection storage portion 200, the transfer processing portion 300, the conveyance inspection processing portion 400, the inspection imaging portion 500, the discharge processing portion 600, and the post-inspection storage portion 700, the operations of the portions for the drug M and a method of controlling the drug operation portion 805 by the drug operation control portion 804 will be described in more detail with reference to the drawings.

Figure 5A:
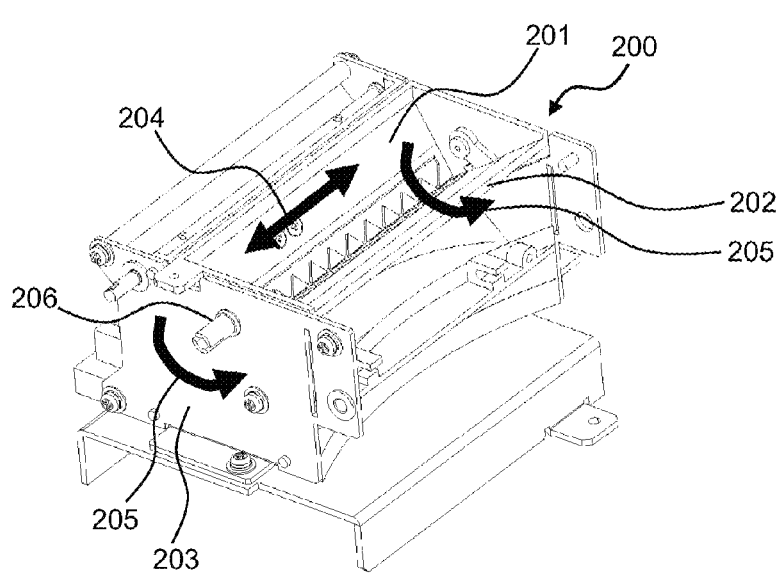
FIG. 5A is a configuration diagram (part 1) of a pre-inspection storage portion 200.
Figure 5B:
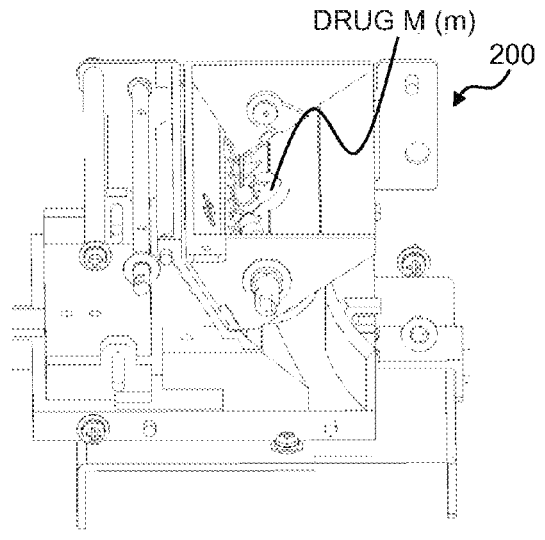
FIG. 5B is a configuration diagram (part 2) of the pre-inspection storage portion 200.
Figure 5C:
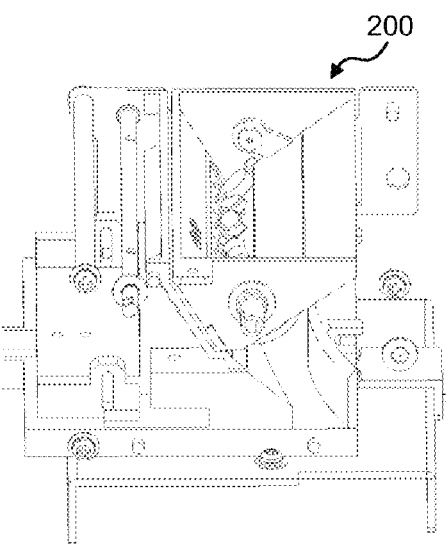
FIG. 5C is a configuration diagram (part 3) of the pre-inspection storage portion 200.
Figure 5D:
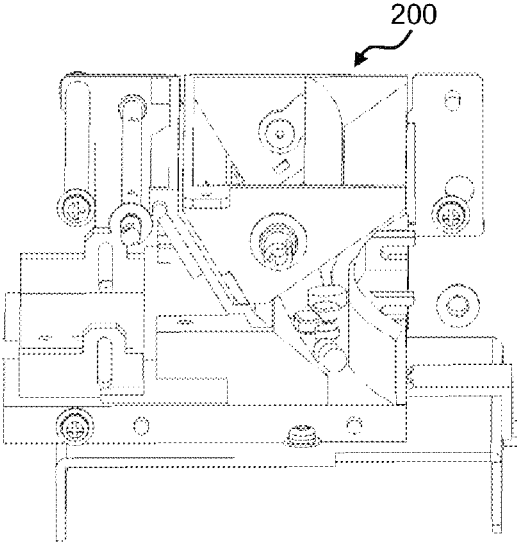
FIG. 5D is a configuration diagram (part 4) of the pre-inspection storage portion 200.

FIG. 5A to FIG. 5D are configuration diagrams (part 1 to part 4) of the pre-inspection storage portion 200. FIG. 5A is a perspective view of the pre-inspection storage portion 200, and FIG. 5B to FIG. 5D show the movement of the drug M in the pre-inspection storage portion 200, in time series.

As shown in FIG. 5A, the pre-inspection storage portion 200 includes a storage case 203, a charge vibration alignment portion 201 that receives the drug M to be charged, and a charge partition plate 202 that is rotatably supported by the charge vibration alignment portion 201, which are each attached to the inside of a storage case 203. The charge vibration alignment portion 201 is vibrated back and forth by an unillustrated driving source in a direction of an arrow 204 by about 5 mm, and thereby spreads the accumulated drugs M. The charge partition plate 202 is a door installed between the charge vibration alignment portion 201 and the transfer processing portion 300; and the charge partition plate 202 is opened by being rotated in a direction of an arrow 205 around a rotary shaft 206 by an unillustrated driving source, and thereby, the drug falls from the charge vibration alignment portion 201.

FIG. 5B shows a state in which a plurality of drugs overlap each other in a state in which the drug M (the plurality of drugs m) has fallen from the charge vibration alignment portion 201. The charge vibration alignment portion 201 and the charge partition plate 202 form a V-shaped valley shape. In the V-shaped valley shape, inclined surfaces forming the V-shaped valley shape are set to be steep inclined surfaces of about 45 degrees so that the individual drugs m falling by the influence of gravity easily spread along the elongated V-shaped valley, and the inclined surfaces are set to be about 100 mm in the longitudinal direction in consideration of the size and the number of the drugs m.

FIG. 5C shows a state in which the plurality of drugs m shown in FIG. 5B are spread by a vibration operation in the direction of the arrow 204. In order to spread the stacked drugs m by the horizontal vibration operation, it is effective to apply different acceleration to each drug. Because of this, a portion of the V-shaped valley surface of the charge vibration alignment portion 201 and the charge partition plate 202 which comes into contact with the drug is formed to be a groove shape, and thereby, it becomes possible to apply a larger acceleration to the drug which has come into contact with the V-shaped groove than the stacked drugs, by the vibration operation in the horizontal direction (in the direction of the arrow 204) by the driving source, and to spread the stacked drugs m at a high speed.

FIG. 5D shows a state in which the drug M has fallen downward by the charge partition plate 202 which is rotated in the direction of the arrow 205 around the rotary shaft 206. In the pre-inspection storage portion 200, the rotary shaft 206 connected to the charge partition plate 202 is arranged above the V-shaped groove, and thereby, when the rotary shaft 206 has been rotated in the direction of the arrow 205, the charge partition plate 202 can be shifted to an opened state at a high speed, from a state of having formed the V-shaped groove with a inclined surface of about 45 degrees by substantially contacting the charge vibration alignment portion 201, in FIG. 5C. As a result, the drugs M held in the spread state on the charge partition plate 202 in FIG. 5C can be reliably dropped at a high operation speed while the spread state is held, as shown in FIG. 5D.

Figure 6A:
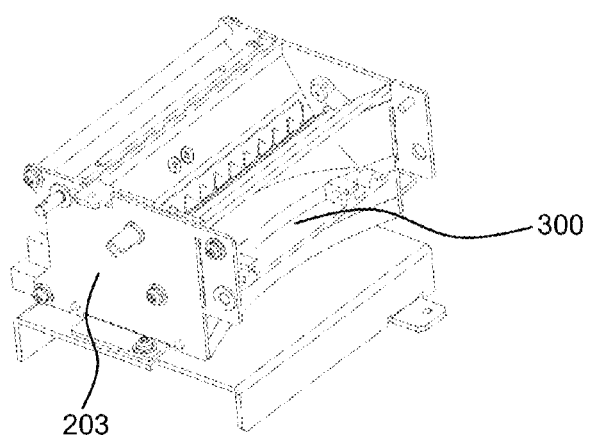
FIG. 6A is a configuration diagram (part 1) of a transfer processing portion 300.
Figure 6B:
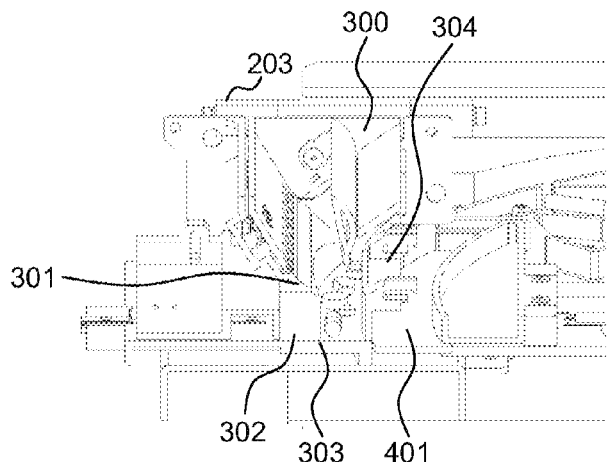
FIG. 6B is a configuration diagram (part 2) of the transfer processing portion 300.

FIG. 6A to FIG. 6E are configuration diagrams (part 1 to part 5) of the transfer processing portion 300. FIG. 6A is a perspective view of the transfer processing portion 300, and FIG. 6B is a cross-sectional view of the transfer processing portion 300. In addition, FIG. 6C to FIG. 6E show the movement of the drug M in the transfer processing portion 300, in time series.

The transfer processing portion 300 is arranged in the inside of the storage case 203 which constitutes the pre-inspection storage portion 200. To be more specific, as shown in FIG. 6A and FIG. 6B, the transfer processing portion 300 is configured to include: a transfer guide 301 for guiding the falling drug M, a transfer push-out alignment portion 303 for holding the drug M having fallen in the spread state; a transfer push-out plate 302 for pushing out the drug M on the transfer push-out alignment portion 303 toward the rotary disc 401 of the next stage; and a transfer portion shutter 304 which is arranged between the transfer push-out plate 302 and the rotary disc 401 and which opens and closes by an vertical operation, each in the inside of the storage case 203.

As shown in FIG. 5C to FIG. 5D, when the drugs M fall from the pre-inspection storage portion 200 in the spread state, the drugs M are guided by the transfer guide 301 and the inclined surface of the transfer push-out plate 302, and a plurality of drugs m are held in the spread state without overlapping in an elongated shape, while the drugs M maintain the spread state on a flat surface partitioned by the transfer portion shutter 304 on an upper surface of the transfer push-out alignment portion 303.

After that, as shown in FIG. 6C, the transfer portion shutter 304 is moved upward to become an opened state, and further, as shown in FIG. 6D, the transfer push-out plate 302 is moved on the transfer push-out alignment portion 303 toward a direction of the transfer portion shutter 304. As a result, the drugs M are pushed out and moved onto the rotary disc 401 while maintaining the spread state. Then, after the drugs M have been pushed out onto the rotary disc 401, the transfer push-out plate 302 is returned to the original position, as shown in FIG. 6E.

Here, the transfer portion shutter 304 is formed into an arc shape so as to be in contact with the circumference of the rotary disc 401, and the tip of the transfer push-out plate 302 is also similarly formed into an arc shape; and thereby, the plurality of drugs m can be pushed out to the rotary disc 401 simultaneously in a state in which the spread state is maintained. In addition, when the drug M is transferred from the transfer guide 301 to the rotary disc 401, if the gap is large or the step is large, the spread state of the drugs is adversely affected, and accordingly, it is preferable to configure the gap in the horizontal direction and the step in a falling direction so as to become minimum within a possible range.

FIG. 7 is a configuration diagram of the conveyance inspection processing portion 400, the discharge processing portion 600 and the post-inspection storage portion 700.

The conveyance inspection processing portion 400 shown in FIG. 7 has the rotary disc 401 having a diameter of about 250 mm, which is continuously rotated horizontally at a constant rotation speed of 15 rpm by an unillustrated drive motor. In the rotary disc 401, the outer circumferential portion of the rotary disc 401 is divided into four sections, and four circumference partition plates 404 (individually, circumference partition plates 404A to 404D) are arranged so as to form the four divided sections; and four inner circumferential guides 403 (individually, inner circumferential guides 403A to 403D) are arranged on the inner circumferential surface of the rotary disc 401, and thereby, a circumference mounting plate 402 (for individual sections, circumference mounting plates 402A to 402D) is formed as an elongated surface having a width of about 20 mm, on which each drug m of the drug M is placed. Thus, the rotary disc 401 rotates on a support frame 406.

The circumference mounting plate 402 uses a material having transparency (transparent body) such as an acrylic plate or a glass plate, and thereby, the drugs m which have been placed on the circumference mounting plate 402 can be imaged from both the upper surface and the lower surface, as will be described later. In addition, the transfer processing portion 300 is arranged above the support frame 406 at a position in contact with the rotary disc 401.

Hereinafter, the conveyance of the drug will be described, which corresponds to the rotation of the rotary disc 401. In order to make this description easier to understand, among the four sections divided on the rotary disc 401, the quadrant including the arranged position of the transfer processing portion 300 shall be referred to as "quadrant 1", and remaining quadrants shall be referred to as "quadrant 2", "quadrant 3" and "quadrant 4" at intervals of 90 degrees, along the downstream side in the rotation direction from the quadrant 1. In addition, in the drawings, the respective members on the previously described rotary disc 401 can be referred to in such forms that reference numerals A to D are attached so as to correspond with the quadrants 1 to 4. For example, a circumference mounting plate 402A corresponds to the circumference mounting plate 402 of the quadrant 1, a circumference mounting plate 402B corresponds to the circumference mounting plate 402 of the quadrant 2, a circumference mounting plate 402C corresponds to the circumference mounting plate 402 of the quadrant 3, and a circumference mounting plate 402D corresponds to the circumference mounting plate 402 of the quadrant 4.

When the four sections divided on the rotary disc 401 are in a state shown in FIG. 7, in the quadrant 1, the transfer portion shutter 304 is opened at the timing when the circumference mounting plate 402A passes through the position facing the transfer portion shutter 304 by the rotation of the rotary disc 401, and the transfer push-out plate 302 is pushed out; and thereby, the drug M is moved onto the circumference mounting plate 402A. In addition, the drug M moved onto the circumference mounting plate 402A is rotated together with the inner circumferential guide 403A and the circumference partition plates 404A and 404D.

For information, in the present description, it is assumed that when the drug M is transferred onto the circumference mounting plate 402A of the quadrant 1, the drugs M have been already placed on the respective circumference mounting plates 402B, 402C and 402D of the other respective quadrants 2, 3 and 4.

At this time, in the quadrant 2, the drug M placed on the transparent circumference mounting plate 402B is conveyed between a rotating inner circumferential guide 403B and a fixed outer circumferential guide 405, and at this time, the inspection imaging portion 500 performs an imaging process which will be described later. Though details will be described later, the inspection imaging portion 500 has a camera 501A and a reflection illumination 502A for taking a picture from above the circumference mounting plate 402 and a camera 501B and a reflection illumination 502B for taking a picture from below the circumference mounting plate 402, which are arranged in the quadrant 2.

On the other hand, in the quadrant 3, the drug M is conveyed in a state of being placed on a circumference mounting plate 402C.

On the other hand, in the quadrant 4, an inner circumferential guide 403D is pushed out toward the outer circumferential direction by an unillustrated movable mechanism which uses a rotary cam mechanism, and thereby, the drug M on a circumference mounting plate 402D is discharged from the rotary disc 401.

As described above, the conveyance inspection processing portion 400 of FIG. 7 executes a series of operations from the transfer to the discharge through the conveyance in parallel at different timings for each quadrant in accordance with the rotation of the rotary disc 401, and thereby, can continuously convey drugs of four drugs M at the maximum at the same time.

An operation after the drug M has been discharged from the conveyance inspection processing portion 400 will be also described while referring to FIG. 7.

As shown in FIG. 7, in the quadrant 4, the discharge processing portion 600 is arranged that receives the drug M which has been discharged from the rotary disc 401. The discharge processing portion 600 is configured to include: a discharge guide 601 that holds the drug M pushed out from the rotary disc 401; and a discharge lever 602 that is operated on the discharge guide 601 in a rotation direction of the rotary disc 401, by an unillustrated driving source. The drug M that has been pushed out from the rotary disc 401 in the quadrant 4 is held by the discharge guide 601 of the discharge processing portion 600, then is pushed out by an operation of the discharge lever 602, and moves to the post-inspection storage portion 700.

The post-inspection storage portion 700 is configured to include: a discharge partition plate 702 that is a plate which holds the drug M pushed out by the discharge lever 602 and moves while being opened and closed in the horizontal direction by an unillustrated driving source; and a storage portion camera that takes an image of the drug M on the discharge partition plate 702. The storage portion camera takes an image indicating that the drug M is stored in the discharge partition plate 702. Then, when the inspection processing of the drug M has been finished, the discharge partition plate 702 of the post-inspection storage portion 700 moves to the opened state, and thereby, the drug M is discharged from the drug inspection apparatus 11; after that, the discharge partition plate 702 is switched to a closed state; and the storage portion camera takes an image of the discharge partition plate 702, and thereby, it is confirmed that the drugs do not remain.

FIG. 8 is a flowchart showing an example of a processing procedure of a control process by the drug operation control portion 804. FIG. 8 shows an operation flow from the time when the drug is charged into the drug inspection apparatus 11 to the time when the drug is aligned, an inspection image of the drug is taken, the drug is inspected, and the drug is discharged. As described previously, the drug operation control portion 804 controls operations of the pre-inspection storage portion 200, the transfer processing portion 300, the conveyance inspection processing portion 400 (including the inspection imaging portion 500), the discharge processing portion 600, and the post-inspection storage portion 700, for the drug M which the drug inspection apparatus 11 has received, according to an operation method which the whole inspection processing portion 801 has determined. Hereinafter, each process shown in the process flow of FIG. 8 will be described, but for the sake of simplicity, the description will be omitted which indicates that a main body of control for each process is the drug operation control portion 804.

According to FIG. 8, firstly, when the inspection of the drug M is started which the drug inspection apparatus 11 has received, the rotation of the rotary disc 401 of the conveyance inspection processing portion 400 starts (step S110).

Then, in a period until the rotation of the rotary disc 401 is stopped in step S130 which will be described later, the drug inspection apparatus 11 (the drug operation control portion 804) performs the alignment, photographing, inspection of the drugs and the like, while conveying the drug M to a predetermined flow path which sequentially passes through the pre-inspection storage portion 200, the transfer processing portion 300, the conveyance inspection processing portion 400, the discharge processing portion 600, and the post-inspection storage portion 700 (step S120). For information, in the step S120, the processes of steps S121 to S129 are executed as will be described below in detail.

Firstly, as having been described in detail with reference to FIG. 5A to FIG. 5D, the drug M is charged into the pre-inspection storage portion 200 (step S121); and the charge vibration alignment portion 201 is vibrated in the pre-inspection storage portion 200, and thereby spreads the drug M (the plurality of drugs m) (step S122).

Furthermore, in the pre-inspection storage portion 200, the drug inspection apparatus 11 opens the charge partition plate 202, and drops the drug M to the transfer processing portion 300 in a state in which drugs are spread (step S123).

Next, as having been described in detail with reference to FIG. 6A to FIG. 6E, the drug inspection apparatus 11 operates the transfer push-out plate 302 of the transfer processing portion 300, and thereby transfers the drug M onto the rotary disc 401 of the conveyance inspection processing portion 400 (step S124).

As described in detail with reference to FIG. 7, the drug M which has been transferred onto the rotary disc 401 (for example, quadrant 1) in step S124 moves as the rotary disc 401 rotates. Then, in the middle of the movement (for example, quadrant 2), the upper and lower surfaces of the drug M are photographed by the camera 501 and the illumination lamp 502 which are arranged in the inspection imaging portion 500 (step S125). After that, when the drug M is moved to the vicinity of the discharge processing portion 600 (for example, quadrant 4) by the rotation of the rotary disc 401, the inner circumferential guide 403 is pushed out toward the outer circumferential direction, and thereby moves the drug M to the discharge processing portion 600 (step S126).

Next, in the discharge processing portion 600, the discharge lever 602 is operated toward the rotation direction of the rotary disc 401, and thereby the drug M is moved to the post-inspection storage portion 700 (step S127). Next, in the post-inspection storage portion 700, the drug M is discharged from the drug inspection apparatus 11 by an opening operation of the discharge partition plate 702 (step S128). Then, after the discharge partition plate 702 has performed the closing operation, it is confirmed that the drug M does not remain in the post-inspection storage portion 700 due to photographing by the storage portion camera (step S129).

The above processes are the detailed processes of step S120. Then, when the processes of steps S121 to S129 are finished and it is confirmed that all the drugs M of the inspection target are discharged from the drug inspection apparatus 11, the drug operation control portion 804 stops the rotation of the rotary disc 401 (step S130), and the inspection of the drugs M is finished.

For information, the above process in step S120 is a process for one time charging of the drug M to the drug inspection apparatus 11. The drug inspection apparatus 11 is configured so as to be also capable of coping with continuous charge of a plurality of drugs M; and when the drugs M are continuously charged, as having been described with the use of the quadrants 1 to 4 in the description of FIG. 7, the process of step S120 corresponding to each charge needs to be executed in parallel.

FIG. 9 is a diagram showing an example of a process transition of the inspection process at the time when a plurality of drugs are continuously charged. In FIG. 9, a plurality of drugs M which are continuously charged are represented as drugs M1 to M7 in an order of being charged, and a process transition of the inspection process for each drug M is shown. For information, the numbers (No.) of [1] to [11] shown in FIG. 9 correspond to the numbers assigned to the respective processes of the inspection process shown in FIG. 8, and in the description of FIG. 9, the respective processes are expressed with the use of the numbers of the above [1] to [11]. In other words, in FIG. 9, the process of step S110 in FIG. 8 is referred to as "process 1", the process of step S121 is referred to as "process 2", and so on; and thus, the process of step S130 is referred to as "process 11". In addition, in FIG. 9, the timing at which the process 2 is started for a drug Mn which is charged as a n-th charge is represented by "time Tn".

According to FIG. 9, for the first drug M1, the process 2 starts at the time T1, and a process 10 ends in the middle between the time T4 and the time T5. In the middle of this operation, an operation of transferring the drug M1 to the rotary disc 401 by the transfer push-out plate 302 in the process 5 is executed in synchronization with the rotational position of the rotary disc 401. Then, at the timing in conjunction with the operation of the process 5, an operation of the process 2 for the next drug M2 is started. Such cooperation of the starts of the operation is the same in a subsequent drug M3 and thereafter.

Here, a difference between the time T2 at which the process 2 for the drug M2 is started and the time T1 is a processing cycle length Ts. The rotary disc 401 is divided into four, and accordingly it is recommended to set a rotation cycle length of the rotary disc 401 to be four times as long as Ts. For a consecutive process of the drug M, for example, at the time T4, the drug inspection apparatus 11 (the drug operation control portion 804) executes the process 6 for the drug M2 while executing the process 9 for the drug M1, executes the process 5 for the drug M3, and executes the process 2 for the drug M4, in parallel. Due to such execution, the drug inspection apparatus 11 can periodically execute the inspection process with respect to the drugs M which are continuously charged, by a concurrent processing control.

Furthermore, in FIG. 9, the drugs M1 to M7 are charged at periodically synchronized timings, but when the timing of charging the drug M is delayed for some reason, for example, when the drug M4 is not charged at the timing of the time T4, the drug inspection apparatus delays the series of inspection processes for the drug M4 by processing cycle length Ts for one charge, and starts the inspection processes at the time T5; and then, can execute the execution of the process 2 to process 10 in synchronization with the processes for other drugs M.

Figure 10A:
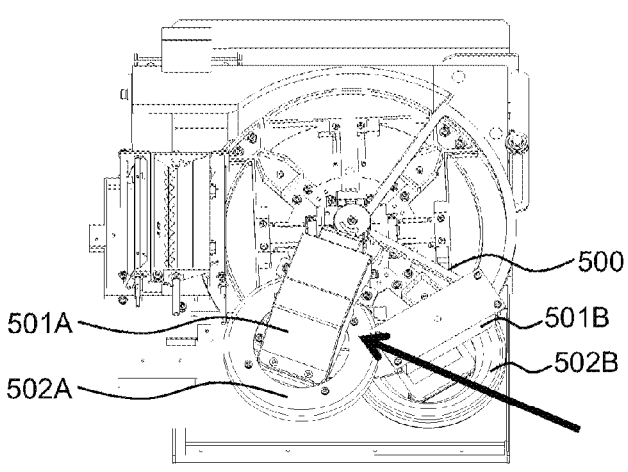
FIG. 10A is a configuration diagram (part 1) of an inspection imaging portion 500.
Figure 10B:
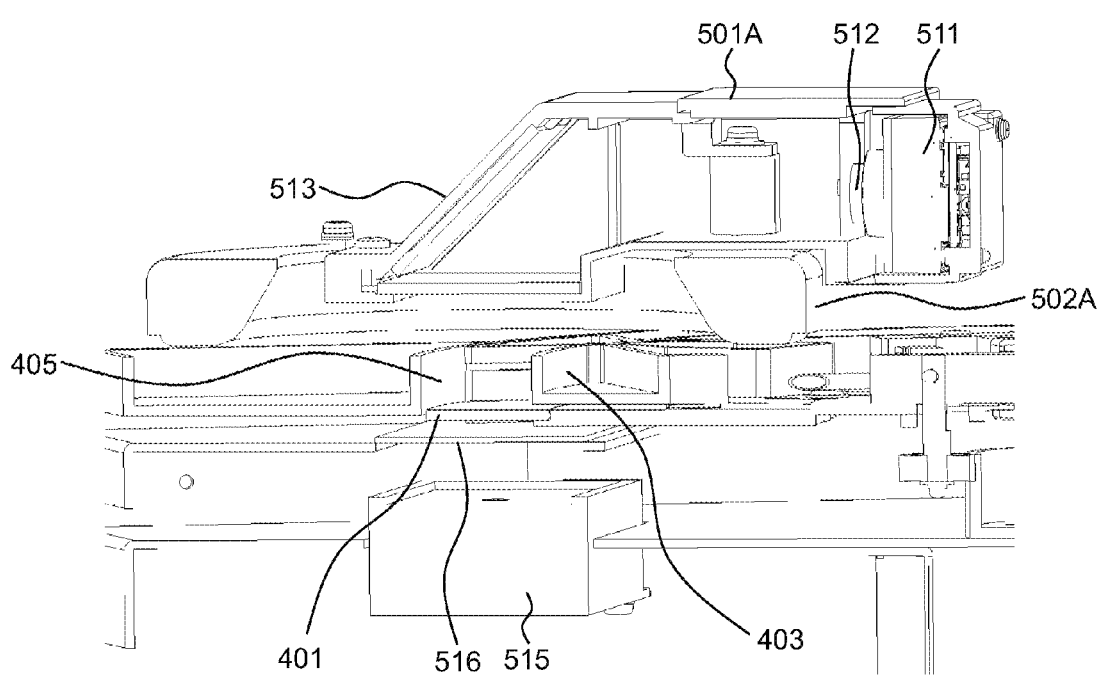
FIG. 10B is a configuration diagram (part 2) of the inspection imaging portion 500.

FIG. 10A and FIG. 10B are configuration diagrams (part 1 and part 2) of the inspection imaging portion 500. FIG. 10A is a top view of the inspection imaging portion 500, and FIG. 10B is a cross-sectional view of the inspection imaging portion 500, which is viewed from the direction of the arrow in FIG. 10A.

The inspection imaging portion 500 arranges the cameras 501 and the illumination lamps 502 on the upper side and the lower side of the circumference mounting plate 402 in the quadrant 2, respectively; and when the conveyance inspection processing portion 400 conveys the drugs M held in the spread state on the circumference mounting plate 402 in a counterclockwise direction at a constant speed, continuously takes a picture of the drug M at a constant interval in the order of the camera 501 in the upper side (upper camera 501A) and the camera 501 in the lower side (lower camera 501B). When the drugs M1, M2, M3 and M4 are continuously charged, the inspection imaging portion 500 performs an imaging process for the drugs M1, M2, M3 and M4 which are held on the circumference mounting plates 402A, 402B, 402C and 402D shown in FIG. 7, when the respective drugs are conveyed in the quadrant 2.

As shown in FIG. 10A, the upper camera 501A is arranged on the upper side of the circumference mounting plate 402, whereas the lower camera 501B is arranged on the lower side of the circumference mounting plate 402, and takes an image of the drug M through the circumference mounting plate 402 made of a transparent material. The upper camera 501A and the lower camera 501B are arranged to be optically vertically symmetrical by being shifted by a predetermined amount in the rotation direction of the rotary disc 401, and thus it is possible to achieve commonality of the imaging process in the inspection process.

Both the upper camera 501A and the lower camera 501B have the camera elements 511 and the lenses 512 arranged so as to be capable of taking a picture without causing distortion in four directions in the imaging area of 25 to 30 mm, in consideration of a widthwise size (about 20 mm) of the elongated circumference mounting plate 402 and the size of the drug M; and in order to minimize the mounting size, have such a structure of an L-shaped optical path as to take the image of the drug M, which has been reflected by a mirror 513.

Both the reflection illumination 502A which is arranged for photographing by the upper camera 501A and the reflection illumination 502B which is arranged for photographing by the lower camera 501B employ such an annular illumination lamp as to be capable of illuminating the individual drugs m from an oblique side, in order to take a clear picture of the images (particularly, marks or engraved marks on the surfaces) of the drugs. In addition, in order to reduce unevenness in the directionality of illumination lamp, it is desirable not only to make the circumference mounting plate 402 transparent, but also to use a transparent material for the inner circumferential surfaces of the inner circumferential guide 403 and the outer circumferential guide 405.

In addition, in the present Example, the inspection imaging portion 500 contains imaging for an outer shape by transmission illumination, so as to enable imaging for a special drug such as a transparent tablet. To be specific, the inspection imaging portion 500 arranges a transmission illumination 515 and a semi-transmission sheet 516 on the opposite side of the upper camera 501A of the circumference mounting plate 402, in other words, on the back surface side of the drug m, in a form of being combined with the upper camera 501A. In addition, similarly, the transmission illumination 515 and the semi-transmission sheet 516 are arranged in a form of being combined with the lower camera 501B.

Figure 11:
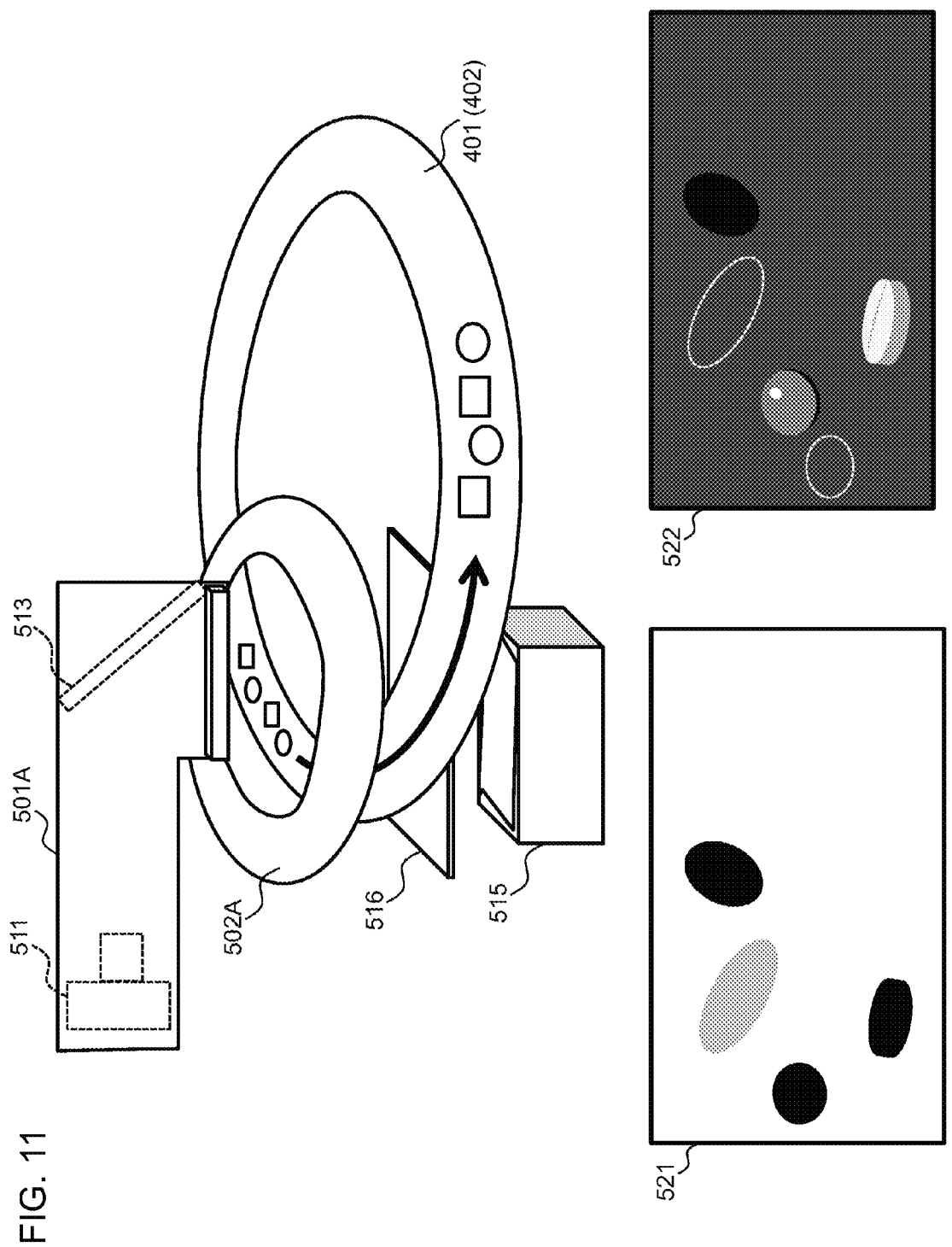
FIG. 11 is a schematic diagram for describing an imaging operation by an inspection imaging portion 500.

FIG. 11 is a schematic diagram for describing an imaging operation by the inspection imaging portion 500. For information, FIG. 11 shows the arrangement relationship of the optical system configuration such as the camera and the illumination lamp, in the case of the upper camera 501A which is an example, but the case of the lower camera 501B may also be considered in the same way. In the inspection imaging portion 500, an operation of taking a picture of the drug by the camera 501 while alternately switching the transmission illumination 515 and the reflection illumination 502 will be described below with reference to FIG. 11.

Firstly, at the time of taking a picture of the upper side, the upper camera 501A turns on the reflection illumination 502A which is arranged around the periphery, and takes a picture of the drug on the rotary disc 401 (the circumference mounting plate 402) from the top face; and thereby acquires the forward light image 522 in which a surface of the drug is imaged. At this time, the transmission illumination 515 is turned off.

Next, at the time of taking a picture of the lower side, the transmission illumination 515 below the semi-transmission sheet 516 is turned on, and the upper camera 501A takes a picture of the drug M from the top face in such a state that the drug on the rotary disc 401 (the circumference mounting plate 402) is illuminated from the lower side through the semi-transmission sheet 516 and the rotary disc 401; and thereby acquires a backlight image 521 in which an outer shape (shadow picture) of the drug is imaged. At this time, the reflection illumination 502A is turned off. The semi-transmission sheet 516 is a sheet member that does not reflect the illumination light emitted from the reflection illumination 502A, and transmits the illumination light emitted from the transmission illumination 515; and may be, for example, a black attenuation filter. In addition, as will be described later, it is preferable that a surface of the semi-transmission sheet 516 on the side of the circumference mounting plate 402 is black or a color similar to black.

As described above, the upper camera 501A alternately repeats the upper side imaging by the transmission light and the lower side imaging by the reflection light, and acquires the forward light image 522 and the backlight image 521. As a result, images can be acquired which are color images (forward light images 522) and outer shape images (backlight imaged 521) of the shadow pictures of both surfaces of the upper side and lower side of the drug. For information, the lower camera 501B also takes pictures of the upper side and the lower side, in the same procedure as the upper camera 501A (however, the upper and lower sides are reversed).

For information, when the upper side imaging and the lower side imaging are repeated, it is possible to acquire the backlight image 521 and the forward light image 522 that have been obtained by continuous imaging of the drug M which revolves and moves, by continuously imaging camera images in synchronization with the switching, while periodically switching the light for illuminating the drug between the reflection light and the transmission light, by periodically switching the illumination lamp to be turned on (the reflection illumination 502 and the transmission illumination 515) in several 10 ms cycles. In addition, as having been previously described, the upper camera 501A and the lower camera 501B are arranged so as to deviate in the rotation direction of the rotary disc 401 by a predetermined amount, and accordingly a difference in time periods occurs between the photographed images of the drug M, which have been photographed by both cameras. Accordingly, when the upper side imaging and the lower side imaging are performed by the upper camera 501A and the lower camera 501B, respectively, the photographed images at different time periods can be acquired in the forward light image 522 and the backlight image 521, respectively, and an effect of improving the identification accuracy of the drug can be expected.

The imaging and inspection processing portion 803 compares the image cut out for each drug m (hereinafter, referred to as a drug image) from the images of the drug M, which have been imaged by the upper camera 501A and the lower camera 501B, with information such as a color, outer shape and engraved mark of the master data of each drug m, which has been registered in advance, and determines which evaluation among "normal", "confirmation needed" and "uncertain" the inspection result of the drug corresponds to for each drug m, on the basis of the comparison result. For information, a detailed processing procedure of a process (inspection result determination process) in which the imaging and inspection processing portion 803 determines the inspection result of the drug m will be described later with reference to FIG. 13 and FIG. 14.

In the inspection imaging portion 500 described above, the transmission illumination 515 and the black semi-transmission sheet 516 are arranged close to each other, and thereby, when the drug is photographed by the transmission light (for example, lower side photographing by the upper camera 501A), a white color which is a color of the illumination light of the transmission illumination 515 transmits through the semi-transmission sheet 516 and the rotary disc 401 (the circumference mounting plate 402) to become a background color of the drug m, and the drug m itself is photographed in a state of a shadow picture of black or gray. In the backlight image 521 photographed in this way, as shown in FIG. 11, the outline of the transparent body or the dark drug is easily seen.

On the other hand, in the photographing by the reflection light (for example, the upper side photographing by the upper camera 501A), the light by the reflection illumination 502 does not transmit through the semi-transmission sheet 516, because the reflection illumination 502 and the semi-transmission sheet 516 are separated from each other, and the black color of the surface of the semi-transmission sheet 516 becomes a background color of the drug m. When the background color of the forward light image 522 is black in this way, the photographed drugs m are easily identified, because many of the drugs m are whitish. In addition, as having been previously described, in order to take a clear picture of the shadow of the mark or engraved mark on the surface of the drug m, the reflection illumination 502 illuminates the drug m from an oblique side surface.

In this way, the inspection imaging portion 500 acquires the inspection image by switching the illumination lamp, and thereby, the imaging and inspection processing portion 803 can be used for the purpose of inspecting the drug m with the use of an easy-to-see image, or tracking the movement of each of the drugs m and cutting out the image individually. A black attenuation filter may be used as the semi-transmission sheet 516.

As having been described above, the drug inspection apparatus 11 according to the present Example takes an inspection image on the way of aligning and conveying the received drug M (a plurality of drugs m), analyzes the image, thereby performs an inspection on each drug m included in the drug M, and can obtain an inspection result for the drug M by combining inspection results for the individual drugs m. The inspection result obtained in this way is displayed on an inspection result display screen 901 by the inspection result processing portion 802, and is presented to the pharmacist 108.

Then, the pharmacist 108 operates the inspection result display screen 901 which displays the inspection results, checks whether the packaged drugs M1, M2 and so on match the prescription information (drug prescription data), corrects the inspection result if the inspection result is uncertain or is different from the prescription information, and completes the drug inspection. Hereinafter, the output of screen which is displayed on the inspection result display screen and an operation by the pharmacist will be described with reference to FIG. 12 to FIG. 22.

FIG. 12 is a diagram showing an example of the initial screen of the inspection selection. The initial screen of the inspection selection is a screen which is operated when the pharmacist selects the drug M to be inspected, and a specific example thereof is shown in FIG. 12.

The initial screen of the inspection selection 1500 shown in FIG. 12 displays: a button 1501 for selecting the drug M; a prescription ID 1502 which becomes key information for selection; a patient name 1503; a packaging machine ID 1504; a total number of sachets 1505 which are included in the prescription information of each drug M; the number of dosage types 1506, which indicates the number of types of time point dosage of medication such as "after breakfast"

and "before going to bed"; an inspection level 1507; an inspection result 1508; and a pharmacist inspection 1509.

The inspection level 1507 is information for distinguishing between a case where the drug m which is an individual tablet included in the drug M is a drug which needs strict inspection such as a high-risk drug, and a case where the drug m is a normal drug, and it is also considered that strict drug inspection is operated by limiting a person who should inspect (in such a way that a pharmacist needs inspection, a plurality of pharmacists needs inspection and even a clerk can inspect) according to the level.

In the inspection result 1508, three types of "normal", "confirmation needed", and "uncertain" are defined, as the inspection result for the individual drug m by the drug inspection apparatus 11, and the breakdown numbers in the total number of sachets are displayed for each of prescription IDs 1502. Here, "normal" means a case in which the tablet can be identified and inspected to follow the content designated in the prescription information (drug prescription data); "confirmation needed" means a case in which the tablet can be sorted according to the content designated in the prescription information (though the drug inspection apparatus 11 determines that there is no problem) but the similarity by comparison and identification with the tablet master data is low, and confirmation by the pharmacist is desirable; and "uncertain" means a case in which the tablet cannot be even sorted according to the content designated in the prescription information.

Hereinafter, two examples of the processing procedure will be described with reference to FIG. 13 and FIG. 14, regarding the "inspection result determination process" in which the imaging and inspection processing portion 803 of the drug inspection apparatus 11 determines the inspection result ("normal", "confirmation needed", or "uncertain") of the individual drug m.

Figure 13:
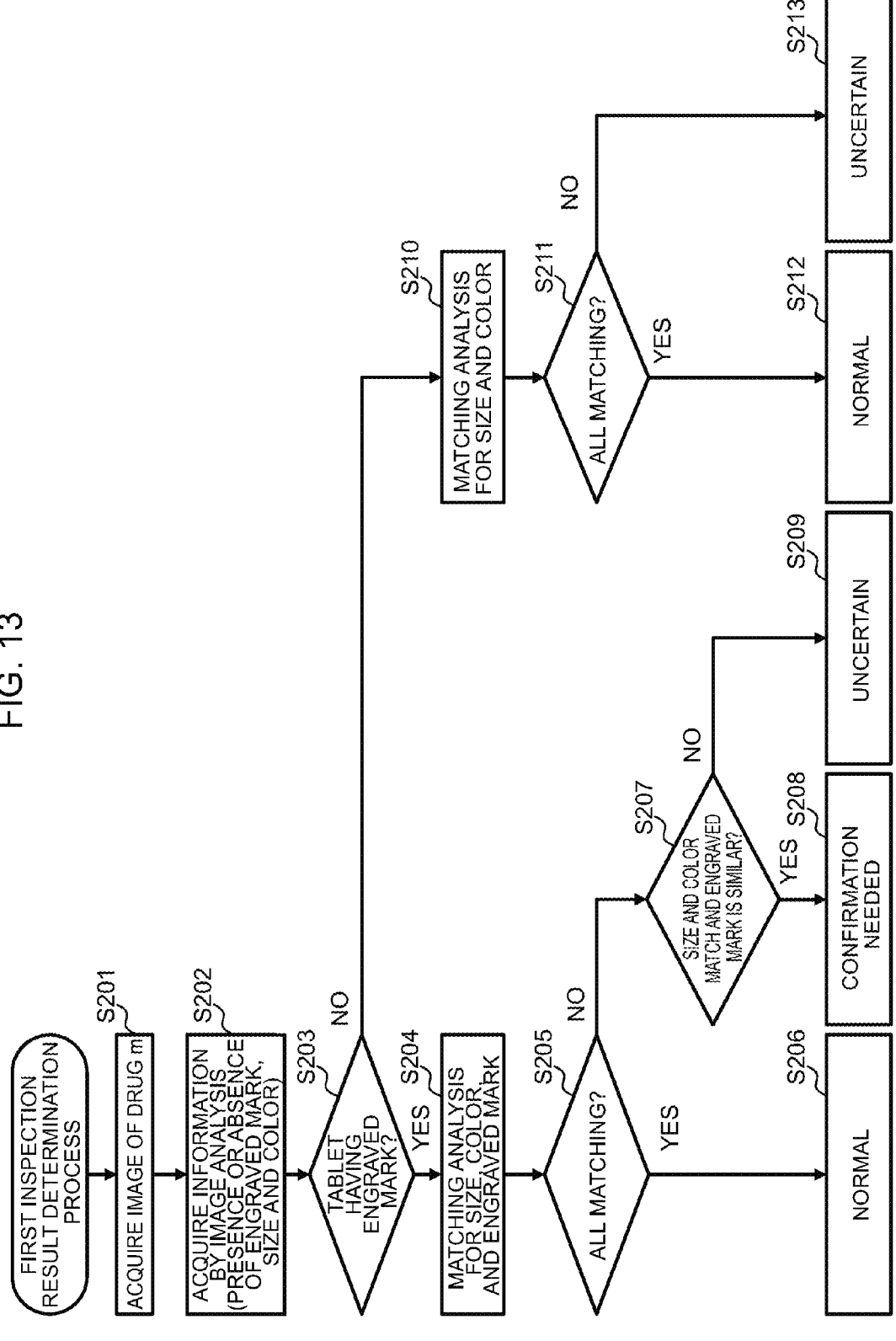
FIG. 13 is a diagram showing an example of a first processing procedure of an inspection result determination process.

FIG. 13 is a diagram showing an example of a first processing procedure of the inspection result determination process. The process shown in FIG. 13 is an example of the inspection result determination process of inspecting drugs in consideration of the engraved marks of the tablets, and is referred to as the first inspection result determination process.

According to FIG. 13, the imaging and inspection processing portion 803 first acquires an image (drug image) of the individual drug m from the images of the drug M, which have been imaged by the upper camera 501A and the lower camera 501B (step S201). Then, the processes in step S202 and the subsequent steps are performed for each individual drug m. For information, the plurality of drugs m contained in the drug M are drugs designated by the drug prescription data, and master data is prepared for each drug.

Next, the imaging and inspection processing portion 803 performs an image analysis on the drug image which has been acquired in step S201, and acquires information which indicates the presence or absence of the engraved mark, size information and color information, for the drug m of the inspection target which is seen in the drug image (step S202).

The information which indicates the presence or absence of the engraved mark is information obtained by the analysis of the presence or absence of the engraved mark in the drug m of the inspection target, and is different from information (information of the engraved mark that will be described later) which indicates the content of the engraved mark (a character string including a number, or the like). In other words, in step S202, the information of the engraved mark may not be acquired. For information, in the present embodiment, the process is performed while the engraved mark of the tablet is focused, but a process may be performed also on a drug other than the tablet (for example, a capsule and the like) in accordance with the presence or absence of the engraved mark in the same way.

The size information is information which indicates an outer shape (size) of the drug m of the inspection target. Specifically, the size information is, for example, a vertical or horizontal length, an aspect ratio, an area, a perimeter, and the like. The color information is information which indicates a color of the drug m of the inspection target. Specifically, the color information is, for example, an average color of the entire drug, the number of colors included in the drug, and the like.

Next, the imaging and inspection processing portion 803 determines whether or not the drug m of the inspection target is a tablet having an engraved mark, on the basis of the information which has been acquired in step S202 and indicates the presence or absence of the engraved mark. (Alternatively, the imaging and inspection processing portion 803 may refer to the master data of the drug m of the inspection target.) (step S203).

In a case where the drug m of the inspection target is a tablet having an engraved mark in step S203 (YES in step S203), the imaging and inspection processing portion 803 additionally acquires the information of the engraved mark of the drug m by the image analysis of the drug image, then collates the size information and the color information which have been acquired in step S202, with the master data of the drug m, and thereby analyzes whether the engraved mark, the size and the color matches the master data, respectively (step S204). For information, the "match" in the first and second inspection result determination processes means that the matching rate of two pieces of information (information acquired from image analysis and master data) to be collated exceeds a predetermined threshold value (first threshold value). The calculation of the matching rate in the collation may be performed with the use of a known technique of an image analysis, and accordingly, a detailed description thereof will be omitted.

Next, the imaging and inspection processing portion 803 determines whether or not all of the engraved marks, the sizes and the colors match with the master data, on the basis of the analysis result of step S204 (step S205). When a positive result is obtained in step S205 (YES in step S205), the imaging and inspection processing portion 803 determines that the inspection result of the drug m of the inspection target is "normal" (step S206), and finishes the inspection result determination process.

If a positive result is not obtained in step S205, in other words, if at least some of the engraved mark, the size and the color does not match (NO in step S205), the imaging and inspection processing portion 803 confirms whether or not the size and the color match and only the engraved mark is similar (step S207). For information, a phrase "engraved mark has been similar" indicates that the information of the engraved mark in the photographed image has not matched with the master data of the drug m of the inspection target (or further, that the information has been similar to the master data). Specifically, for example, when the matching rate between the information of the engraved mark and the master data is less than a first threshold value (which is a threshold value defined as a determination criterion for matching), the information of the engraved mark and the master data are determined to be similar (unmatching). For information, when it is desired that the unmatched data are not determined to be "similar", but a degree of similarity is desired to be limited, a second threshold value or the like may be used, which will be described later.

Then, when a positive result has been obtained in step S207 (YES in step S207), the imaging and inspection processing portion 803 determines that the inspection result of the drug m of the inspection target is "confirmation needed" (step S208), and finishes the inspection result determination process. On the other hand, when a positive result has not been obtained in step S207 (NO in step S207), the imaging and inspection processing portion 803 determines that the inspection result of the drug m of the inspection target is "uncertain" (step S209), and finishes the inspection result determination process.

In addition, in a case where the drug m of the inspection target is not a tablet having an engraved mark in step S203 (NO in step S203), the imaging and inspection processing portion 803 collates the size information and the color information which have been acquired in step S202 with the master data of the image m, and thereby analyzes whether or not the size and the color match the master data, respectively (step S210).

Then, in the case where as a result of the analysis in step S210, both the size and the color match (YES in step S210), the imaging and inspection processing portion 803 determines that the inspection result of the drug m of the inspection target is "normal" (step S212), and finishes the inspection result determination process. On the other hand, in a case where at least one of the size and the color does not match with the master data in the determination of step S210 (NO in step S210), the imaging and inspection processing portion 803 determines that the inspection result of the drug m of the inspection target is "uncertain" (step S213), and finishes the inspection result determination process.

As in the above, the first inspection result determination process analyzes and acquires the information on the size and the color for the drug images of all the drugs m, which have been cut out from the captured image of the drug M, and analyzes and acquires the information of the engraved mark only when the drug m is a tablet having the engraved mark. There are various types in the tablets including: not only tablets in which a mark is not engraved at all; but also tablets which have the engraved mark but on which the letters are small; tablets which are difficult to see because marks are concave; and tablets which are difficult to observe because there is the engraved mark on the surface of a capsule shape, a cylindrical shape or a spherical shape. Because of this, the first inspection result determination process is classified into the case where the information of the engraved mark is acquired and the case where the information of the engraved mark is not acquired, after having analyzed the presence or absence of the engraved mark, from the information of the image acquired in step S202 immediately after the start of the process (step S203); and then, the inspection result determination method has been divided. According to the first inspection result determination process, the image analysis relating to the information of the engraved mark is not performed on the tablets for which it is unnecessary to determine whether or not the engraved mark match, and accordingly, an effect of shortening the inspection time period can be expected.

In addition, according to the first inspection result determination process, not only tablets having engraved marks are classified into "normal" or "uncertain," but also such a new classification becomes possible as "confirmation needed", in a case where the matching rate of the engraved mark is insufficient, and thereby the pharmacist can distinguish between tablets which need reconfirmation of only a portion of the engraved mark (inspection result is "confirmation needed") and tablets for which it needs to be confirmed whether or not the tablet type is correct (inspection result is "uncertain"), which enables an efficient work.

For information, as a modified example of the first inspection result determination process, a processing procedure may also be adopted in which the information of the engraved mark is also acquired in the image analysis in step S202, and the information of the engraved mark is not acquired in step S204. In the case of such a modified example, the image analysis of the information of the engraved mark is performed on all the drug images, and accordingly there is a concern that the inspection time period may become long, but the number of times of calling the program or the like for performing the image analysis is reduced, and thereby, an effect of simplifying the internal processing is obtained.

As a modified example of the step S207 in which the uncertainty of the engraved mark is confirmed, the imaging and inspection processing portion 803 may also be configured to set a second threshold value lower than the first threshold value as a criterion for determining whether the information of the engraved mark in the photographed image definitely does not match the master data, and determine that only in the case where the matching rate between the information of the engraved mark and the master data is equal to or larger than a second threshold value and is less than the first threshold value, the engraved mark is similar (in the case where the matching rate is less than the second threshold value, the imaging and inspection processing portion 803 determines to be NO in step S207). Alternatively, the imaging and inspection processing portion 803 may also be configured not to use the second threshold value, but to determine that the engraved mark is similar, in the case where the matching rate between the information of the engraved mark and the master data is within 90% of the first threshold value. When these modified examples are adopted, the imaging and inspection processing portion 803 can determine the level to be similar in which the engraved mark shown in the drug image matches the engraved mark of the master data to some extent but cannot be said to surely match, and determine the inspection result to be "confirmation needed" in the subsequent step S208, except for the case where the engraved mark shown in the drug image is clearly different from the engraved mark of the master data (in other words, the case where the engraved mark is clearly unmatching). As a result, the drug inspection apparatus 11 can narrow down the cases that need to be checked by the pharmacist, while maintaining the high accuracy of the inspection.

Figure 14:
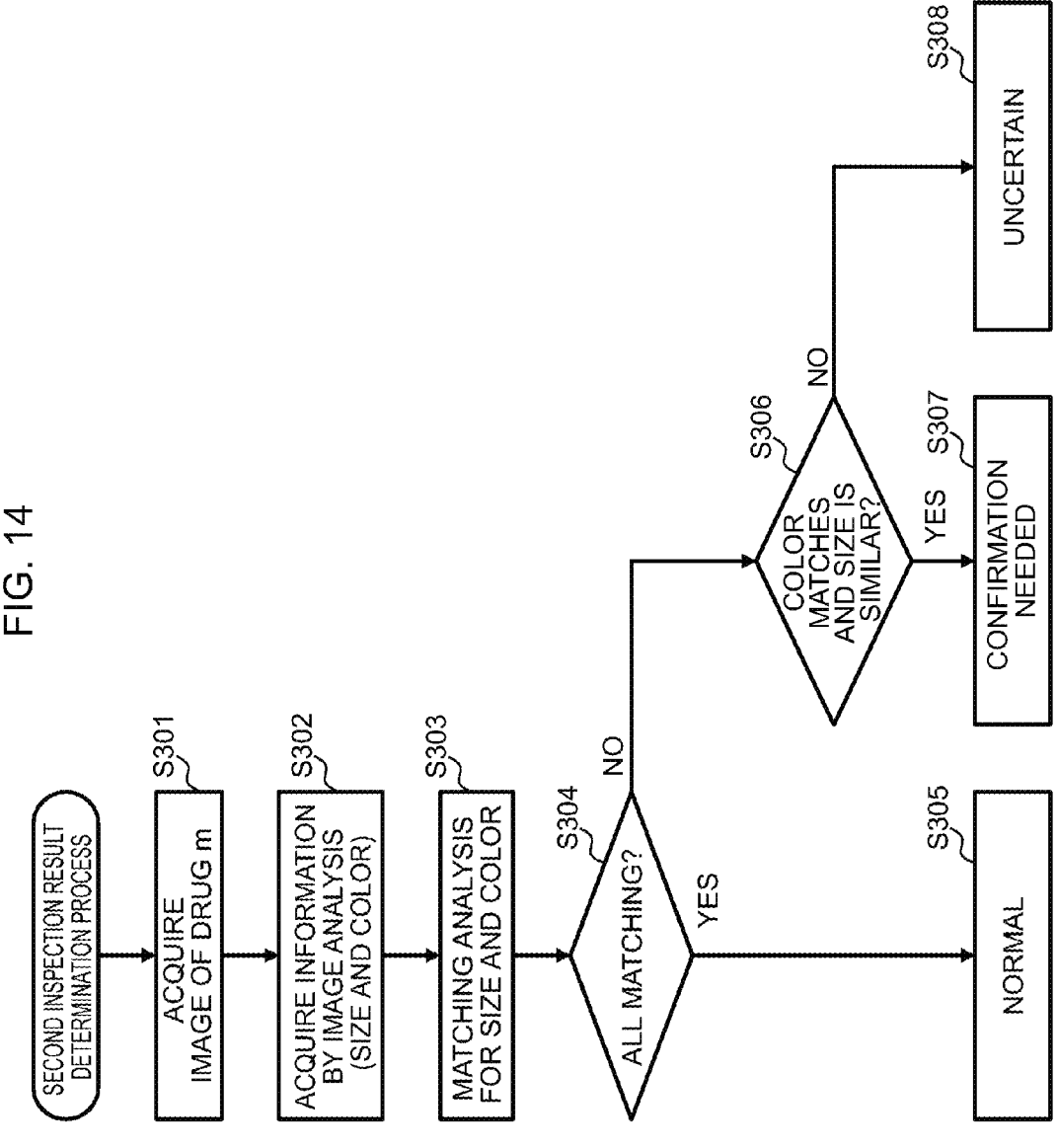
FIG. 14 is a diagram showing an example of a second processing procedure of the inspection result determination process.

FIG. 14 is a diagram showing an example of a second processing procedure of the inspection result determination process. The process shown in FIG. 14 is one example of an inspection result determination process which performs the inspection of drugs without considering the engraved mark of the tablet, and is referred to as a second inspection result determination process. The second inspection result determination process shown in FIG. 14 is different from the first inspection result determination process shown in FIG. 13 in a point that the second inspection result determination process does not analyze and acquire the information of the engraved mark from the drug image.

According to FIG. 14, the imaging and inspection processing portion 803 first acquires images (drug images) of the individual drugs m from the image of the drug M that has been imaged by the upper camera 501A and the lower camera 501B (step S301). Then, the process in step S302 and the subsequent steps are performed for each of individual drugs m. For information, the plurality of drugs m contained in the drug M are drugs designated by the drug prescription data, and master data of each drug is prepared. Step S301 is the same as step S201 in FIG. 13.

Next, the imaging and inspection processing portion 803 performs the image analysis on the drug image which has been acquired in step S301, and thereby acquires size information and color information of the drug m of the inspection target, which is seen in the drug image (step S302).

Next, the imaging and inspection processing portion 803 collates the size information and the color information which have been acquired in step S302 with the master data of the drug m, and analyzes whether or not the size and the color match the master data, respectively (step S303).

Next, the imaging and inspection processing portion 803 determines whether or not all the sizes and colors match, on the basis of the analysis result in step S303 (step S304). In the case where a positive result has been obtained in step S304 (YES in step S304), the imaging and inspection processing portion 803 determines that the inspection result of the drug m of the inspection target is "normal" (step S305), and finishes the inspection result determination process.

In a case where a positive result has not been obtained in step S304, in other words, at least one of the size and the color does not match (NO in step S304), the imaging and inspection processing portion 803 determines whether or not the color matches and the size is similar (step S306). It is acceptable, for example, to set a second threshold value lower than the first threshold value (determination criterion for matching) as a criterion for determining that the size is completely unmatching, and determine "whether or not the size is similar" to be that the size is similar, only in the case where the matching rate of the size information with the master data is equal to or larger than the second threshold value and is less than the first threshold value. (In the case where the matching rate is less than the second threshold value, the size is not regarded as being similar, and it is determined to be NO in step S306.)

Then, in the case where a positive result has been obtained in step S306 (YES in step S306), the imaging and inspection processing portion 803 determines that the inspection result of the drug m of the inspection target is "confirmation needed" (step S307), and finishes the inspection result determination process. On the other hand, when a positive result has not been obtained in step S306 (NO in step S306), the imaging and inspection processing portion 803 determines that the inspection result of the drug m of the inspection target is "uncertain" (step S308), and finishes the inspection result determination process.

As in the above, the second inspection result determination process does not acquire the information of the engraved mark; and thereby the determination process is easy and the effect of shortening the processing time period can also be expected. By the way, in the case where only the matching of the size and the color is simply collated with the master data in the inspection of the drug m, it is necessary for a person (pharmacist) to reconfirm the drug which is difficult to be identified, and it is assumed that the frequency of the reconfirmation increases. Because of this, in the second inspection result determination process, in the case where at least one of the size information and the color information does not match the master data (NO in step S304), the imaging and inspection processing portion 803 does not determine that all the inspection results are "uncertain", but determines whether or not the color information matches and the size information is similar in step S306, and thereby, adds a case in which the inspection result is "confirmation needed". The condition that the size information is similar has been defined to be that the matching rate is equal to or larger than the second threshold value and is less than the first threshold value in the above description, but may be defined as, for example, a case where the matching rate between the size information and the master data is within 90% of the first threshold value. According to such a second inspection result determination process, the inspection result is divided into "confirmation needed" and "uncertain", and thereby, the pharmacist can distinguish between a drug (inspection result is "confirmation needed") for which only the size (shape) is to be reconfirmed and a drug (inspection result is "uncertain") for which it needs to be confirmed whether or not the drug type is correct, which enables the efficient work.

In addition, in the second inspection result determination process described above, the similarity of the size information has been adopted as a determination condition in step S306, but in a modified example, it is acceptable to adopt the similarity of the color information as the determination condition. It can be assumed that the color of the drug changes to some extent depending on the degree of illumination by light, the position of the shadow, or the like; and by adopting the inspection result determination process of such a modified example, it is possible to determine that the fluctuation of the color in the drug image is the inspection result of "confirmation needed", which enable an assistance of visual observation by the pharmacist.

In the above, the first and second inspection result determination processes have been described, but which inspection result determination process is executed in the drug inspection apparatus 11 may be set according to a hardware configuration of the drug inspection apparatus 11, and when the hardware configuration satisfies a sufficient condition, may be possible to be arbitrarily set by the user. The condition based on the hardware configuration includes, for example, a case where the resolution of the camera 501 is not so sufficient as to be capable of identifying the engraved mark, and in this case, it is preferable to execute the second inspection result determination process. Due to the second inspection result determination process being executed, even in the case of the hardware configuration which cannot identify the engraved mark, it becomes possible to determine the inspection result of "confirmation needed". In addition, in the case where the user can set the process, such an implementation is considered, for example, to provide a normal mode and a specific mode which enhances a processing speed, execute the first inspection result determination process in the normal mode, and execute the second inspection result determination process in the specific mode.

In addition, the inspection result determination process which is executed by the drug inspection apparatus 11 according to the present embodiment is not limited to the examples of the processing procedure shown in FIG. 13 or FIG. 14, and the processing procedure can also be executed, for example, which is configured to set the inspection result to be any one of "normal" or "uncertain", and not to output the inspection result of "confirmation needed". In this case, specifically, for example, when the determination result is determined to be NO in step S205 of FIG. 13 or step S304 of FIG. 14, a further determination process (steps S207 and S306) may not be performed, but the determination result may be determined as "uncertain".

In the above description, it has been described that the information on the color, the size and the engraved mark is acquired by the image analysis on the basis of the drug image of the drugs m which have been cut out, as the identification information peculiar to the tablet, but the present embodiment is not limited thereto. As other methods, it is also acceptable, for example, to acquire information on the shape of the drug (tablet) such as a circle, an ellipse, a barrel shape, a triangle, a quadrangle, a pentagon, and a degree of circularity, or to acquire information on the presence or absence of gloss. Alternatively, it is also acceptable to acquire information concerning the type of the drug such as a plain tablet, a sugar-coated tablet, a capsule, or a soft capsule.

In addition, when the information of the engraved mark, which has been acquired from the drug image, is collated with the master data, and the matching rate is calculated, it is acceptable to adopt a method of calculating the matching rate as the image of the engraved mark portion, or to calculate the matching rate as the character, after having performed character recognition of recognizing the character from the image of the engraved mark portion. Alternatively, it is acceptable to perform both of these. By appropriate adoption of these, it can be expected that the inspection function of the drug inspection apparatus 11 is further enhanced.

The description will return to the initial screen of the inspection selection 1500 shown in FIG. 12.

In the pharmacist inspection 1509, information such as "completed" or "uncompleted" is displayed as a status indicating whether or not the inspection by the pharmacist has been completed for each drug M.

The pharmacist views the initial screen of the inspection selection 1500, selects a prescription ID (the drug M to be inspected) to be handled (for example, selects the first record 1510), presses the button 1520, and thereby displays an inspection process screen for the selected prescription ID (the drug M to be inspected).

FIG. 15 to FIG. 21 show specific examples (first to seventh examples) of the inspection process screen. The features of the respective inspection process screen examples will be described in detail below.

FIG. 15 is a diagram showing one example (first example) of the inspection process screen. The inspection process screen 1600 shown in FIG. 15 is a specific example of the inspection process screen in the case where all the inspection results by the drug inspection apparatus 11 for the drug M1 are "normal" and there is no drug (tablet) m of "confirmation needed" or "uncertain".

The inspection process screen 1600 displays information 1601 such as a prescription ID of the drug M1, a patient name and an inspected packaging machine ID, and then, displays a list of photographed images of individual drugs (tablets) m contained in the drug M1. This list display is in a table format which shows the drug names of the tablets m1 to m5 in each row and the number of prescription days which have been prescribed in each column, and displays the time point dosage in a tab 1602.

The inspection process screen 1600 displays the tablet images photographed by the drug inspection apparatus 11 in a state of being arranged for the number of days for each individual tablet according to the inspection result of the apparatus, and thereby, the pharmacist can confirm that the wrong tablet is not contained, at a glance. The pharmacist views the inspection process screen 1600, confirms that types and amounts of tablets of all the packaged individual drugs m contained in the drug M1 are correct, then presses the inspection result settlement button 1603, and thereby, can complete the inspection of the drug M1 by the pharmacist. If the pharmacist has determined that the detailed confirmation is necessary for the individual drugs (for example, the tablet m1), it is also possible for the pharmacist to proceed with the pharmacist inspection, by displaying an inspection correction screen of FIG. 22, which will be described later, and visually comparing the displays in which the master images of the tablet m1 and the images photographed by the apparatus are arranged.

FIG. 16 to FIG. 21 are diagrams showing other examples (second to seventh examples) of the inspection process screen. The inspection process screens shown in FIG. 16 to FIG. 21 are specific examples of the inspection process screens in the case where the inspection result by the drug inspection apparatus 11 for the drug M2 contains not only the drugs (tablets) m of "normal" but also the drugs of "uncertain" or "confirmation needed"; and in each example, the screen display method in the case where a tablet of "uncertain" or "confirmation needed" has occurred and the response method required of the pharmacist are different.

In the inspection process screens shown in FIG. 16 to FIG. 21, common display elements are denoted by the same reference numerals. Firstly, these common display elements will be described by taking the inspection process screen 1700 of FIG. 16 (in part, the inspection process screen 1800 of FIG. 17) as an example.

The inspection process screen 1700 displays information 1701 such as a prescription ID of the drug M2, a patient name and an inspected packaging machine ID, and displays a list of photographed images of individual drugs (tablets) m contained in the drug M2. This list display is shown in a table format which shows the drug names of the tablets m1 to m3 and the uncertain drugs of which the drug names have not been specified, in each row, and the number of prescription days which have been prescribed, in each column. In addition, the type of the time point dosage is displayed in tabs 1702 to 1704, and by selecting the tabs, the tablet images of the individual tablets m can be displayed for each time point dosage.

In the inspection process screen 1700, the photographed images of the individual tablets m, which have been determined as "uncertain" in the inspection result by the drug inspection apparatus 11, are displayed in new rows indicated as "uncertain 1" and "uncertain 2" that are separated from the rows indicating the individual drug names (specifically, the rows of "m1 with engraved mark", "m2 without engraved mark", and "capsule m3") contained in the prescription information of the drug M2. In the present description, the row of "uncertain 1" is a row for displaying a tablet determined as "uncertain", and the row of "uncertain 2" is a row for displaying a capsule determined as "uncertain", but the present invention is not limited thereto. The "with engraved mark" or "without engraved mark" in the display of the individual drug name is information indicating whether or not the tablet is a tablet in which the engraved mark is confirmed in step S203 of the first inspection result determination process. In the case where the second inspection result determination process is executed, the description of "with engraved mark" or "without engraved mark" is not necessary.

In addition, in a case where there is a drug m for which the inspection result is "uncertain", the photographed image is not displayed in a display area of the drug m in which the photographed image is displayed when the inspection result is "normal", but the periphery of the display area of the photographed image may be highlighted by coloring or the like. Specifically, "grid-line hatching 1706" shown in FIG. 16 and the like is the highlighted display corresponding to "uncertain", and it is understood that in the case of the inspection process screen 1700 of FIG. 16, five drugs in total are determined as "uncertain". In addition, it is also acceptable to perform the highlighted display corresponding to "uncertain" also around the photographed images displayed in the rows of "uncertain 1" and "uncertain 2".

On the other hand, for the individual drug (tablet) m which is determined as "confirmation needed" in the inspection result by the drug inspection apparatus 11, a photographed image is displayed in a display area of the corresponding tablet m. Furthermore, the display area may be highlighted in such a way that the periphery of the display area is colored, or the like. Specifically, "oblique-line hatching 1707" shown in FIG. 17 and the like is the highlighted display corresponding to "confirmation needed", and in the case of the inspection process screen 1800 of FIG. 17, it is understood that four drugs in total are determined as "confirmation needed".

In the inspection process screen 1700 or the like, the above display for the inspection result of "uncertain" or "confirmation needed" enables the pharmacist to recognize the individual drug (tablet) to be confirmed or corrected, at a glance. For information, a display method of differently highlighting "uncertain" and "confirmation needed" can further enhance the distinction.

In addition, the inspection process screen 1700 is provided with a warning field 1705 for displaying the number of sachets or tablets that need confirmation on the screen, and thereby prevents the pharmacist from forgetting or missing the inspection. The inspection result settlement button 1708 provided on the inspection process screen 1700 is a button to be pressed by the pharmacist, when the pharmacist completes the pharmacist inspection for the drug of the inspection target, similarly to the inspection result settlement button 1603 on the inspection process screen 1600 of FIG. 15.

Next, the features of the inspection process screens shown in FIG. 16 to FIG. 21 will be described.

Figure 16:
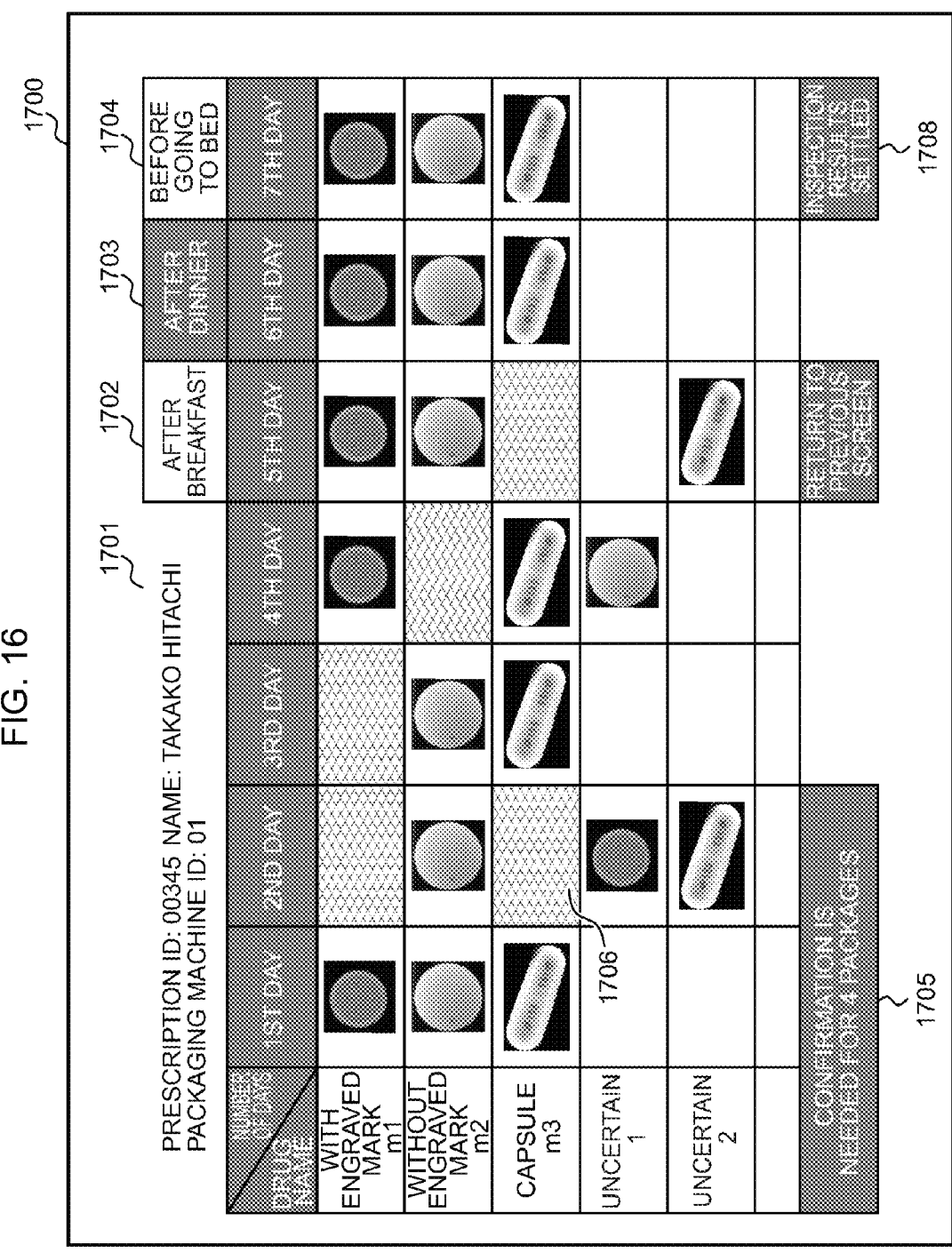
FIG. 16 is a diagram showing another example (second example) of the inspection process screen.

The inspection process screen 1700 of the second example shown in FIG. 16 is a display result example in a case where the first inspection result determination process is executed for the drug M2 and the inspection result of each drug m becomes "normal" or "uncertain". In addition, also when the first inspection result determination process is performed in the modified example which does not determine as "confirmation needed", the inspection process screen as shown in FIG. 16 is displayed.

The details of the individual drugs m will be described below of which the inspection results are displayed on the inspection process screen 1700. The drug m1 is a tablet (tablet m1) of which the engraved mark is confirmed in the first inspection result determination process, the drug m2 is a tablet (tablet m2) of which the engraved mark is not confirmed in the first inspection result determination process, and the drug m3 is a capsule (capsule m3) of which the engraved mark is not confirmed in the first inspection result determination process.

In the first inspection result determination process, the color, size, and engraved mark of the tablet m1 for which the engraved mark is needed to be confirmed are collated with those of the master data (matching analysis). In addition, the colors and sizes of the tablet m2 and capsule m3 in which the confirmation of the engraved mark is not necessary are collated with those of the master data (matching analysis).

According to the display of the inspection process screen 1700, it is understood that the inspection result of "uncertain" has occurred one or more times in each of the tablets m1, the tablets m2 and the capsules m3. Specifically, for example, in the inspection result of the drug M2 on the second day, only the tablet m2 is determined to be normal, and the tablet m1 and the capsule m3 are determined to be uncertain. In addition, photographed images of the tablet which has been determined to be uncertain are displayed in "uncertain 1", and the photographed images of the capsule which has been determined to be uncertain are displayed in "uncertain 2". Furthermore, the display areas of the photographed images of the tablet m1 and the capsule m3 are highlighted by the grid-line hatching 1706.

Figure 17:
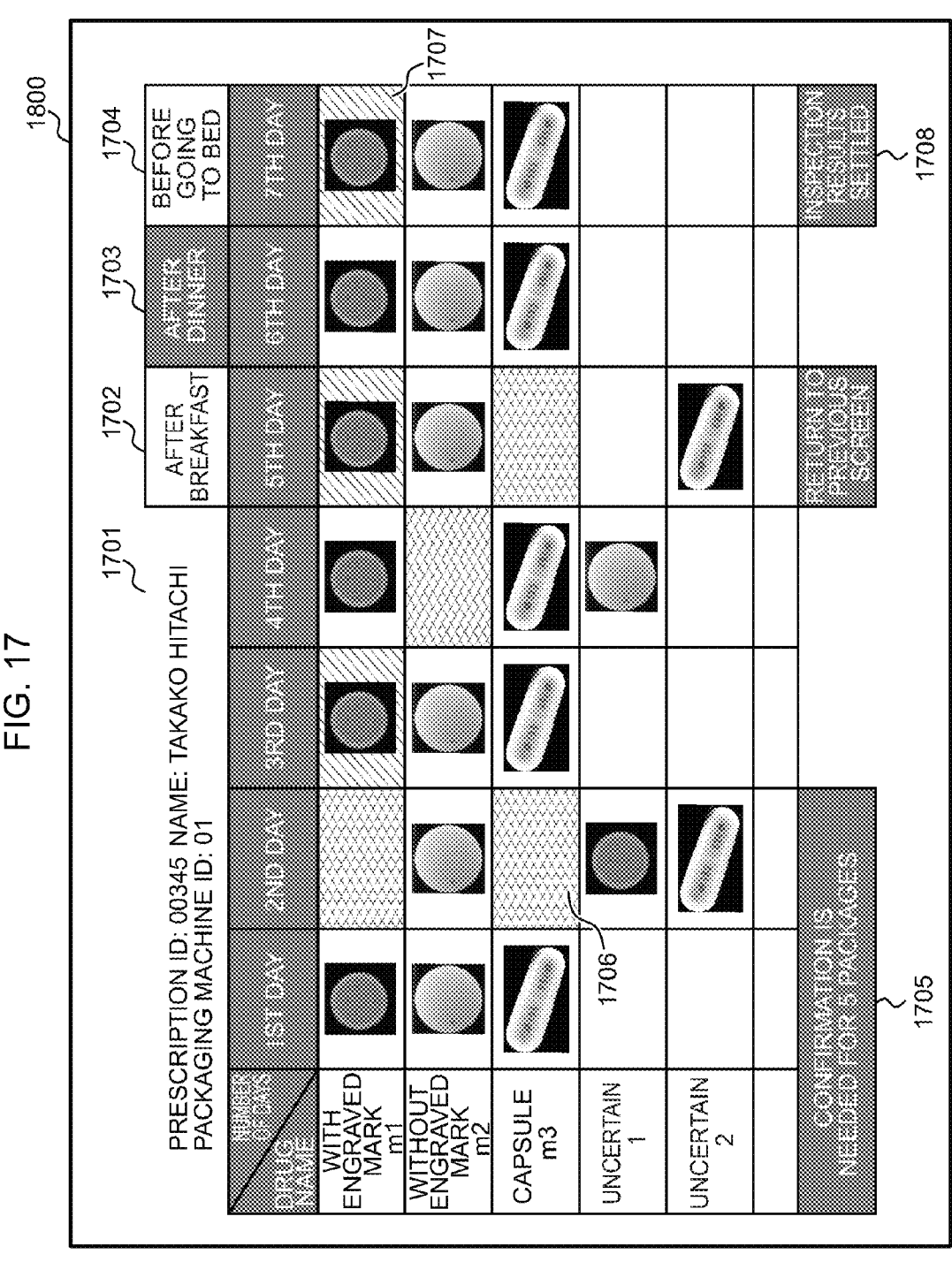
FIG. 17 is a diagram showing another example (third example) of the inspection process screen.

The inspection process screen 1800 of a third example shown in FIG. 17 is an example of a display result in a case where the first inspection result determination process has been executed for the drug M2 and not only "normal" or "uncertain" but also "confirmation needed" has occurred as the inspection result of each drug m.

The individual drugs m for which the inspection result has been displayed on the inspection process screen 1800 are the drug m1 with the engraved mark (the tablet m1), the drug m2 without the engraved mark (the tablet m2), and the capsule drug m3 (the capsule m3), similarly to the drugs in the inspection process screen 1700.

In the first inspection result determination process, the color, size, and engraved mark of the tablet m1 for which the confirmation of the engraved mark is needed are collated with those of the master data (matching analysis). In addition, the colors and sizes of the tablet m2 and the capsule m3 in which the confirmation of the engraved mark is not needed are collated with those of the master data (matching analysis).

According to the display of the inspection process screen 1800, it is understood that the inspection result of "uncertain" has occurred one or more times in each of the tablets m1, the tablets m2 and the capsules m3. In addition, the photographed images of the tablet which has been determined to be uncertain are displayed in "uncertain 1", and the photographed images of the capsule which has been determined to be uncertain are displayed in "uncertain 2". Furthermore, the display areas of the photographed images of the tablet m1 and the capsule m3 are highlighted by the grid-line hatching 1706. For example, when the inspection result on the second day is viewed, photographed images of the circular tablet are displayed in "uncertain 1", and photographed images of the capsule is displayed in "uncertain 2". In this way, the photographed images of the uncertain tablet and non-tablet (capsule) are displayed in different fields, and thereby, it becomes easy for the pharmacist to check and correct the uncertain drug.

Furthermore, according to the display of the inspection process screen 1800, it is also understood that three inspection results of "confirmation needed" have occurred in the tablets m1. Specifically, for example, in the inspection result on the third, fifth and seventh days, the tablets with the engraved marks m1 are determined as "confirmation needed", and accordingly, the display areas of the corresponding photographed images are highlighted by oblique-line hatching 1707. For information, the "confirmation needed" is treated as a part of "normal" (the drug inspection apparatus 11 determines that the drug is normal, but recommends confirmation by a pharmacist), and accordingly, as can be seen from FIG. 17, the photographed image is displayed in the display area of "tablet m1" instead of "uncertain 1". In this case, the pharmacist compares the drug image on which the highlighted "confirmation needed" is displayed with a master image such as a master image 2301 that is displayed on an inspection correction screen 2300 of FIG. 22, which will be described later, and thereby can easily perform visual confirmation. For information, the master image is an image of the master data (master image), which has been used for the collation in the inspection result determination process for the individual drug m.

Figure 18:
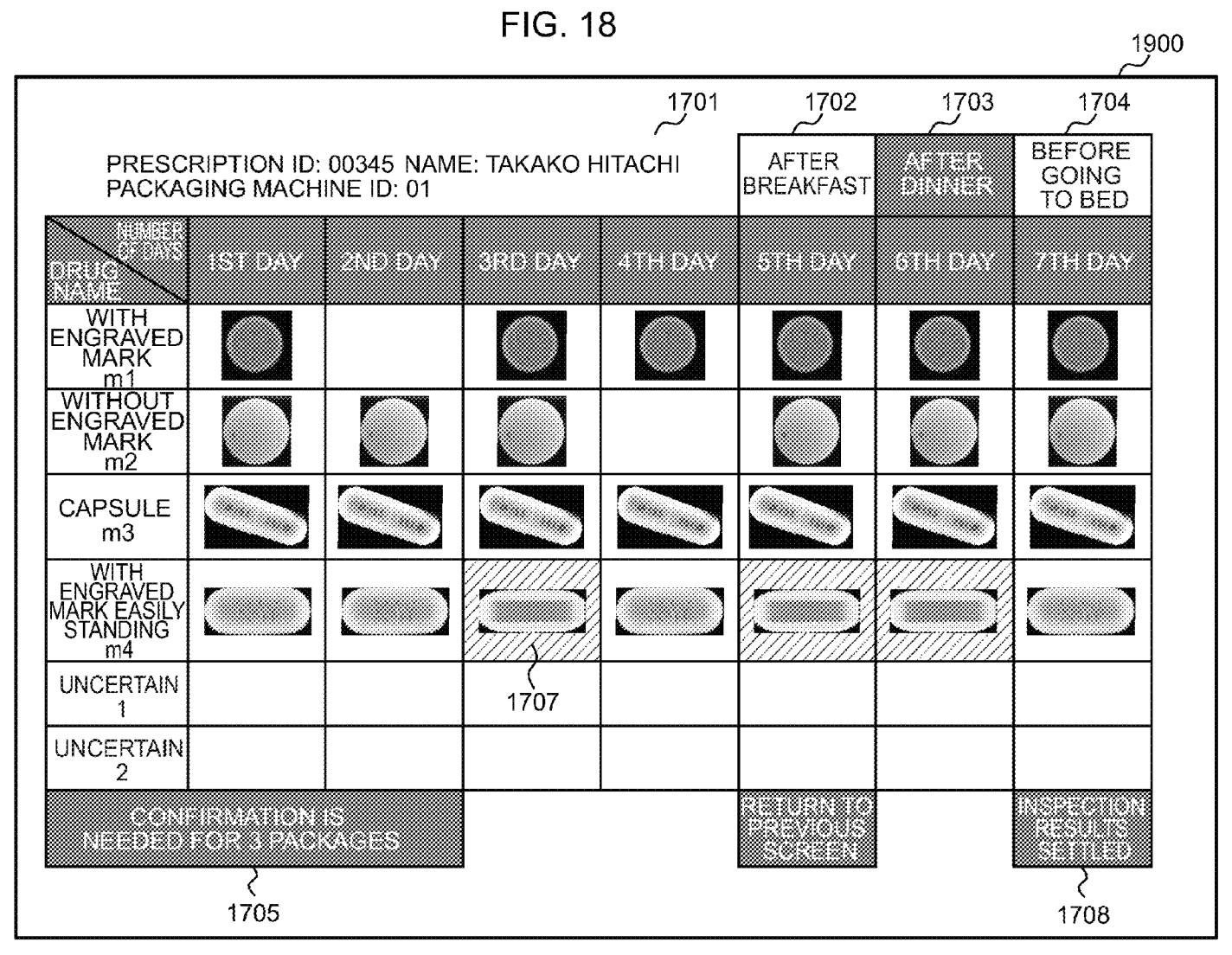

The inspection process screen 1900 of a fourth example shown in FIG. 18 is a display example of the inspection result of each drug m in the case where an easily standing tablet (tablet m4) is contained in the drug M2 of the inspection target.

The individual drugs m of which the inspection results are displayed on the inspection process screen 1900 are the drug with the engraved mark m1 (tablet m1), the drug without the engraved mark m2 (tablet m2), the drug of the capsule m3 (capsule m3), and an easily standing drug with the engraved mark m4 (tablet m4).

Here, the "easily standing drug" is a tablet which is assumed to have a possibility of "standing" in a state where a surface without the engraved mark faces the camera side, when the tablet is dropped from the pre-inspection storage portion 200 to the conveyance path (on the rotary disc 401) in a spread state. It can be determined in advance whether or not the tablet easily stands, by a shape of the tablet. Then, as for the easily standing tablet, it is registered that the tablet is "easily standing", in the drug master data in advance together with the presence or absence of the engraved mark. Specifically, in the case of an easily standing tablet with the engraved mark, a master image in a normal state in which the engraved mark is visible and a master image in a standing state in which the engraved mark is invisible are registered in the master data. Plural states of master images in the standing state may be registered. In the case of the easily standing tablet without the engraved mark, a master image in the normal state and a master image in the standing state are registered in the master data. For information, it is also considered as the data that the size is different between the normal state and the standing state. Then, the inspection result processing portion 802 reads the information on these individual drugs m from the drug master data, when generating the inspection process screen 1900, and displays the information in the field of "drug name". As a result, the drug m4 is displayed as the tablet "with the engraved mark" and "easily standing" m4, on the inspection process screen 1900. The tablet m1, the tablet m2 and the capsule m3 are the same as those in the inspection process screens 1700 and 1800.

In the first inspection result determination process, concerning the tablet m1 and the tablet m4 for which the confirmation of the engraved mark is needed, the color, the size and the engraved mark thereof are collated with those of the master data (matching analysis). Concerning the tablet m2 and capsule m3 for which the confirmation of the engraved mark is not needed, the color and the size thereof are collated with those of the master data (matching analysis).

However, in the first inspection result determination process for the easily standing tablet m4, the processes after step S204 shown in FIG. 13 change as in the following way. In the case where the drug M2 contains an easily standing tablet, when the inspection determination is performed on the easily standing tablet, it is acceptable for the imaging and inspection processing portion 803 to perform the first inspection result determination process according to the processing procedure which will be described below. As a premise, in the case of the easily standing tablet, a master image which has been photographed in a normal state (non-standing state) and a master image which has been photographed in a standing state are registered in the drug master data in advance.

Firstly, the case of an easily standing tablet without the engraved mark will be described. In the case of the easily standing tablet without the engraved mark, the determination in step S203 of FIG. 13 becomes NO. In addition, in the matching analysis in step S210, the imaging and inspection processing portion 803 uses the master image of the normal state. In the case where the color and size of the photographed image have matched those of the master image of the normal state in step S210, the imaging and inspection processing portion 803 determines YES in step S211, and determines the inspection result as "normal". In the case where the photographed image does not match the master image of the normal state at least in the color in step S210, the imaging and inspection processing portion 803 determines NO in step S211, and determines the inspection result as "uncertain". In addition, as a process peculiar to the present modified example, in the case where the photographed image does not match the master image of the normal state only in size, in step S210, the imaging and inspection processing portion 803 performs the matching analysis again with the use of the master image of the standing state. In the case where the color and size of the photographed image have matched those of the master image of the standing state, as a result of the matching analysis, the inspection result is determined as "normal". On the other hand, in the case where the photographed image does not match the master image of the standing state in at least one of the color and the size, as a result of the matching analysis, the inspection result is determined as "uncertain".

Next, the case of an easily standing tablet with the engraved mark will be described. In the case where it has been determined that the captured image has the engraved mark (YES) in step S203 of FIG. 13, the imaging and inspection processing portion 803 uses the master image of the normal state (non-standing state) in the matching analysis of step S204. The processing procedures after step S204 are the same as the previously described processing procedures. On the other hand, in the case where it has been determined in step S203 that the captured image does not have the engraved mark (NO), the imaging and inspection processing portion 803 uses the master image of the standing state in the matching analysis in step S210. In the case where the color and size of the photographed image have matched those of the master image of the standing state in the matching analysis in step S210, the imaging and inspection processing portion 803 determines YES in step S211, and determines the inspection result to be "confirmation needed" instead of "normal". The reason why the inspection result is set to be "confirmation needed" is that although it has been confirmed that the color and the size match those of the master image in the matching analysis, it is not confirmed whether the engraved mark matches that of the master image. For information, though depending on the setting, in the case where the color and size of the photographed image have matched those of the master image of the standing state in the matching analysis in step S210 (YES in step S211), it is also acceptable for the imaging and inspection processing portion 803 to determine the inspection result to be "normal" instead of "confirmation needed".

As a result of the first inspection result determination process performed as in the above, the tablet m1, the tablet m2 and the capsule m3 have been all determined as "normal", but in the easily standing tablet with the engraved mark m4, three times of inspection results of "confirmation needed" have occurred, which can be understood according to the display of the inspection process screen 1900. The display areas of the tablets m4 determined as "confirmation needed" are highlighted by oblique-line hatching 1707. Due to a display of the inspection result performed as in the above way, the pharmacist can easily check and correct the tablets m4 that are determined to be confirmation needed, by comparing the photographed images with the master images as in the master image 2301 which is displayed on the inspection correction screen 2300 of FIG. 22, which will be described later.

In addition, in the description of the inspection process screen 1900 of the fourth example, the method has been described which collates the easily standing tablet with the photographed image with the use of a plurality of master images, and determines the inspection result for the tablet in the standing state, but such a processing method in the drug inspection apparatus 11 according to the present embodiment is not limited to the easily standing tablets and can be applied to general drugs in which the size or the appearance of the engraved mark changes depending on the direction in which the drug is placed on the conveyance path. Though detailed description is omitted, when the size changes, it is acceptable to prepare master images of sizes corresponding to the respective placing methods, and to perform a matching analysis with each master image.

In addition, as a drug in which the engraved mark is differently seen in the photographed image, according to a direction in which the drug is placed on the conveyance path, a non-tablet (capsule) with the engraved mark is also considered. For example, in the case where the drug M2 contains a capsule m3 with the engraved mark and it is desired to determine the inspection result in consideration of the matching of the engraved mark also for the capsule m3, it is acceptable to change the processes after step S204 and step S210 in the following way, as a modified example of the first inspection result determination process shown in FIG. 13.

Firstly, as a premise, in the case of the capsule, a plurality of master images in which the engraved mark is visible in different ways depending on the direction of the capsule at the time of photographing (a master image photographed in a state in which all the engraved mark of the capsule are visible, a master image photographed in a state in which a part of the engraved mark of the capsule is visible, and the like) are registered in the drug master data in advance. The master image in such a state that the engraved mark is invisible may not be registered.

In the modified example, in the case where it has been determined that the captured image has the engraved mark (YES) in step S203 of the first inspection result determination process, the imaging and inspection processing portion 803 performs the matching analysis with each of the plurality of master images in the matching analysis of step S204; and in the case where it has been determined that all of the size, the color and the engraved mark have matched in any one of master image, determines YES in step S205, and determines the inspection result as "normal". In the case where a result has not been obtained in which the size, the color and the engraved mark match any master image in all of the matching analysis in step S204, the imaging and inspection processing portion 803 determines NO in step S205, and the processing proceeds to step S207. In step S207, the imaging and inspection processing portion 803 confirms whether or not the size and color match and only the engraved mark is similar, on the basis of the analysis result with any one of the master images in step S204. Then, in the case where a positive result is obtained in step S207, the imaging and inspection processing portion 803 determines YES, and determines that the inspection result is "confirmation needed"; and in the case where a positive result is not obtained in step S207, the imaging and inspection processing portion 803 determines NO, and determines that the inspection result is "uncertain".

In the case where it has been determined in step S203 that the captured image does not have the engraved mark (NO), the imaging and inspection processing portion 803 performs the matching analysis with each of the plurality of master images in the matching analysis in step S210, and in the case where it has been determined that the size and color match in any one of the master images, the imaging and inspection processing portion determines YES in step S211, and determines the inspection result to be "confirmation needed" instead of "normal". On the other hand, in the case where a result has not been obtained in step S210, in which the size and color match in the matching analysis, even with the use of any master image, the imaging and inspection processing portion 803 determines NO in step S211, and determines the inspection result as "uncertain". For information, though depending on the setting, in the case where it has been determined that the size and the color match in any one of the master images (in the case where it has been determined as YES in step S211), it is acceptable to determine the inspection result to be "normal" instead of "confirmation needed".

Figure 19:
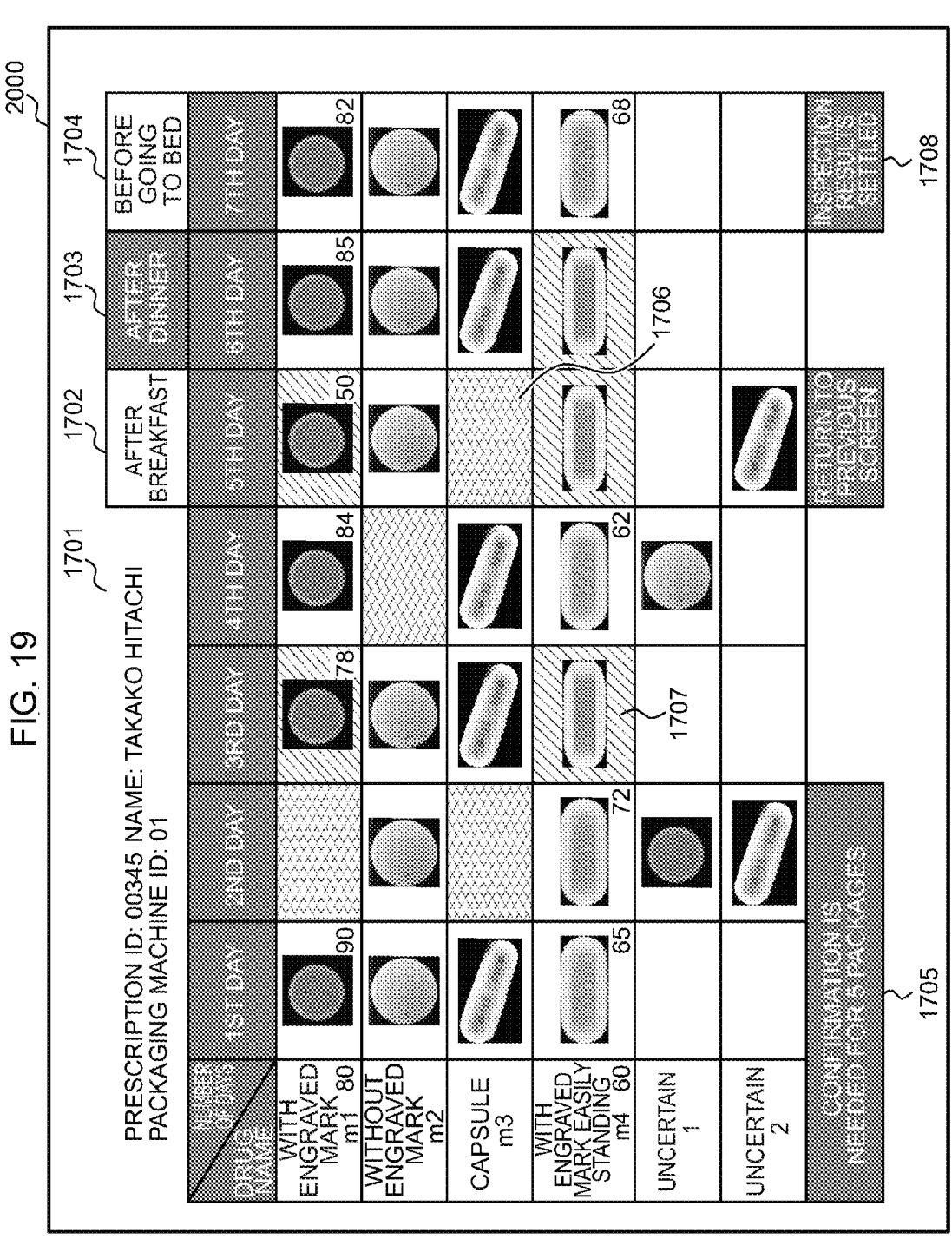
FIG. 19 is a diagram showing another example (fifth example) of the inspection process screen.

The inspection process screen 2000 of the fifth example shown in FIG. 19 is a display example of the inspection result of the individual drugs m in the case where an easily standing tablet (tablet m4) is contained in the drug M2 of the inspection target, and is configured to display the matching rates of the engraved marks for the drugs (tablets) with the engraved marks, as a different point from the fourth example shown in FIG. 18.

The individual drugs m of which the inspection results are displayed on the inspection process screen 2000 are the drug with the engraved mark m1 (tablet m1), the drug without the engraved mark m2 (tablet m2), the drug of the capsule m3 (capsule m3), and an easily standing drug with the engraved mark m4 (tablet m4); and are the same as the fourth example shown in FIG. 18. Accordingly, the first inspection result determination process to be executed is also the same as that of the fourth example, and the description thereof will be omitted.

When the inspection result processing portion 802 generates the inspection process screen 2000, the inspection result processing portion 802 displays a reference value (first threshold value) which has been used for determining the matching of the engraved mark in the inspection result determination process, in the field of the drug name, and displays the matching rate in the photographed image in the corresponding display area, for the drug (tablet) with the engraved mark. As a result of this, in the inspection process screen 2000, the reference values and the matching rates are shown in the fields of the tablets with the engraved mark m1 and the easily standing tablets with the engraved mark m4. In the case of FIG. 19, the matching rate is represented by a numerical value which sets the exact matching as 100, but the present invention is not limited thereto, and for example, it is acceptable to divide the matching rate into ranks and display the rank.

For information, when the results of the third, fifth and sixth days of the tablets m4 on the inspection process screen 2000 are viewed, the inspection results of "confirmation needed" are displayed, but the matching rates are not displayed. This means that the tablet in the photographed image has been the standing state and the engraved mark cannot have been confirmed (that the matching rate has been 0%). In the case of "confirmation needed" other than the reason of the standing state (for example, the tablet m1 of the third day in the inspection process screen 1800), the matching rate of the engraved mark is indicated. For information, when the inspection result is "uncertain", the value of displaying the matching rate is not so high, and accordingly, it is also acceptable that the inspection result processing portion 802 displays the matching rate only for the photographed image for a tablet with the engraved mark, for which the inspection result has been determined as "normal" or "confirmation needed". Furthermore, also in the case where the inspection result is "confirmation needed", it is also acceptable not to display the matching rate, on the assumption that the confirmation by the pharmacist should be performed.

When the reference value and the matching rate for the tablet with the engraved mark are displayed as in the inspection process screen 2000, not only the tablet of confirmation needed can be more easily identified, but also the degree of difference from the master data can be known from the level of the matching rate, even for the tablet for which the inspection result has been "normal", which can also be a reference for verifying the validity of the master data (whether or not the currently set reference value is appropriate). In addition, the reference value (threshold value) which is used for the determination for matching in the inspection result determination process can be set differently for each drug, and can also be changed. For information, in the field of the drug name, it is acceptable not to display the reference value but to display an average matching rate of the "normal (or may include a result of confirmation needed of which the matching rate has been calculated)" results at the time of the past inspection; and in this case, the inspection result determined as "normal" in the past can be compared with the inspection result of this time.

Figure 20:
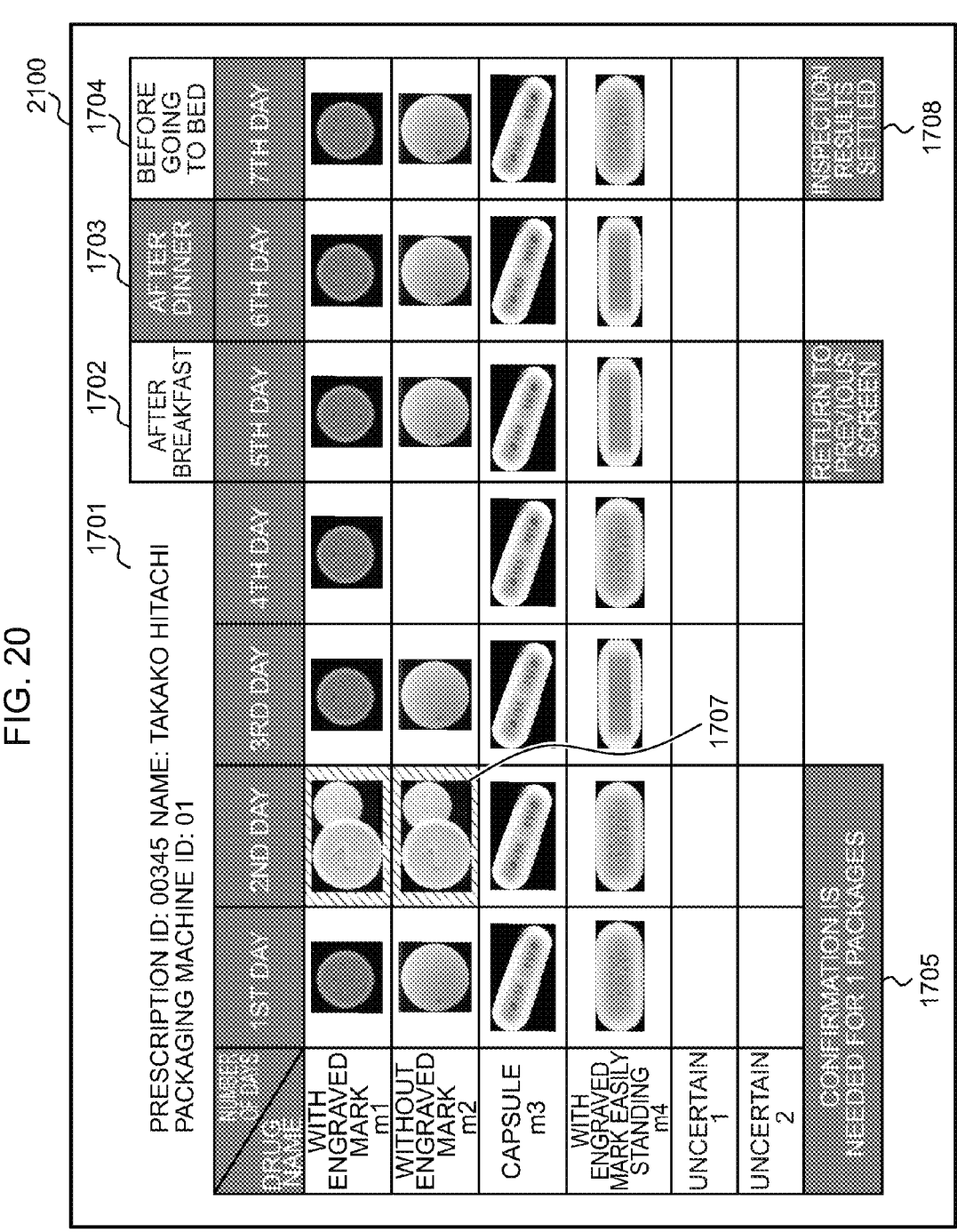
FIG. 20 is a diagram showing another example (sixth example) of the inspection process screen.

The inspection process screen 2100 of the sixth example shown in FIG. 20 is a display example of an inspection result in a case where an image in which a plurality of drugs overlap each other is contained in the photographed images of the drugs m which are the spread and photographed drug M2 of the inspection target. Processes except for the process for the photographed image in the overlapping state are the same as those for each of the inspection process screen described in FIG. 16 to FIG. 19, and accordingly, the description thereof will be omitted.

In the drug inspection apparatus 11 which can display the inspection process screen 2100 of the sixth example, the imaging and inspection processing portion 803 performs the following process in the inspection result determination process, as a special process for the photographed image in the overlapping state. Specifically, in the case where at least the whole size of the photographed image does not match the size of the master image in the matching analysis in steps S204 and S210 in FIG. 13 (or step S303 in FIG. 14), the imaging and inspection processing portion 803 analyzes the shape of the photographed image in detail, and can identify that the drugs are in the overlapping state, for example, in the case where the shape is a shape that is assumed when two or more drugs are in an overlapping state (in other words, a shape different from a shape (a circle, a polygon, or the like) which one drug can take). In the case where the photographed image is identified as an image in the overlapping state, the imaging and inspection processing portion 803 refers to information of a plurality of drugs for which the normal result is not obtained in the inspection result determination process, among the plurality of drugs m designated in the drug prescription data of the drug M2, and collates each of the plurality of drugs with each drug which is identified by the image analysis of the photographed image of the overlapping state. For example, if two tablets m1 and m2 having different sizes are partially overlapped, the whole shape of a tablet positioned on the front side (for example, the tablet m1) is seen in the photographed image, and accordingly, it is possible to perform collation (the size, the color, or the engraved mark) with those of the master image of the drug for which the normal result is not obtained; and in the case where the matching rate by the collation exceeds the predetermined reference value, it is possible to estimate (specify depending on the matching rate) that the drug is the tablet m1. In addition, the other tablet positioned on the rear surface can also be collated (at least in the size or the color) with the master image of the drug for which the normal result is not obtained, in a range shown in the photographed image, and in the case where the matching rate by the collation has exceeded the predetermined reference value, it can be estimated that the drug is the tablet m2. In this way, the imaging and inspection processing portion 803 estimates which drugs overlap.

Then, in the case where the plurality of drugs contained in the photographed image in the overlapping state can have been individually estimated according to the above process, the imaging and inspection processing portion 803 determines that the inspection result is "confirmation needed". At this time, the estimation result that indicates which drugs have been combined in the overlapping state is also output together with the information which indicates "confirmation needed" caused by the overlapping state. For information, in a case where the plurality of drugs contained in the photographed image, which have been identified as the overlapping state, cannot be individually estimated, the imaging and inspection processing portion 803 determines the inspection result as "uncertain".

Then, when the inspection result processing portion 802 generates the inspection process screen 2000, the inspection result processing portion displays the photographed image in the display area of each of the plurality of drugs which have been estimated to be contained in the photographed images in the overlapping state, and performs highlighted display corresponding to "confirmation needed" on the inspection process screen 2100, on the basis of the above information which has been output in the inspection result determination process. For example, in the inspection process screen 2100 of FIG. 20, the photographed images in which two tablets overlap each other are displayed in the inspection result fields of the second day of the tablet m1 and the tablet m2, and the display area is highlighted by oblique-line hatching 1707. These displays mean that it has been estimated that the drugs shown in the photographed images in the overlapping state are the tablet m1 and the tablet m2, and the inspection results are determined to be "confirmation needed", in the inspection result determination process.

As in the above, regarding the drugs in the overlapping state as in the inspection process screen 2100, the estimated drug is displayed as "confirmation needed", and thereby, the pharmacist can easily confirm the drug of the target.

Figure 21:
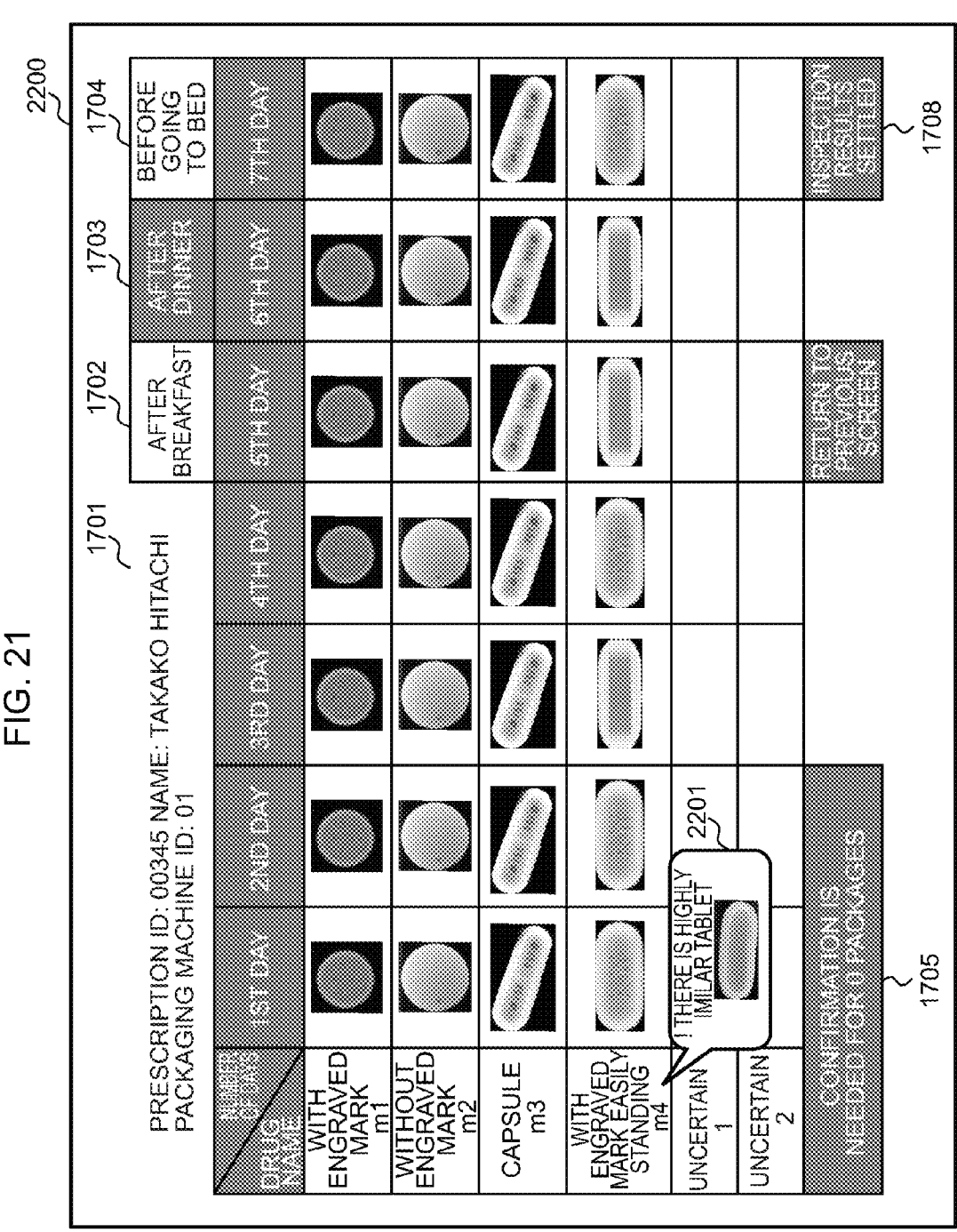
FIG. 21 is a diagram showing another example (seventh example) of the inspection process screen.

The inspection process screen 2200 of the seventh example shown in FIG. 21 is a display example of the inspection result, in a case where the highly similar tablet is included in the individual drugs m contained in the drug M2 of the inspection target.

The highly similar tablet is a tablet which is highly similar to the tablet of the target in at least one of the size and the color, and information of the highly similar tablet (master image of the highly similar tablet) is registered in association with information regarding the tablet of the target in the master data in advance. For example, the registration method may be a registration method of associating the master data (basic data) of tablets having a close relationship with each other. In addition, it is acceptable that the registration and cancellation of the highly similar tablets into master data can be arbitrarily set while the drug inspection apparatus 11 is operated.

Then, when the inspection result processing portion 802 generates the inspection process screen 2200, the inspection result processing portion checks whether the highly similar tablets are registered when referring to the master data for each of the drugs m1 to m4, which has been output as the inspection result of the drug M2, and displays a caution mark 2201 which indicates that the highly similar tablet exists in a predetermined format (for example, balloon, pop-up or the like) in the display field of the drug, in the case where the highly similar tablet is a registered drug (tablet). Specifically, in the case of the inspection process screen 2200, the caution mark 2201 is displayed in the balloon form, in the field of the drug name of the easily standing tablet with the engraved mark m4.

As in the inspection process screen 2200, the caution mark 2201 is displayed for the drug m for which the highly similar tablet exists; and thereby, the pharmacist can receive attention, and can take measures such as visual confirmation for precaution, even if the inspection result is displayed as "normal".

In the above, various display examples of the inspection results have been described at the time when the inspection results except for "normal" have occurred, with reference to FIG. 16 to FIG. 21. These display examples can be combined with each other as appropriate, and the process content of the inspection result determination process is also changed as appropriate according to the combination. In addition, the display form may be configured so that the pharmacist or the like can select, or may be configured so as to be switchable from an inspection process screen which has been displayed in a certain display form, to a display of an inspection process screen in another display form, in response to an operation of the pharmacist or the like.

Figure 22:
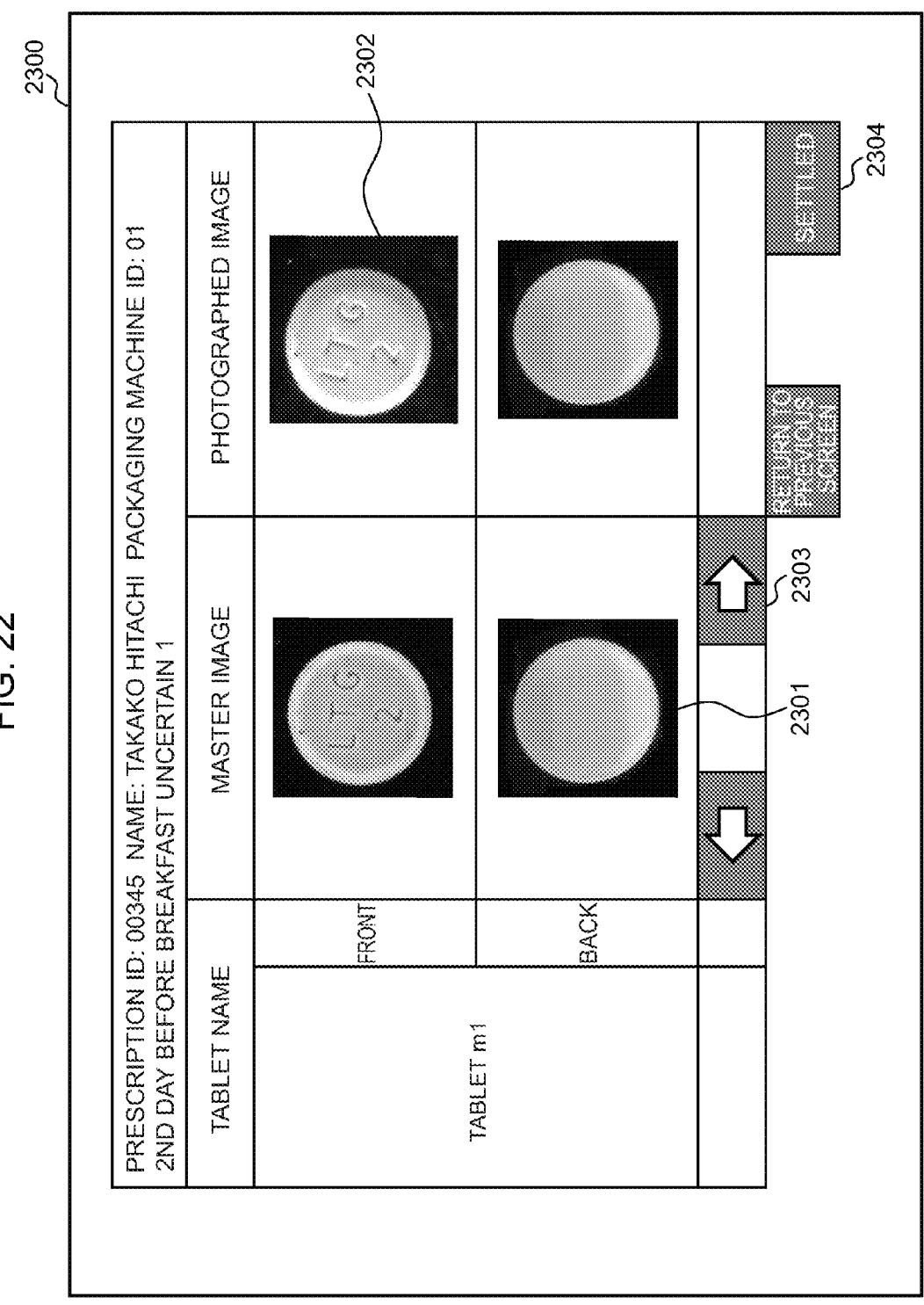
FIG. 22 is a diagram showing one example of an inspection correction screen.

FIG. 22 is a diagram showing one example of the inspection correction screen. The inspection correction screen is a screen that is displayed when a photographed image of an arbitrary individual tablet displayed in a list is clicked on the inspection process screen shown in FIG. 15 to FIG. 21, and an inspection correction screen 2300 shown in FIG. 22 is a specific example thereof.

The inspection correction screen 2300 is configured mainly by display fields of two rows and three columns. Specifically, the name of the tablet (tablet m1 in FIG. 22) which has been allocated as the identification result by the drug inspection apparatus 11 (imaging and inspection processing portion 803) is displayed in the first column on the left side of the screen, and the master image 2301 of the tablet is displayed in the second column on the right side thereof. For information, the allocation of the above tablet name has been determined specifically in such a way that the imaging and inspection processing portion 803 identifies the photographed image of each drug m which has been extracted from the photographed image of the drug M by the inspection imaging portion 500, compares the identification result with the drug prescription data and the drug master data (or the drug database 904), thereby determines the corresponding master tablet, and allocates the tablet name of the master tablet. Furthermore, in the inspection correction screen 2300, an enlarged image 2302 of the individual drug (in this case, the tablet m1) which has been photographed by the drug inspection apparatus 11 (inspection imaging portion 500) is displayed in the third column on the right side of the screen. For information, as for the image displays of the second column and the third column, the images of the front surfaces are displayed in the first row on the upper side, and the images of the rear surfaces are displayed in the second row on the lower side.

The pharmacist views the inspection correction screen 2300, visually confirms that the master image 2301 and the photographed image (enlarged image 2302) of the tablet of the target, which is determined as "confirmation needed", are the same type of individual tablet, then presses the settlement button 2304, and settles the inspection result. When the inspection result is settled by depression of the settlement button 2304, the highlighted display of the target tablet disappears which has been set as "confirmation needed", for example, on the inspection process screen 1700 of FIG. 16. For information, in the photographed images displayed on the inspection process screens 1600 and 1700 of FIG. 15 and FIG. 16, only images of surfaces are displayed which have the engraved mark or a print and can be visually distinguished from other tablets, but the inspection correction screen 2300 displays photographed images of both the front and back surfaces of the tablet, in order to confirm detailed information of the individual tablet m.

For information, the inspection correction screen 2300 of FIG. 22 is an inspection correction screen that is displayed in the case where the tablet m1 (hatching 1706) of the third day has been selected, which has been displayed as "confirmation needed" on the inspection process screen 1700 of FIG. 16, but also in the case where the tablet (hatching 1707) which has been shown as "uncertain" has been selected on the inspection process screen 1700, the tablet can be similarly corrected with the use of the inspection correction screen 2300 of FIG. 22.

In the case of individual tablets of "uncertain", there is not a master tablet that has been allocated as the identification result by the drug inspection apparatus 11 (the imaging and inspection processing portion 803), accordingly, a master tablet which is not allocated among the individual tablets contained in the drug M2 is preferentially selected, and the tablet name and the master image thereof are displayed, as names in the first column and the second column of the inspection correction screen 2300. For information, the display of the master image 2301 and the like can be switched to another candidate of the master tablet included in the prescription information of the drug M2, by an operation of pressing an arrow button 2303 provided at the lower part of the display field of the master image 2301.

The pharmacist views the inspection correction screen 2300, visually confirms that the master image 2301 and the photographed image (enlarged image 2302) of the uncertain tablet are the same type of individual tablet for the tablet of the target, which has been determined as "uncertain", then presses the settlement button 2304, and settles the inspection result. When the inspection result is settled by the depression of the settlement button 2304, the image of the tablet of the target, which has been displayed as "uncertain" on the inspection process screen 1700 is corrected so as to be displayed in the row of the individual tablet m which has been visually confirmed, and the highlighted display of the target tablet disappears.

In addition, the pharmacist may not use the inspection correction screen 2300 as in the above way, but can perform an operation of dragging and dropping the image of the tablet which has been determined as "uncertain" to the row of the correct individual tablet on the inspection process screen 1700, and can also correct the inspection result.

Then, when the pharmacist has performed the above procedure and completes the visual confirmation and the correction of the inspection result for all the individual tablets for which the inspection result is "confirmation needed" or "uncertain", the pharmacist presses the inspection result settlement button 1708 on the inspection process screen 1700, and completes the pharmacist inspection for the drug M2. As a result, the display of the inspection process screen 1700 ends, and the display returns to the initial screen of the inspection selection 1500 shown in FIG. 22.

Note that the present invention is not limited to the above embodiments, and includes various modified examples. Various modified examples for the configuration and control method of the drug inspection apparatus 11 can be considered depending on the conditions such as the number and shape of the drug M and the conditions of the inspection work for the prescription drug of the pharmacist.

For example, as for the conditions of the number and shape of the drugs M, in the case where the number is one, or in the case where the drug having the same spherical shape is naturally spread out, the drug inspection apparatus 11 may not include the pre-inspection storage portion 200 and the transfer processing portion 300, but can also directly drop the drug M which has been received, onto the circumference mounting plate 402 of the rotary disc 401 of the conveyance inspection processing portion 400.

In addition, for example, in the case where the inspection process is not needed though depending on the drug, it is also possible to add a mechanism which can move the drug directly to the post-inspection storage portion 700 without passing the drug through the conveyance inspection processing portion 400, after the pre-inspection storage portion 200 has received the drug. Such a mechanism can be realized by the adoption of a pre-inspection storage portion 200A shown in FIG. 23A and FIG. 23B, for example, in place of the pre-inspection storage portion 200 described in detail in FIG. 5A to FIG. 5D, in FIG. 6A to FIG. 6E, and the like.

Figure 23A:
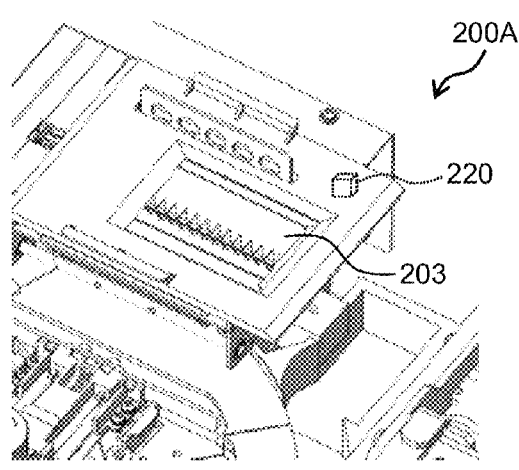
FIG. 23A is a view (part 1) showing a configuration example of a pre-inspection storage portion 200A.
Figure 23B:
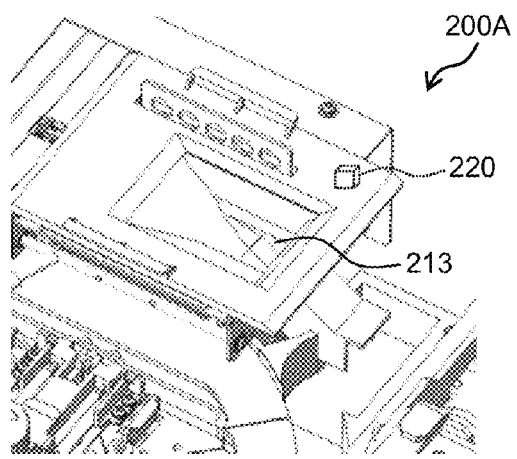
FIG. 23B is a view (part 2) showing a configuration example of the pre-inspection storage portion 200A.

FIG. 23A and FIG. 23B are views (part 1 and part 2) showing a configuration example of the pre-inspection storage portion 200A. The pre-inspection storage portion 200A is configured so that the storage case 203 and the path switching guide 213 can be exchanged. When a hand-held portion (handle) is provided on each of the storage case 203 and the path switching guide 213, the user can easily exchange these components. FIG. 23A shows a state in which the storage case 203 is attached to the pre-inspection storage portion 200A, and FIG. 23B shows a state in which the storage case 203 is exchanged to the path switching guide 213 in the pre-inspection storage portion 200A.

In the case where the storage case 203 is attached as in FIG. 23A, the pre-inspection storage portion 200A can temporarily hold the drug in the storage case 203, then drop the drug to the transfer processing portion 300, and move the drug, in the similar way to the previously described pre-inspection storage portion 200. On the other hand, when the path switching guide 213 is attached as in FIG. 23B, the drug dropped into the path switching guide 213 can be directly moved to the post-inspection storage portion 700.

In addition, a path switching guide detection sensor 220 that detects which of the storage case 203 and the path switching guide 213 is attached is mounted on the pre-inspection storage portion 200A. In the drug inspection apparatus 11 which has adopted the pre-inspection storage portion 200A, a time period required for the drug to reach the post-inspection storage portion 700 is different between the case where the storage case 203 is attached to the pre-inspection storage portion 200A and the case where the path switching guide 213 is attached, and accordingly the operations of the conveyance inspection processing portion 400 and the post-inspection storage portion 700 are changed on the basis of the detection result of the path switching guide detection sensor 220.

In the pre-inspection storage portion 200A configured as in the above, in the case where the inspection process is not needed, the path switching guide 213 is attached to the pre-inspection storage portion 200A, and thereby, the time period required for the drug to reach the post-inspection storage portion 700 can be shortened by the time period which is not spent for passing through the conveyance inspection processing portion 400; and as a result, the time period required for packaging can be shortened.

For information, the pre-inspection storage portion 200A is effective in the case of handling of drugs which do not require inspection processing, as described above; and in addition, for example, in the case where the conveyance inspection processing portion 400 or the discharge processing portion 600 fails and becomes inoperable, when the storage case 203 is replaced with the path switching guide 213, the drugs can be conveyed without passing through the failure portion, and the process for the drugs can be continued though the inspection function is degraded.

In addition, for example, in the description of FIG. 7 and the like, the circumference mounting plate 402 of the rotary disc 401 in the conveyance inspection processing portion 400 is configured to be divided into four quadrants. However, it is also acceptable to divide the plate into six to ten quadrants or the like, if the number of the drugs M is small; or for simplification, to reduce the number of quadrants to be divided, or not to divide the plate into quadrants.

On the other hand, in the case where it is difficult to inspect individual drugs, as in the case where the number of drugs M is large (for example, 10 or more) or a large drug is contained, the whole inspection processing portion 801 may also be configured so as to grasp the type and amounts of tablets which the drug inspection apparatus 11 receives from the host apparatus, on the basis of the drug prescription data, and variably handle the host apparatus, charging timing of the drug, and the cycle and number of times of the repetitive operation. For example, in the case of the drug inspection apparatus 11, there is also the case where the capacity of the pre-inspection storage portion 200, the conveyance inspection processing portion 400 or the like for storing the drug is determined in advance, and the drug described in the drug prescription data cannot be charged into the drug inspection apparatus 11 at one time. In such a case, it is possible to adjust the processing method by a method of dividing the number of times of the drug charging, into two or more times, by the adjustment with the host apparatus, and processing the drugs with the use of a plurality of sections in the rotary disc 401. In addition, some drugs have a characteristic of being easily overlapped, depending on the shape and combination of the drugs; and in the case, the drugs can also be adjusted so as to be separately charged into the drug inspection apparatus 11.

In addition, in order to enhance an inspection performance for the drug, the drug inspection apparatus may be configured, in the case where the drug inspection apparatus has failed in the drug inspection, so as not to discharge the drug from the rotary disc 401, but hold the drug on the rotary disc 401 for another round, take the picture again, and pass the drug for the inspection.

According to the Example 1 or the modified example thereof as in the above, there are provided the drug inspection apparatus and the drug inspection method each having the following features (1) to (4).

(1) Even in the case where the drug M is a combination of a large number of drugs having different shapes, for example, contains ten types of tablets having different shapes, the drug inspection apparatus transfers the individual drugs in a longitudinal row (substantially one row along the conveyance path) in the elongated conveyance space and in a non-overlapping state (spread state); and thereby can reliably take images of the upper and lower surfaces of the individual drugs, and can acquire a high-definition image. Thus, there can be provided the drug inspection apparatus and the drug inspection method which can execute the inspection with high accuracy or high probability.

(2) Even in the case where the drug M is a combination of a large number of drugs having different shapes, the drug inspection apparatus transfers the drug M to the elongated conveyance space on the rotary disc, divides the drug into individual drugs from the images in which the plurality of drugs have been imaged while being conveyed at a constant speed, and inspects the drugs; thereby can narrow the field of view of the installed camera, and accordingly facilitates the inspection process (image cutout) to be miniaturized and to be performed at higher speed. Thus, there can be provided the drug inspection apparatus which is compact and can perform the process at high speed, and the drug inspection method.

(3) Even in the case where the drug M is a combination of a large number of drugs having different shapes, the drug inspection apparatus rotates the elongated conveyance space on the rotary disc by about 360 degrees, and performs the inspection process; and thereby can clearly distinguish the preceding drug from the following drug, by a series of operations in one direction, without needing a reciprocating operation. Thus, there can be provided the drug inspection apparatus which is suitable for processing a plurality of continuous drugs, and the drug inspection method.

(4) The drug inspection apparatus rotates the elongated conveyance space on the horizontal rotary disc by about 360 degrees and performs the inspection process, and thereby can arrange the pre-inspection storage portion and the post-inspection storage portion in the vicinity of each other with a small height difference; and accordingly, there can be provided a miniaturized drug inspection apparatus in which a height dimension is small, and a drug charged portion and a drug discharged portion exist in the vicinity.

EXAMPLE 2

The drug inspection apparatus 11 of the previously described Example 1 has adopted a rotary disc in the conveyance inspection processing portion 400 having the inspection imaging portion 500, and thereby has had such an advantage of being capable of continuously and stably performing a high-speed process from the charge to discharge of the drug, by one rotation operation. On the other hand, the drug inspection apparatus 11 of the Example 1 has had a problem that the apparatus is upsized to some extent. Then, in Example 2, as one example of the drug inspection apparatus 10 in which miniaturization is prioritized, the drug inspection apparatus 12 will be described with reference to FIG. 24A, FIG. 24B, and FIG. 25A to FIG. 25D.

Figure 24A:
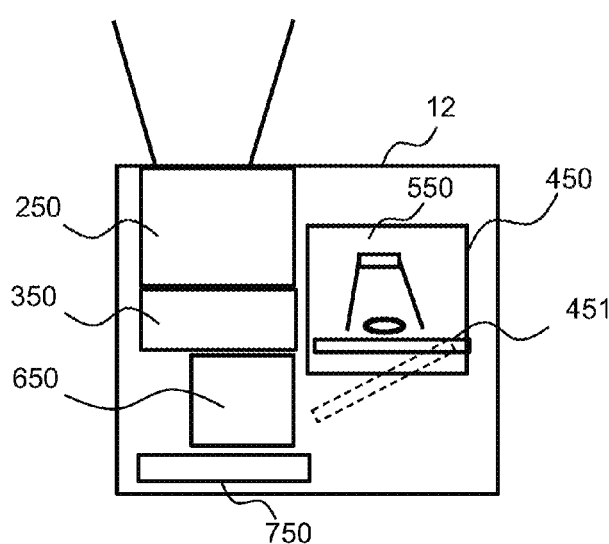
FIG. 24A is a side view of a drug inspection apparatus 12 according to Example 2.
Figure 24B:
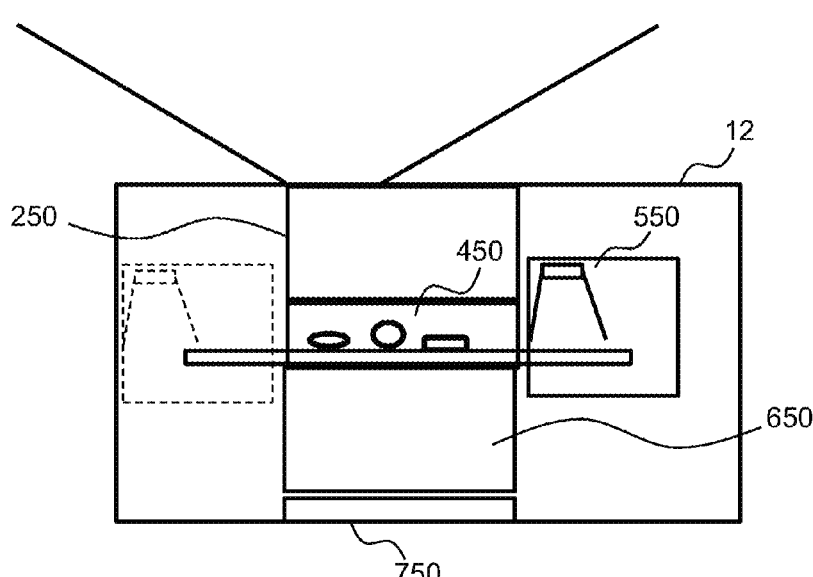
FIG. 24B is a front view of the drug inspection apparatus 12 according to Example 2.
Figure 25A:
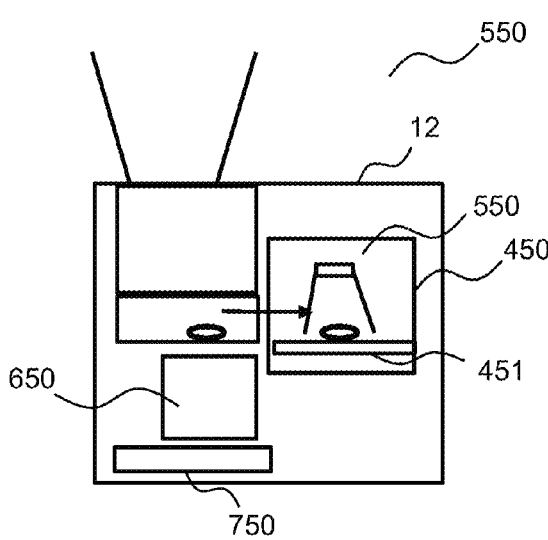
FIG. 25A is a view (part 1) for describing an operation of drug inspection in the drug inspection apparatus 12.
Figure 25B:
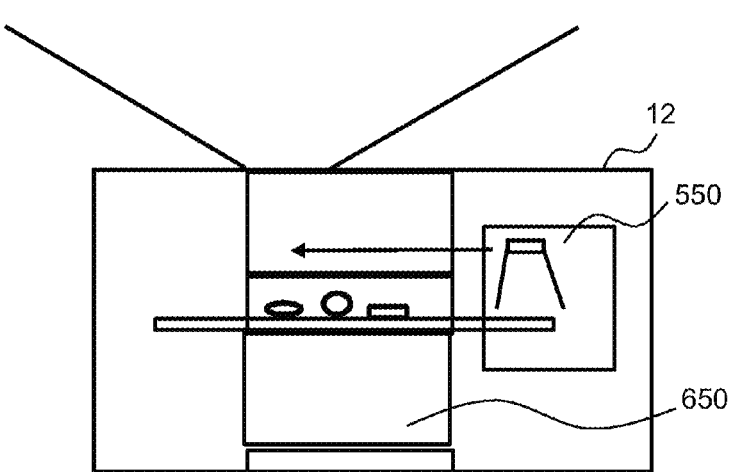
FIG. 25B is a view (part 2) for describing the operation of the drug inspection in the drug inspection apparatus 12.
Figure 25C:
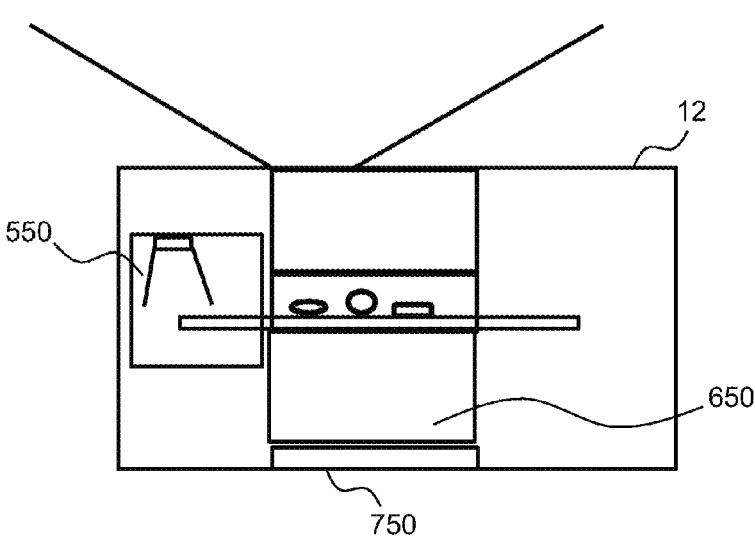
FIG. 25C is a view (part 3) for describing the operation of the drug inspection in the drug inspection apparatus 12.
Figure 25D:
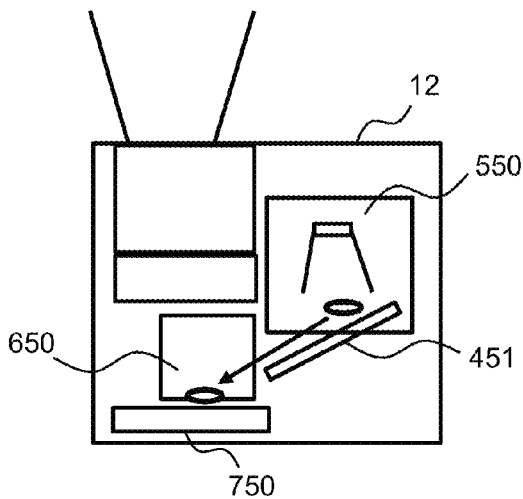
FIG. 25D is a view (part 4) for describing the operation of the drug inspection in the drug inspection apparatus 12.

FIG. 24A is a side view of the drug inspection apparatus 12 according to the Example 2, and FIG. 24B is a front view of the drug inspection apparatus 12 according to the Example 2. In addition, FIG. 25A to FIG. 25D are views (Part 1 to Part 4) for describing the operation of the drug inspection in the drug inspection apparatus 12. The FIG. 25A to FIG. 25D show the movement of the drug M in the drug inspection, in time series. FIG. 25A and FIG. 25D are side views, and FIG. 25B and FIG. 25C are front views.

The drug inspection apparatus 12 is configured to include a pre-inspection storage portion 250, a transfer processing portion 350, a conveyance inspection processing portion 450, an inspection imaging portion 550, a discharge processing portion 650, a post-inspection storage portion 750, and an unillustrated inspection control portion. As in the Example 1, the outline of the function of each component corresponds to the function of the component having the same name in the drug inspection apparatus 10. In addition, in the following description, the description of the configuration and the control operation which are common to those of the Example 1 will be omitted.

As shown in FIG. 24A and FIG. 24B, in the drug inspection apparatus 12, the pre-inspection storage portion 250 and the transfer processing portion 350 are continuously arranged in the vertical direction, and have the same configurations and perform the same control operations as the pre-inspection storage portion 200 and the transfer processing portion 300 of the drug inspection apparatus 11. Specifically, the drug M which has been charged into the pre-inspection storage portion 250 is pushed out from the transfer processing portion 350 to the conveyance inspection processing portion 450. A flat plate 451 is arranged in the conveyance inspection processing portion 450, and the drug M which has been pushed out from the transfer processing portion 350 is held on the flat plate 451 (see FIG. 25A). A point at which the conveyance inspection processing portion 450 of the present Example is different from the conveyance inspection processing portion 400 of the Example 1 includes that the conveyance inspection processing portion 450 does not have a moving conveyance path (the rotary disc 401). In other words, the conveyance inspection processing portion 450 holds the drug M which has been transferred from the transfer processing portion 300 onto the flat plate 451, without moving the drug M, until the drug M is discharged to the discharge processing portion 650 by the operation of the flat plate 451, as will be described later.

The inspection imaging portion 550 includes an upper camera which is arranged on the flat plate 451. After the conveyance inspection processing portion 450 has held the drug M on the flat plates 451, the inspection imaging portion 550 is moved horizontally by an unillustrated driving means to a position which is indicated by a dotted line in FIG. 24B, and images the drug M (see FIG. 25B and FIG. 25C). The flat plate 451 is configured to be movable to an inclined state which is shown by a dotted line in FIG. 24A, and after the inspection imaging portion 550 has taken an image of the drug M, the flat plate 451 operates to the inclined state; and thereby, the drug M passes through the discharge processing portion 650, moves to the post-inspection storage portion 750, and is then discharged (see FIG. 25D). The configurations and control operations of the discharge processing portion 650 and the post-inspection storage portion 750 are the same as those of the discharge processing portion 600 and the post-inspection storage portion 700 of the drug inspection apparatus 11.

For information, in the drug inspection apparatus 12 shown in FIG. 24A, FIG. 24B, and FIG. 25A to FIG. 25D, the inspection imaging portion 550 has been described to include only the upper camera, in order to prioritize the miniaturization, but may be configured to include a lower camera as well, and to be capable of taking pictures of the drug M from above and below, similarly to that in Example 1.

According to the Example 2 as in the above, even in the case where the drug M is a combination of a large number of drugs having different shapes, for example, contains ten types of tablets having different shapes, the drug inspection apparatus transfers the individual drugs in a longitudinal row (substantially one row along the conveyance path) in the elongated conveyance space which is similar to that in the Example 1, and in a non-overlapping state (spread state); and thereby can acquire a high-definition image. Thus, there can be provided a drug inspection apparatus which is small-sized and can execute the inspection with high accuracy or high probability.

For information, the drug inspection apparatus 12 of the Example 2, the substantial configuration of the conveyance inspection processing portion 450 is only the flat plate 451 serving as a mounting plane for the drug M and the space in the vicinity thereof, and accordingly, these plane and space may be configured as, for example, one configuration of the discharge processing portion 650, without being configured to be the conveyance inspection processing portion 450. When being configured in this way, the drug inspection apparatus 12 does not need to include the conveyance inspection processing portion 450.

In addition, in the Example 2, in order to process a plurality of consecutive drugs M at a high speed, it is also acceptable to configure not only the mechanism for moving the drug but also the inspection imaging portion 550 to be moved at a high speed.

In addition, the Examples described above are each described in detail for the purpose of describing the present invention in an easy-to-understand way, and are not necessarily limited to a configuration including all the configurations described above. In addition, it is also possible to replace a part of a configuration of a certain Example with a configuration of another Example, and it is also possible to add a configuration of another Example to a configuration of a certain Example. In addition, another configuration can be added to, deleted from or replaced with, a part of the configuration of each Example. A part or all of the above configurations, functions, processing portions, processing means and the like may be realized by hardware by, for example, a method of designing them in an integrated circuit or the like. In addition, the above configurations, functions and the like may be realized by software, by a processor which interprets and executes a program for implementing the respective functions. In addition, information such as programs, tables, files and the like for realizing the respective configurations can be stored in a recording apparatus such as a memory, a hard disk or an SSD (Solid State Drive), or a recording medium such as an IC card, an SD card or a DVD.

REFERENCE SIGNS LIST

10, 11, 12 drug inspection apparatus
20 pre-inspection storage portion
30 transfer processing portion
40 conveyance inspection processing portion
50 inspection imaging portion

60 discharge processing portion
70 post-inspection storage portion
80 inspection control portion
101 drug packaging apparatus
102 drug storage portion
103 drug supply portion
104 drug packaging portion
105 packaged drug
106 individual drug
107 one package prescription drug
200, 200A, 250 pre-inspection storage portion
201 charge vibration alignment portion
202 charge partition plate
203 storage case
204, 205 arrow
206 rotary shaft
213 path switching guide
220 path switching guide detection sensor
300, 350 transfer processing portion
301 transfer guide
302 transfer push-out plate
303 transfer push-out alignment portion
304 transfer portion shutter
400, 450 conveyance inspection processing portion
401 rotary disc
402 circumference mounting plate
403 inner circumferential guide
404 circumference partition plate
405 outer circumferential guide
406 support frame
451 flat plate
500, 550 inspection imaging portion
501 camera
501A upper camera
501B lower camera
502, 502A, 502B illumination lamp (reflection illumination)
515 transmission illumination
516 semi-transmission sheet
521 backlight image
522 forward light image
600 discharge processing portion
601 discharge guide
602 discharge lever
700 post-inspection storage portion
702 discharge partition plate
800 inspection control portion
801 whole inspection processing portion
802 inspection result processing portion
803 imaging and inspection processing portion
804 drug operation control portion
805 drug operation portion
901 inspection result display screen
902 host prescribed-drug instruction apparatus
903 server
904 drug database
1500 initial screen of inspection selection
1600, 1700, 1800, 1900, 2000, 2100, 2200 inspection process screen
2300 inspection correction screen

What is claimed is:

1. A drug inspection apparatus that inspects a drug group including one or more dispensed drugs, comprising:
    drug master data in which basic data including master images is registered for a plurality of drugs including individual drugs contained in the drug group;

an inspection imaging portion that takes images of individual drugs of the drug group, which are spread and conveyed on a conveyance path;

an inspection processing portion that executes an inspection process for the drug group, by software control on the basis of collation between an image photographed by the inspection imaging portion and the drug master data; and an inspection result processing portion that generates and outputs an inspection process screen for displaying results of the inspection process, wherein the inspection processing portion collates the photographed images of individual drugs with the drug master data, in the inspection process, and determines an inspection result of the photographed image as a normal result, when having determined that the drug of the photographed image is a drug contained in the drug group, determines that the inspection result of the photographed image is an uncertain result, when having determined that it is uncertain that the drug of the photographed image is the drug or not which is contained in the drug group, and determines that the inspection result of the photographed image is a result needed to be confirmed, when having determined that the drug of the photographed image is estimated to be a drug contained in the drug group but is recommended to be confirmed by a person; and the inspection result processing portion displays the photographed image that has been determined as the normal result or the result needed to be confirmed corresponding to the drug, in a first display field provided so as to correspond to individual drugs that have been identified in the inspection process, on the inspection process screen, and displays the photographed image that has been determined as the uncertain result, in a second display field provided separately from the first display field.

2. The drug inspection apparatus according to claim 1, wherein the inspection result processing portion performs highlighted display in different modes in the first display field for displaying the photographed image determined as the result needed to be confirmed and the second display field for displaying the photographed image determined as the uncertain result, on the inspection process screen.

3. The drug inspection apparatus according to claim 1, wherein the inspection result processing portion is configured to divide the second display field into a display field for displaying a photographed image of a tablet, and a display field for displaying a photographed image other than a tablet, among the photographed images determined as the uncertain result, on the inspection process screen.

4. The drug inspection apparatus according to claim 1, wherein when the inspection processing portion collates the master image of a drug having an engraved mark with the photographed image in the inspection process, the inspection processing portion determines whether or not a matching rate of the engraved mark is a reference value or more, as one of determination elements for an inspection result; and when the inspection result processing portion displays the photographed image in the first display field of the drug having the engraved mark on the inspection process screen, the inspection result processing portion displays a matching rate of the engraved mark of the photographed image with the master image.

5. The drug inspection apparatus according to claim 4, wherein the inspection result processing portion displays the reference value of the matching rate that is set in the drug master data of the drug, or an average value of the matching rate in the past photographed image, which is determined as the normal result corresponding to the drug, in an area for displaying a drug name of the drug having the engraved mark, on the inspection process screen.

6. The drug inspection apparatus according to claim 1, wherein the inspection processing portion executes the inspection process for the drug group by collating the drug master data of the drug with the photographed image for each drug contained in the drug group; and the inspection processing portion acquires information on a color, a size and an engraved mark of the drug photographed in the photographed image, analyzes whether or not the acquired information matches the drug master data of the drug of a collation partner, and determines the inspection result on the basis of a result of the analysis on the color, the size and the engraved mark, in the inspection process.

7. The drug inspection apparatus according to claim 6, wherein the inspection processing portion determines that the inspection result of the photographed image is the result needed to be confirmed, in a case where the information on the color and the size acquired from the photographed image matches the drug master data of the drug of the collation partner, and the information on the engraved mark acquired from the photographed image does not match the basic data.

8. The drug inspection apparatus according to claim 6, wherein the drug master data includes information indicating presence or absence of the engraved mark in each of the drugs; and the inspection processing portion determines whether or not a drug to be collated with the photographed image has the engraved mark, from the drug master data, in the inspection process; and in a case where the drug to be collated with the photographed image has the engraved mark, reads the information of the engraved mark from the photographed image, collates the read information with the information of the engraved mark, which is registered in the drug master data, and determines the matching between the engraved marks.

9. The drug inspection apparatus according to claim 6, wherein a plurality of master images of a specific drug, which are photographed in different directions, are registered in the drug master data; and when the inspection processing portion collates the specific drug with the photographed image in the inspection process, the inspection processing portion performs a first collation of collating one master image that corresponds to the specific drug, among the plurality of master images, with the photographed image;

in a case where a determination result of matching is not obtained in the first collation, performs second collation of collating another master image among the plurality of master images, with the photographed image; and in a case where a determination result of matching is obtained in the second collation, determines that the inspection result of the photographed image is the normal result or the result needed to be confirmed.

10. The drug inspection apparatus according to claim 1, wherein information of a highly similar drug that is highly similar to a predetermined drug can be registered in the drug master data, in association with a basic data of the drug; and when the inspection result processing portion displays a drug that is associated with the information of the highly similar drug in the drug master data, on the inspection process screen, the inspection result processing portion notifies that the highly similar drug exists in the drug.

11. The drug inspection apparatus according to claim 1, wherein the inspection processing portion executes the inspection process for the drug group, by collating the drug master data of the drug with the photographed image for each drug contained in the drug group; and the inspection processing portion acquires information on a color and a size of the drug photographed in the photographed image, analyzes whether or not the acquired information matches the drug master data of the drug of a collation partner, and determines the inspection result on the basis of a result of the analysis on the color and the size, in the inspection process.

12. A drug inspection method by a drug inspection apparatus that inspects a drug group including one or more dispensed drugs, wherein the drug inspection apparatus comprises:

drug master data in which basic data including master images is registered for a plurality of drugs including individual drugs contained in the dispensed drug group;

an inspection imaging portion that takes images of individual drugs of the drug group, which are spread and conveyed on a conveyance path;

an inspection processing portion that executes an inspection process for the drug group, by software control on the basis of collation between an image photographed by the inspection imaging portion and the drug master data; and an inspection result processing portion that generates and outputs an inspection process screen for displaying results of the inspection process, wherein the inspection processing portion collates the photographed images of individual drugs with the drug master data, in the inspection process, and determines an inspection result of the photographed image as a normal result, when having determined that the drug of the photographed image is a drug contained in the drug group, determines that the inspection result of the photographed image is an uncertain result, when having determined that it is uncertain that the drug of the photographed image is the drug or not which is contained in the drug group, and determines that the inspection result of the photographed image is a result needed to be confirmed, when having determined that the drug of the photographed image is estimated to be a drug contained in the drug group but is recommended to be confirmed by a person; and the inspection result processing portion displays the photographed image that has been determined as the normal result or the result needed to be confirmed corresponding to the drug, in a first display field provided so as to correspond to individual drugs that have been identified in the inspection process, on the inspection process screen, and displays the photographed image that has been determined as the uncertain result, in a second display field provided separately from the first display field.

* * * * *